US009342462B2

(12) United States Patent
Steele, Jr. et al.

(10) Patent No.: US 9,342,462 B2
(45) Date of Patent: May 17, 2016

(54) SYSTEMS AND METHODS FOR IMPLEMENTING LOW-LATENCY LOOKUP CIRCUITS USING SPARSE HASH FUNCTIONS

(71) Applicant: Oracle International Corporation, Redwood City, CA (US)

(72) Inventors: Guy L. Steele, Jr., Burlington, MA (US); David R. Chase, Belmont, MA (US)

(73) Assignee: Oracle International Corporation, Redwood City, CA (US)

( * ) Notice: Subject to any disclaimer, the term of this patent is extended or adjusted under 35 U.S.C. 154(b) by 257 days.

(21) Appl. No.: 14/069,255

(22) Filed: Oct. 31, 2013

(65) Prior Publication Data

US 2015/0121035 A1 Apr. 30, 2015

(51) Int. Cl.
*G06F 12/10* (2006.01)
(52) U.S. Cl.
CPC .................. *G06F 12/1018* (2013.01)
(58) Field of Classification Search
CPC .......... G06F 17/3033; G06F 17/30097; G06F 12/1018; G06F 9/30036; G06F 12/08; G06F 12/10
USPC ......................................... 707/747
See application file for complete search history.

(56) References Cited

U.S. PATENT DOCUMENTS

| | | | | |
|---|---|---|---|---|
| 7,738,454 | B1 * | 6/2010 | Panwar et al. | 370/389 |
| 8,661,042 | B2 * | 2/2014 | Scholz et al. | 707/748 |
| 8,706,701 | B1 * | 4/2014 | Stefanov et al. | 707/687 |
| 8,938,469 | B1 * | 1/2015 | Keen et al. | 707/769 |
| 2002/0091715 | A1 * | 7/2002 | Coady | 707/200 |
| 2004/0019764 | A1 * | 1/2004 | Steiss et al. | 711/216 |
| 2007/0271398 | A1 * | 11/2007 | Manchester et al. | 709/249 |
| 2012/0096009 | A1 * | 4/2012 | Scholz et al. | 707/748 |
| 2012/0246400 | A1 * | 9/2012 | Bhadra et al. | 711/104 |
| 2013/0097387 | A1 * | 4/2013 | Sanchez Martin et al. | 711/129 |

OTHER PUBLICATIONS

Thomas H. Cormen, et al., "Introduction to Algorithms", The MIT Press, 1990, pp. 440-461.
Prentice-Hall Series in Automatic Computation, "A Discipline of Programming", Edsger W. Dijkstra, 1976, pp. 161-167.
Henry S. Warren, Jr., "Hacker's Delight", 2003, pp. 74-75.

(Continued)

*Primary Examiner* — Adam M Queler
*Assistant Examiner* — Alex Olson
(74) *Attorney, Agent, or Firm* — Robert C. Kowert; Meyertons, Hood, Kivlin, Kowert & Goetzel, P.C.

(57) ABSTRACT

A lookup circuit evaluates hash functions that map keys to addresses in lookup tables. The circuit may include multiple hash function sub-circuits, each of which applies a respective hash function to an input key value, producing a hash value. Each hash function sub-circuit may multiply bit vectors representing key values by a sparse bit matrix and may add a constant bit vector to the results. The hash function sub-circuits may be constructed using odd-parity circuits that accept as inputs subsets of the bits of the bit vectors representing the key values. The sparse bit matrices may be chosen or generated so that there are at least twice as many 0-bits per row as 1-bits or there is an upper bound on the number of 1-bits per row. Using sparse bit matrices in the hash function sub-circuits may allow the lookup circuit to perform lookup operations with very low latency.

20 Claims, 18 Drawing Sheets

(56) References Cited

OTHER PUBLICATIONS

U.S. Appl. No. 14/106,476, filed Dec. 13, 2013, David R. Chase.
F. C. Botelho, D. Menoti, N. Ziviani. A new algorithm for constructing minimal perfect hash functions, Technical Report TR004/04, Department of Computer Science, Federal University of Minas Gerais, pp. 1-13, 2004.
Buhler, Jeremy. Mercury BLAST dictionaries: Analysis and performance measurement. Report 2007-13. Depart of Computer Science and Engineering, Washington University in St. Louis, Mo. February, pp. 1-9, 2007.
J.Lawrence Carter, Mark N. Wegman, Universal classes of hash functions. Journal of Computer and System Sciences, vol. 18, Issue 2, Apr. 1979, pp. 143-154. ISSN 0022-0000.
Z.J. Czech, G. Havas, and B.S. Majewski. An optimal algorithm for generating minimal perfect hash functions, Information Processing Letters, 43(5):257-264, 1992.
Rasmus Pagh and Flemming Friche Rodler. 2004. Cuckoo hashing. J. Algorithms 51, 2 (May 2004), 122-144.
Tran Ngoc Thinh, Kittitornkun, S., and Tomiyama, S. Applying Cuckoo Hashing for FPGA-based Pattern Matching in NIDS/NIPS. Proc. International Conference on Field-Programmable Technology (ICFPT), 2007, pp. 121-128, Dec. 12-14, 2007.
Wikipedia article "Disjoint-set data structure" http://en.wikipedia.org/wiki/Disjointset_data_structure; pp. 1-5, accessed Oct. 31, 2013.
Xilinx, Inc. Virtex-5 FPGA User Guide. UG190 (v5.4) Mar. 16, 2012. http://www.xilinx.com/support/documentation/user_guides/ug190.pdf, pp. 173-210, [accessed Oct. 31, 2013].
Havas, George, Majewski, Bohdan S., Wormald, Nicholas C., and Czech, Zbigniew J. Graphs, hypergraphs and hashing. In Graph-Theoretic Concepts in Computer Science (Leeuwen, Jan, ed.). Lecture Notes in Computer Science 790 (Springer, Berlin and Heidelberg, 1994), pp. 153-165.
CMPH, C Minimal Perfect Hashing Library, Jun. 9, 2012, pp. 1-5.
Tarjan, Robert Endre. 1975. Efficiency of a Good But Not Linear Set Union Algorithm. Journal of the ACM 22, 2 (Apr. 1975), 215-225.
Robert E. Tarjan and Jan van Leeuwen. 1984. Worst-case Analysis of Set Union Algorithms. Journal of the ACM 31, 2 (Mar. 1984), 245-281.
U.S. Appl. No. 14/069,253, filed Oct. 31, 2013, Guy L. Steele, Jr.
U.S. Appl. No. 14/069,259, filed Oct. 31, 2013, David R. Chase.

\* cited by examiner

SYSTEMS AND METHODS FOR IMPLEMENTING LOW-LATENCY LOOKUP CIRCUITS USING SPARSE HASH FUNCTIONS

BACKGROUND

1. Field of the Disclosure

This disclosure relates generally to computing devices that implement lookup tables, and more particularly to systems and methods for implementing low latency lookup tables using hardware circuitry to compute hash functions that perform multiplication with sparse bit matrices.

2. Description of the Related Art

Computer networking devices such as routers, switches, and network interface cards commonly rely on lookup tables in hardware circuitry to quickly access information associated with incoming data packets for purposes such as routing, filtering, or load-balancing. Lookup tables for network applications allow for the fast retrieval of data values associated with a key, where the key is a bit string that can be found in or computed based on data received in incoming packets. Lookup tables can map a set of such keys to a set of addresses in a memory holding data associated with the keys.

Many existing hardware approaches focus on lookup tables that solve the longest-prefix match problem, specifically for IP routing applications. Such approaches typically assume fixed key sizes and a static/fixed set of tables with fixed-size entries, and they typically emphasize high lookup rates over low latency for individual lookups. For example, some traditional hardware implementations of lookup tables include content-addressable memories (CAMs) or, more specifically, ternary content-addressable memories (TCAMs). CAMs are dedicated hardware circuits combining memory locations for key entries with comparator logic such that a given input key can be quickly compared to all key entries stored in the memory in parallel. If an input key is found, the CAM either directly returns data associated with the key or the index of the memory location the matching key is stored in. This index can then be used to access data associated with the key, for example, by using the index as an address into a separate static random access memory (SRAM) or a dynamic random access memory (DRAM).

TCAMs allow key entries to not only use bit values of 0 and 1, but a third, "don't care" value, X. A value of X specifies that the corresponding bit position is not to be compared to the input key, but is to be considered a match. Some applications require that, in case of multiple matches, the entry with the longest sequence of matching, non-X bits starting from the most significant bit, commonly known as the longest-prefix match, to be the entry that is returned. While TCAMs offer low access latencies, their memory capacity is generally lower than the capacities offered by standard SRAMs of equal chip size. This is largely due to the added comparator logic per memory location. Furthermore, the power consumption of TCAMs tends to be high, and the hardware design dictates a maximum key size.

Some more recent hardware implementations of large lookup tables targeted at solving the longest-prefix match problem leverage standard SRAM technology. These implementations often utilize tree-based data structures such as TRIEs (which are also known as digital trees or prefix trees) stored in SRAMs. In some existing implementations, TRIEs map the digits of the keys to nodes in a tree structure such that the lookup of a key is done by traversing the tree from its root to its leaf nodes, such that at every node, the next digit in the input key determines the next-level node until a leaf node is reached. The traversal of the tree for key lookups may require multiple accesses to SRAM memory. For example, for m-bit keys, TRIEs require O(m) memory accesses in the worst case. By using multiple SRAMs and techniques such as pipelining, tree-based implementations can match or exceed the lookup rates offered by TCAMs. On the other hand, approaches that depend on multiple SRAM accesses commonly lead to significantly higher latencies for individual key lookups.

Existing software approaches, including software algorithms for evaluating perfect hash tables, provide more flexibility than existing hardware approaches in terms of the number of tables, key sizes, and data entry sizes. However, these algorithms are typically designed for sequential processing (e.g. as a sequence of processor instructions), and do not lead to efficient, parallel circuit implementations. For example, software techniques for fast lookups commonly include data structures such as hash tables or, more specifically, perfect hash tables. However, existing software algorithms for key lookups typically do not yield practical hardware implementations of lookup tables, as they often require long sequences of steps, sequential integer arithmetic, and/or conditional processing, i.e., properties that do not allow for efficient parallel or pipelined processing in hardware.

An existing FPGA-based lookup circuit applies the techniques of Cuckoo Hashing to look up keys in a table pattern. This circuit uses a two-level table to accommodate variable-length patterns. One form of "universal hashing" that has been described computes a hash function of a bit-string by multiplying the bit string, regarded as a bit vector by a matrix of bits in order to compute a linear transformation of the bit vector. One class of hash functions that has been described relies on combining the results of two or more primary hash functions, with the primary hash functions being regarded as mapping a set of keys into a graph or hypergraph.

SUMMARY

The systems and methods described herein may in some embodiments implement programmable hash tables that provide low-latency access to data stored in memory. More specifically, the systems described herein may include hardware circuitry configured to implement lookup circuits. In various embodiments, these lookup circuits may evaluate hash functions that map a set of keys (e.g., bit strings) to a set of addresses in one or more lookup tables that hold data associated with the keys. As used herein, the terms "hash function evaluation circuit", and "lookup circuit" may be used somewhat interchangeably to refer to such hardware circuitry (or at least a portion thereof). In some embodiments, the hash functions that are implemented in the hardware circuitry may be selected for efficient evaluation in hardware circuitry (e.g., they may be chosen or generated in such a way that they can be implemented in hardware with low latency), and these hash functions may be used to construct the lookup tables. In some embodiments, the hash functions may be pre-computed in software based on a fixed key set and representations of those hash functions may be transferred to hash tables in one or more memories or to other hardware elements within the lookup circuits. The hardware circuitry may be configured to retrieve data associated with a hash of a given key that is presented as an input to the hardware circuitry.

In some embodiments, a lookup circuit may include multiple hash function sub-circuits, each of which applies a respective hash function to an input key value, producing a hash value. In some embodiments, the input key value may be represented by a bit vector. In some such embodiments, to apply a respective hash function to the input key value to produce a respective hash value, each of the hash function sub-circuits may be configured to multiply the input bit vector by a pre-defined sparse bit matrix and to add a pre-defined constant bit vector to the result of the multiplication. The hash value may identify a location in the memory (e.g., an entry in a lookup table) that stores a data value associated with the hash value. The hash value may be useable to access the data value stored in the identified location, and the data value may or may not be associated with the received input key value. In some embodiments, data representing the key associated with each data value may be stored along with its associated data value in the lookup table (e.g., as a key-value pair).

In some embodiments, the hash function sub-circuits may be constructed using odd-parity circuits that accept as inputs subsets of the bits of the bit vectors representing the key values (e.g., six, eleven, or twelve bits of an input key). The sparse bit matrices may be chosen or generated according to a sparseness constraint, such as a constraint specifying that there are at least twice as many 0-bits per row as 1-bits or that there is an upper bound on the number of 1-bits per row (e.g., a constraint that there are no more than six, eleven, or twelve 1-bits in each row). The use of sparse bit matrices in the hash function sub-circuits may allow the lookup circuit to perform lookup operations with very low latency. The hash function sub-circuits may be implemented and/or configured in a memory, using fixed combinatorial logic, using programmable combinatorial logic, or using a combination of these and/or other technologies, in different embodiments.

In some embodiments, the hardware circuitry may include a selection sub-circuit that is configured to receive (or to obtain) a respective data value associated with each of the hash values (e.g., from a lookup table in memory within the hardware circuitry) and to select one of the obtained data values (e.g., one that is associated with the received input key) to be output from the hardware circuitry. For example, the selection sub-circuit may be configured to determine which (if any) of the locations identified in the lookup table(s) stores a key that matches the input key, or stores data that is known to be associated with the input key. In some embodiments, at most one location in the lookup circuit stores a data value associated with each valid key.

In some embodiments, the lookup circuit may include two hash function sub-circuits, each of which provides a hash value to the same lookup table (e.g., to a separate input of a dual-ported memory that implements the lookup table). In other embodiments, each of the hash values may be provided to an input of a different single-ported memory that implements a lookup table specific to the corresponding hash function sub-circuit. In some embodiments, the lookup circuit may include more than two hash function sub-circuits, each of which produces a hash value usable to identify an entry in a lookup table.

In some embodiments, the hardware circuitry may include a secondary hash function sub-circuit that is configured to receive the hash values produced by two primary hash function sub-circuits for a given input key value, and to generate a secondary hash value dependent on those primary hash values, where the secondary hash value is usable to access a data value stored in a lookup table that is associated with the given input key value. For example, in some embodiments, the secondary hash function sub-circuit may be configured to obtain a respective value associated with each of the primary hash values (e.g., from a memory within the hardware circuitry) and to aggregate the obtained values using unsigned integer addition, signed integer addition, modular integer addition, or a bit-wise XOR operation to produce an address or index into the lookup table.

In some embodiments, the hardware circuitry may be configured to determine the validity of the keys that are presented as inputs and to provide a signal indicating the validity of each key and/or the resulting output data. In some embodiments, the contents of the lookup tables may be altered without modifying the underlying hardware of the hash function evaluation circuits.

Figure 1:
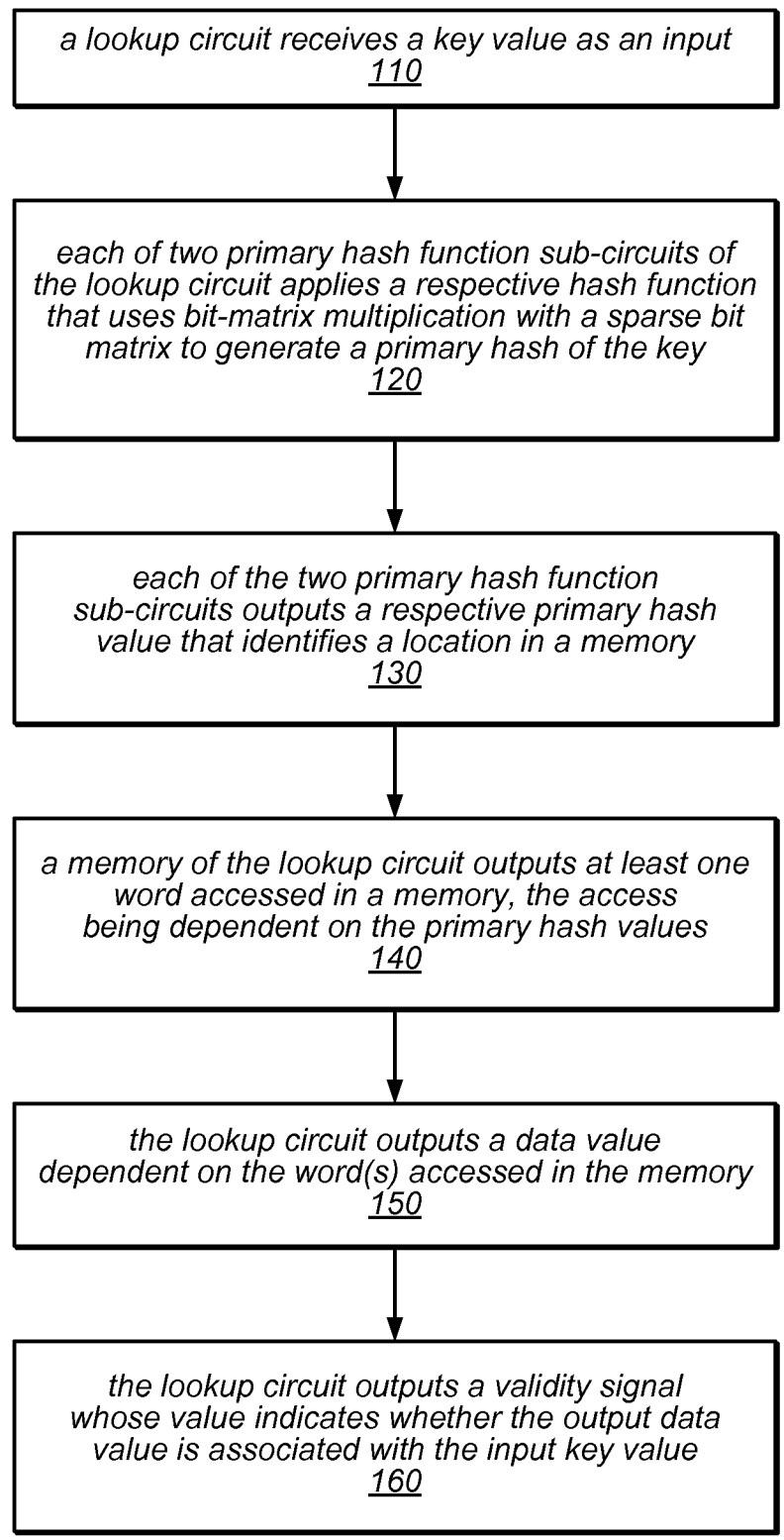
FIG. 1 is a flow diagram illustrating one embodiment of a method for performing a lookup operation in a lookup circuit that employs sparse bit matrices.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement configuring hash function circuitry and/or evaluating hash functions for performing table lookup operations using such circuits. More specifically, the systems described herein may utilize hash functions (e.g., perfect hash functions, minimal perfect hash functions or other hash functions) targeted at efficient evaluation in hardware circuitry to construct lookup tables. In some embodiments, the hash functions may be pre-computed in software based on a fixed key set and then transferred into a hardware lookup circuit. The lookup circuit may store a representation of the hash functions in one or more hash tables in memory or in other circuit elements and may be configured to retrieve and return data that is associated with various keys when they are presented to the circuit as inputs. In some embodiments, the lookup circuit may also be configured to verify the validity of a presented key, update data associated with a key, insert new key/value pairs, and/or delete key/value pairs.

The lookup circuits described herein may be implemented in various circuit-level network processing devices including network interface cards, network processors, smart routers/switches, etc., according to different embodiments. For example, in some embodiments, these circuits may be implemented as part of an application-layer network device, such as a network device that is designed for low-latency processing of application messages in hardware. In general, the systems and methods described herein may be employed in a variety of applications that require the fast retrieval of information associated with at least one key per incoming message, in different embodiments.

In some embodiments, the system in which the circuits and techniques described herein are employed may be a user-programmable device. In such embodiments, the hash tables described herein may be generated based on a user-provided program and/or user-provided table data, which may not be known at circuit design time. In some embodiments, the user may define the various hash tables and/or lookup tables (including the valid keys for the table, the data associated with each of the valid keys, the key size, the number of keys supported, the number and/or size of the data words associated with the keys, and/or other parameters of the hash tables and/or lookup tables) in a domain-specific programming language. In other embodiments, the user may define a mapping between valid key values and associated data words (e.g., in a comma-separated values file), and program instructions may be used to determine the key size, the number of keys supported, and the number and/or size of the data words associated with the keys, and to generate a hash function evaluation circuit configuration that implements a hash function (e.g., a minimal perfect hash function or another type of hash function) based on that information (which may include one or more hash tables or other representations of the hash functions, as described herein).

In some embodiments, the lookup circuits described herein may trade off some amount of flexibility for markedly lower latency, when compared to other approaches. For example, the lookup circuits may support only a single lookup table of fixed size, but may deliver the data associated with an input key (and, in some cases, a validity signal) faster than other lookup circuits. In some embodiments, some of the memories may be able to be updated while the lookup circuit is in operation, while others may not. For example, in some embodiments, flexibility may be provided in the context of a field programmable gate array (FPGA) implementation that operates in conjunction with a software infrastructure capable of reprogramming the FPGA wiring, if necessary, when the set of key-value pairs changes. In some embodiments that employ FPGA technology, the hash functions may be programmed through FPGA wiring rather than using tables stored in memory.

In some embodiments, the hardware circuitry may implement hash tables (e.g., hash tables for perfect hash functions, minimal perfect hash functions or other hash functions) by accessing multiple memory locations selected by multiple hash function sub-circuits, where each hash function sub-circuit is configured to multiply an input key, represented as a bit vector, by a sparse bit matrix, and then XOR the result with another bit vector (e.g., a constant bit vector). In some embodiments, the choice to use a sparse bit matrix may allow lookup operations to be implemented in circuitry with reduced access latency. For example, in embodiments in which a hash function sub-circuit multiplies input key bit vectors by a sparse bit matrix in which each row includes at most six 1-bits, a hash function producing an n-bit result may be computed using n FPGA lookup table circuit (LUTs) operating in parallel, with a latency of just one "LUT delay". In some embodiments, a hash function sub-circuit may be implemented using a collection of odd-parity circuits having different numbers of inputs (e.g., various odd-parity-of-6 circuits, odd-parity-of-11 circuits, and/or odd-parity-of-12 circuits).

One common application in which the hash function evaluation circuits and techniques described herein may be employed is the mapping of Internet Protocol (IP) addresses to Ethernet addresses for the purpose of routing IP packets to their destinations across multiple hops in the network. Given short packets and the high bandwidth of network links, in these types of applications, table lookups may need to be executed at a rate high enough to sustain the link rate. For example, a 10 Gb/s Ethernet link may have a maximum packet arrival rate of almost 15 million packets per second at minimum packet size, requiring 15 million table lookups per second to make routing decisions in a timely manner. For some such IP routing applications, the mapping of IP addresses to Ethernet addresses may not only require a determination of whether an IP address is held in the key memory, but whether there exists at least one key entry for which at least some of the bits (e.g., at least some of the most significant bits) matches the input key.

As noted above, existing hardware implementations of lookup tables for routing applications typically focus on high lookup rates, require solving the longest-prefix match problem, and often rely on fixed key and data entry sizes (as given by IP and Ethernet addresses). However, for applications in some computer networking devices, e.g., those examining incoming data packets beyond the network-layer header, lookup tables with different properties may be desirable. In particular, some applications may not require solving the longest-prefix match problem, but may require low, deterministic lookup latencies. In addition, it may be desirable to provide "early access" to associated data by making it available faster than an associated verification signal that indicates whether or not the data is actually valid, that is, associated with the key presented for query.

A hash function H for a set K of m distinct keys, each having r bits, is a mapping function that maps each key k∈K to a p-bit integer i=H(k). If the hash function H always maps distinct keys to distinct integers (that is, $k_1 \neq k_2$ implies that $H(k_1) \neq H(k_2)$), then the mapping is called a perfect hash function (PHF). If, furthermore, the unique integers i produced by H for the m distinct keys form a set of consecutive integers, e.g., 0≤i≤m−1 for all i, the mapping is called a minimal perfect hash function (MPHF).

In some embodiments, given a hash function H for a key set K, the lookup of data associated with a key k may first require the evaluation of H(k) to compute a unique index i. The index i may then be used as an address into a memory holding a d-bit data entry D(k) associated with k. In some embodiments, the systems and methods described herein may be used to implement, in hardware circuitry, hash functions that can be evaluated in constant time for all keys k.

In some embodiments, the lookup circuits described herein may use the results of the application of two or more hash functions on a presented key, computed in parallel by hardware circuits, to probe an equal number of memory locations simultaneously. The contents of the accessed locations may be used to determine whether the lookup table holds data associated with the presented key. If so, the associated data may be delivered. A data-validity signal may also be generated, in some embodiments.

As noted above, in some embodiments, the lookup circuits described herein may include hash functions that perform bit matrix multiplication using sparse bit matrices, as defined by a sparseness constraint. For example, a sparseness constraint may specify a pre-defined upper or lower bound on the number of 1-bits, a pre-defined upper or lower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row. In some embodiments, a useful choice (based on the circuit implementation) may be to allow no more than six 1-bits on each row, even for lookup circuits that handle keys having a large number of bits (e.g., 96), as this choice may reduce the hardware latency for computing the hash function and, therefore, may reduce the latency for delivering the data associated with the key.

One embodiment of a method for performing a lookup operation in a lookup circuit that employs sparse bit matrices is illustrated by the flow diagram in FIG. 1. As illustrated at 110, in this example, the method may include a lookup circuit receiving a key value as an input. The method may include each of two or more primary hash function sub-circuits of the hash function evaluation circuit applying a respective hash function to the received key, as in 120. In this example, each of the primary hash function sub-circuits may be configured to perform a bit-matrix multiplication using a sparse bit matrix as part of generating a primary hash of the key. In some embodiments, the hash function sub-circuits may operate in parallel (e.g., substantially concurrently) to apply different hash functions to the input key. The method may include each of the primary hash function sub-circuits outputting a respective hash function value that identifies a location in a memory, as in 130. The method may include a memory of the lookup circuit outputting at least one word in accessed in the memory, the access being dependent on at least one of the primary hash values, as in 140.

As illustrated in FIG. 1, the method may include the lookup circuit providing a data value as an output of the lookup circuit, as in 150, the data value output being dependent on the word(s) accessed in the memory. For example, in some embodiments, each of the primary hash values may be used to access a word in a respective entry in a lookup table directly, one of which is selected to provide an output of the lookup circuit, and a data value portion of the word in the selected entry is provided as an output of the lookup circuit. In other embodiments, the primary hash values may be used to access respective words in a hash table for a secondary hash function, the words obtained from the hash table for the secondary hash function may be combined to generate an index into a lookup table, and a data value obtained from a single entry in the lookup table identified by the generated index value may be provided as an output of the lookup circuit.

Note that, as described in more detail below, in some embodiments, the data value that is output by the lookup circuit may or may not be associated with the received input key value. Therefore, in some embodiments, the method may include the lookup circuit outputting a validity signal whose value indicates whether the output data value is associated with the input key value, as in 160. For example, in some embodiments each entry of the lookup table stores a key-value pair, and a validation sub-circuit of the lookup circuit may be configured to determine whether the value of the key stored with the output data value matches the input key value.

In some embodiments, the computation for looking up a key k using a perfect hash function H, i.e., the computation to evaluate H(k), may be split into two steps. In the first step, two primary hash functions F1 and F2 may be evaluated for the key k, resulting in two values F1(k) and F2(k) of p bits each. In the second step, a secondary hash function G may be evaluated for the values F1(k) and F2(k), such that H(k)=G(F1(k), F2(k)). Even if the primary hash functions F1 and F2 are not perfect, the overall hash function H may be perfect if F1, F2, and G are chosen correctly. Such methods are sometimes generalized to use more than two primary hash functions; for example, three hash functions F1, F2, and F3 may be used, along with a secondary combining function of three arguments, so that H(k)=G(F1(k),F2(k),F3(k)). Several such methods are found in the literature. To compute primary hash functions F1 and F2, one of these existing algorithms relies on the conditional summation of random integers modulo a chosen integer t. However, the computation of a modular sum of integers may be undesirable for implementation in hardware as it requires integer adders with carry chains and multiple conditional subtractions to compute a result in the range of 0 ... t−1.

As noted above, an existing lookup circuit that is based on field programmable gate arrays, or FPGAs, uses the techniques of Cuckoo Hashing to look up keys in a table pattern uses a two-level table to accommodate variable-length patterns. In some embodiments, the lookup circuits described herein may use keys of fixed length and a single level of table lookup, which may reduce lookup latency when compared to existing techniques. In some such embodiments, some or all of the data associated with a given key may be made available after only a single level of table lookup. In various embodiments, the lookup techniques described herein may differ from existing Cuckoo Hashing techniques in several other respects. For example, the existing FGPA-based circuit referenced above computes hash values sequentially, such that a lookup operation includes computing one hash function first, probing a table in memory, and making a decision about the results of that hash function before computing another hash function. In contrast, the lookup circuits described herein may compute multiple hash values in parallel (e.g., substantially concurrently).

In various embodiments, the lookup circuits described herein may implement hash functions that need not be minimal perfect hash functions or even perfect hash functions. However, for hardware implementation, it may be desirable to choose hash functions that can be evaluated in constant time for all keys k. Therefore, in some embodiments, the lookup circuits described herein may implement two or more hash functions, each requiring roughly the same fixed amount of time to compute, which may allow them to be computed substantially simultaneously in hardware. When a key is presented to the lookup circuit, each of the hash functions may be applied to the key. In some embodiments, the resulting p-bit hash values may be used as memory addresses in order to access key-value pairs stored in one or more memories. In some such embodiments, at most one key-value pair stored in the memories of the circuit may be identified as matching a presented key, and the associated data in that key-value pair may be selected for output (e.g., the data associated with the presented key may be delivered or otherwise provided as an output of the lookup circuit as a result of the lookup operation). Note that in some embodiments, the outputs of two or more hash functions may be the same for a particular key, in which case they would identify the same (single) location in memory at which data associated with the particular key is stored.

Figure 2:
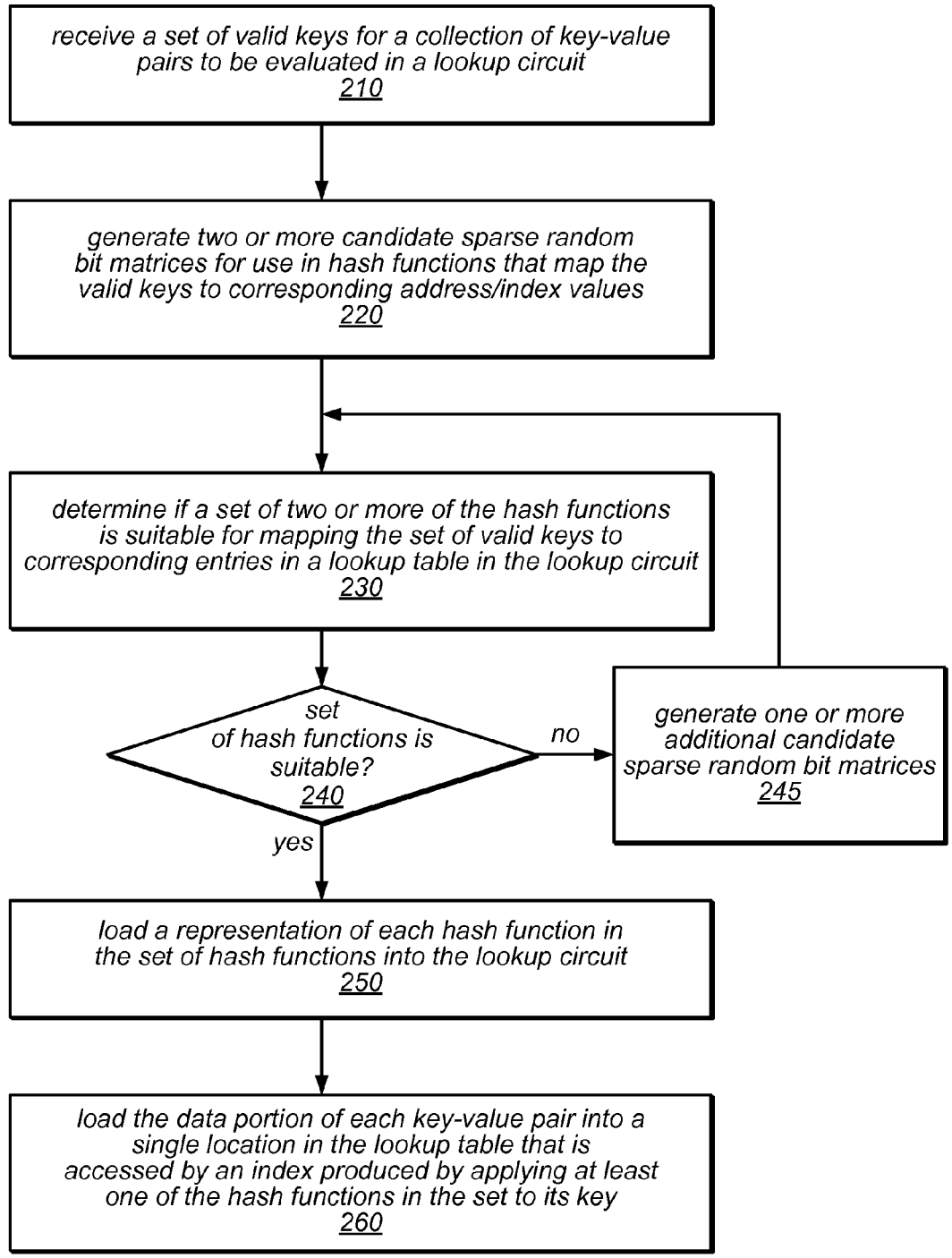
FIG. 2 is a flow diagram illustrating one embodiment of a method for loading a lookup circuit with a set of hash functions.

One embodiment of a method for loading a lookup circuit with a set of hash functions (e.g., a fixed number of hash functions corresponding to the number of hash function sub-circuits in the lookup circuit) is illustrated by the flow diagram in FIG. 2. As illustrated in this example, the method may include receiving a set of valid keys for a collection of key-value pairs to be evaluated in a lookup circuit, as in 210. The method may include generating two or more sparse random bit matrices for use in hash functions that map the valid keys to corresponding address/index values, as in 220.

The method may also include determining if a set of two or more of the hash functions is suitable for mapping the set of valid keys to corresponding entries in a lookup table in the lookup circuit, as in 230. For example, if the lookup circuit includes two hash function sub-circuits, the method may include determining whether a pair of hash function is suitable for use in the circuit, while if the lookup circuit includes three hash function sub-circuits the method may include determining whether a triplet of hash functions is suitable for use in the circuit. Note that in different embodiments, the criteria used to determine whether the set of generated hash functions is suitable may vary dependent on the particular circuitry of the lookup circuit, various characteristics of the set valid keys or of the collection of key-value pairs, and/or the nature of the application in which the lookup circuit is employed. For example, in some embodiments, suitability may be determined based on whether a graph of the set of hash functions (e.g., a pair of hash functions) is acyclic, on whether the set of hash functions is able to handle (e.g., evaluate) the set of key-value pairs for all valid keys (e.g., to produce exactly one unique address/index value for each valid key among the hash functions in the set), or on other suitability criteria.

As illustrated in this example, if it is determined that the set of hash functions is not suitable for use in the lookup circuit (shown as the negative exit from 240), the method may include generating one or more additional candidate sparse random bit matrices to be tested as part of a set of hash function bit matrices (e.g., as part of a pair or triplet of bit matrices, depending on the number of hash function sub-circuits in the lookup circuit), as in 245. For example, in some embodiments, after one pair of hash functions has been tested and determined not to be suitable, the method may include generating candidate sparse random bit matrices for use in another pair of hash function and testing it for suitability. However, if it is determined that the set of hash functions is suitable for use in the lookup circuit (or once a suitable set of hash functions has been identified), the method may include loading a representation of each of the hash functions in the set of identified set of hash functions into the lookup circuit (e.g., loading a representation of each of the hash functions into a respective hash function sub-circuit). This is illustrated in FIG. 2 by the positive exit from 240 and 250.

As illustrated in this example, in some embodiments, the method may also include loading the data portion of each key-value pair into a single location in the lookup table that is accessed by an index produced by applying at least one of the hash functions in the set to its key, as in 260. For example, the method may include loading data for the key-value pairs into one or more lookup tables in one or more memories within the lookup circuit, in various embodiments.

In some embodiments of the systems described herein, each of the hash functions implemented in the lookup circuit may be defined through the multiplication of a respective bit matrix A of dimensions p×r by a key k that is represented as a bit vector $k=(k_0, \ldots, k_{r-1})$ of length r, followed by an addition of a respective bit vector, $y=(y_0, \ldots, y_{p-1})$, of length p. In some embodiments, the addition may be performed modulo 2. In one such embodiment, the mathematical formula for the computation of a function H, where H may be one of two or more hash functions implemented in a lookup circuit, may be represented by Equation 1, shown below:

$$H(k) = A * k + y \qquad \text{Eqn. 1}$$

$$= \begin{pmatrix} a_{0,0} & \cdots & a_{0,r-1} \\ \vdots & \ddots & \vdots \\ a_{p-1,0} & \cdots & a_{p-1,r-1} \end{pmatrix} \begin{pmatrix} k_0 \\ \vdots \\ k_{r-1} \end{pmatrix} + \begin{pmatrix} y_0 \\ \vdots \\ y_{p-1} \end{pmatrix}$$

$$= \begin{pmatrix} a_{0,0}k_0 +_2 & a_{0,1}k_1 +_2 & \cdots & a_{0,r-1}k_{r-1} +_2 & y_0 \\ \vdots & \vdots & \ddots & \vdots & \vdots \\ a_{p-1,0}k_0 +_2 & a_{p-1,1}k_1 +_2 & \cdots & a_{p-1,r-1}k_{r-1} +_2 & y_{p-1} \end{pmatrix}$$

-continued $$= \begin{pmatrix} h_0(k) \\ \vdots \\ h_{p-1}(k) \end{pmatrix}$$

In this example, the operator "$+_2$" represents modulo 2 addition, and the following are assumed:

$a_{i,j} \in \{0,1\}$ $k_i \in \{0,1\}$ $y_i \in \{0,1\}$ $h_i(k) \in \{0,1\}$

As described in more detail herein, in some embodiments, the p×r bit matrix A may be generated and/or chosen such that it is a sparse bit matrix, which may allow the hash function it represents to be implemented using circuitry with low latency. For example, in one such matrix, each row of the matrix may include at least twice as many 0-bits as 1-bits, or may be limited to a pre-defined upper bound on the number of 1-bits, in different embodiments.

Figure 3:
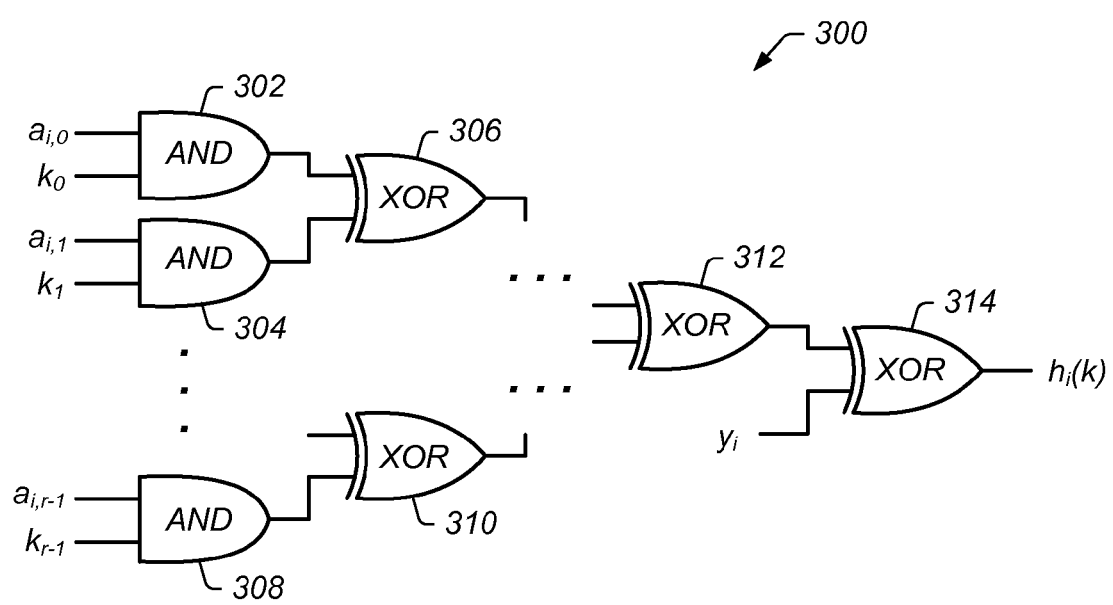
FIG. 3 is a block diagram illustrating a hardware circuit comprising AND gates and XOR gates that is configured to compute one bit of a hash function, according to one embodiment.

In some embodiments, the multiplication of two bits may be efficiently computed in hardware with an AND gate and the sum of two single-bit addends modulo 2 may be efficiently computed with an XOR gate. Hence, the sum of r single-bit addends modulo 2 may be computed with r−1 XOR gates. One such implementation is illustrated in FIG. 3, according to one embodiment. Specifically, FIG. 3 illustrates a hardware circuit 300 that includes multiple AND gates (including AND gates 302, 304, and 308) and a tree of XOR gates (including XOR gates 306, 310, 312, and 314) that are configured to compute one bit of H(k), as described above. In this example, the hardware circuit 300 is configured to compute bit $h_i(k)$ from the illustrated inputs (e.g., $a_{i,0}$ through $a_{i,r-1}$, and $k_0$ through $k_{r-1}$). To compute all p bits of function H, p parallel circuits similar to circuit 300 shown in FIG. 3 would be needed.

In general, with each of the lookup circuits described herein, a key is presented to an input of the circuit, and data associated with the key is provided at an output of the circuit. In some embodiments, an additional output signal may indicate whether or not the data provided at the output is valid. For some applications, it may be desirable for a lookup circuit not to be purely combinatorial, but to have alterable state. More specifically, it may be desirable for the lookup circuit to provide means for updating the set of key-value pairs in the lookup table. As described in more detail below, in some embodiments, the lookup circuit may implement additional inputs (e.g., a write signal and key/data input data) and may implement a mechanism to update the contents of the lookup circuit based on those inputs (e.g., to allow state information about hashing functions and key-value pairs to be updated). For example, when a write signal is asserted, this may indicate that the information presented to a key/data input should be stored in the memory of the lookup circuit.

Figure 4:
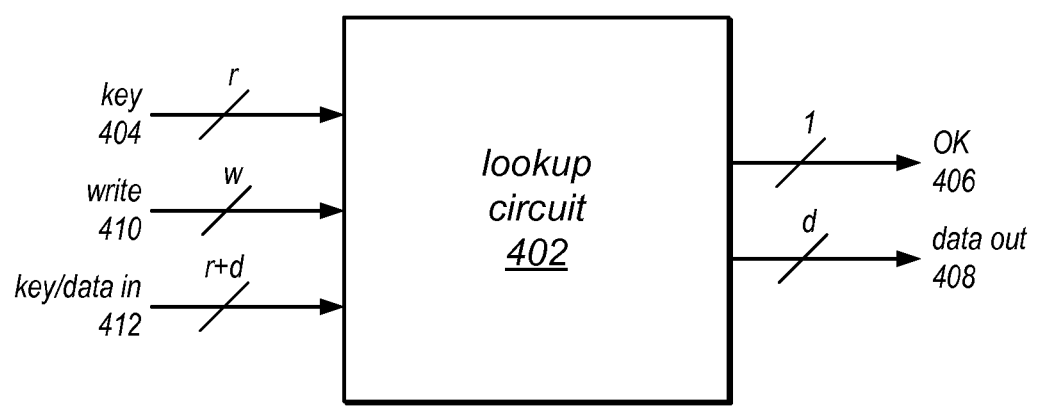
FIG. 4 is a block diagram illustrating an abstract representation of a combinatorial lookup circuit, according to one embodiment.

FIG. 4 is a block diagram illustrating an abstract representation of a combinatorial lookup circuit, according to one embodiment. In this example, lookup circuit 402 is configured to accept as an input a key 404 (in this case, a bit string of length r) and to produce two outputs, namely a single-bit validity signal 406 ("OK") that indicates whether a lookup table with lookup circuit 402 contains a key-value pair whose key is equal to the input key 404), and d bits of associated data 408. In this example, if the validity signal 406 is true, then the associated data 408 is equal to the value in the key-value pair whose key was found to match the input key 404. However, if the validity signal 406 is false, then the associated data 408 may be any bit pattern (i.e., the data 408 may not be associated with the input key 404). In this example, the lookup circuit 402 also accepts two additional inputs, namely a set of w write signals 410 (where w may be 1 or more than 1), and (r+d) bits of key/data information 412. At a clock transition or other specific time, the key/data information 412 may be used to update the lookup table in a manner controlled by the write signals 410. Note that in other embodiments, the contents of the lookup table may be fixed (thus, the lookup circuit may not include these additional inputs) and/or the lookup circuit may not output validity signal (e.g., in embodiments in which all input keys are known to be mapped to valid key-value pairs in the lookup circuit).

Figure 5:
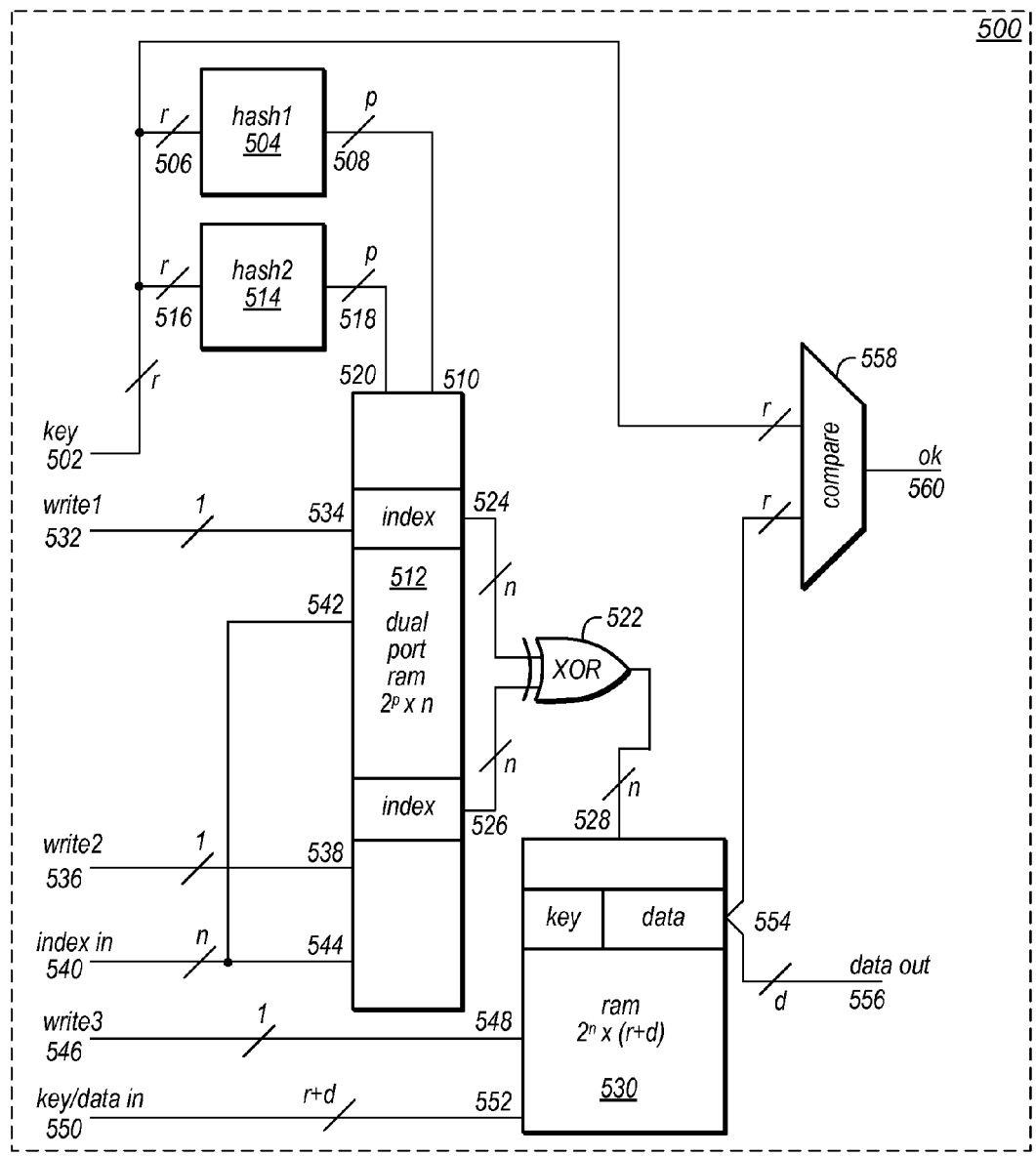
FIG. 5 is a block diagram illustrating a lookup circuit that accepts inputs and produces outputs similar to those accepted and produced by the abstract lookup circuit illustrated in FIG. 4, according to one embodiment.

FIG. 5 is a block diagram illustrating a lookup circuit that is configured to accept inputs and to produce outputs that are similar to those accepted and produced by the abstract circuit 402 shown in FIG. 4, according to one embodiment. In this example, lookup circuit 500 is configured to accept as an input a key 502 (a bit string of length r), corresponding to the input key 404 of FIG. 4. The lookup circuit 500 is also configured to accept a first single-bit write signal 532 and a second single-bit write signal 536, which together may correspond to the write signals 410 of FIG. 4 (with w=2). In this example, lookup circuit 500 is also configured to accept r+d bits of key/data input information 550, corresponding to the key/data inputs 412 of FIG. 4, and an n-bit index input signal 540.

The lookup circuit 500 includes a first primary hash function sub-circuit 504 that is configured to accept the key 502 at an input port 506 and to produce a p-bit output that is connected to a first address input 510 of a dual-ported RAM 512. In this example, the first address input 510 of the dual-ported RAM 512 is at least p bits wide. In some embodiments, the first primary hash function sub-circuit 504 may be configured to implement the functionality of a primary hash function F1. In some embodiments, the first primary hash function sub-circuit 504 may be implemented asp copies of the circuit shown in FIG. 3, using a bit matrix A1 and a bit vector y1. In this example, the lookup circuit 500 also includes a second primary hash function sub-circuit 514 that is configured to receive the key 502 at an input port 516 and to produce a p-bit output 518 that is connected to a second address input 520 of the dual-ported RAM 512. In this example, the second address input 520 of the dual-ported RAM 512 is at least p bits wide. In some embodiments, the second primary hash function sub-circuit 504 may be configured to implement the functionality of a primary hash function F2. In some embodiments, the second primary hash function sub-circuit 514 may be implemented as p copies of the circuit shown in FIG. 3, using a bit matrix A2 and a bit vector y2, where A2 may be the same as A1 or may be different from A1, and y2 may be the same as y1 or may be different from y1. As described in more detail herein, in some embodiments, one or both of the p×r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In this example, dual-ported RAM 512 contains at least $2^p$ words of memory, where each word holds at least n bits. In some embodiments, the dual-ported RAM 512 may be configured to operate, at a clock transition or other specific time, to read a memory word from an address selected by the p-bit bit string presented at the first address input 510, and to present n bits of data from that memory word to the first read-data output port 524. In this example, the dual-ported RAM 514 also includes a second read-data output port 526, and the dual-ported RAM may be configured to operate, at a clock transition or other specific time, to read a memory word from an address selected by the p-bit bit string presented at the second address input 520 and to present n bits of data from that memory word to the second read-data output port 526.

In the example illustrated in FIG. 5, the lookup circuit 500 includes n two-input XOR gates 522 (conventionally depicted by a single XOR-gate symbol with inputs labeled as having n bits each). In some embodiments, each of the n XOR gates includes two inputs that are connected (respectively) to corresponding bits of the first read-data output port 524 of the dual-ported RAM 512 and to corresponding bits of the second read-data output port 526 of the dual-ported RAM 512. The XOR gates 522 and the dual-ported RAM 512 may collectively be configured to implement the functionality of a specific secondary function G, namely the bitwise exclusive OR of the two n-bit strings obtained from the dual-ported RAM 512 by using the two p-bit bit strings presented (respectively) to the first address input 510 and the second address input 520 as addresses.

In an alternate embodiment of lookup circuit 500, the XOR gates 522 may be replaced by n two-input XNOR gates, also known as "equivalence" or "bi-conditional" gates, each of which produces the result "1" when its two input bits are the same, and the result "0" when its two input bits are different. In another alternate embodiment of lookup circuit 500, the XOR gates 522 may be replaced by an addition circuit that is configured to accept two n-bit inputs that are regarded as integers and to produce an n-bit output representing the sum of the inputs. In yet another alternate embodiment of lookup circuit 500, the XOR gates 522 may be replaced by a subtraction circuit that is configured to accept two n-bit inputs that are regarded as integers and to produce an n-bit output representing the difference of the inputs. In still other embodiments, the XOR gates 522 may be replaced by other circuits that are configured combine two n-bit inputs in any of a variety of ways that will allow the lookup circuit 500 to operate in a manner similar to that described herein.

In the lookup circuit 500, the n output bits of the XOR gates 522 are connected to an address input 528 of a single-ported RAM 530. In this example, the address input 528 of the single-ported RAM 530 is at least n bits wide. In this example, the single-ported RAM 530 contains at least z words of memory, each of which includes holds at least r+d bits. In some embodiments, z may be equal to $2^n$. In other embodiments, z may be smaller than $2^n$, and external circuitry, which may be under software control, may be configured to ensure that every bit string presented to address input 528 is a valid address that identifies a memory address within single-ported RAM 530. For example, in some embodiments, z may be equal to $3 \times 2^{n-2}$, and external circuitry, which may be under software control, may be configured to ensure that the two highest-order bits of every n-bit address presented to address input 528 are never both 1-bits. In still other embodiments, z may be larger than $2^n$, the XOR gates 522 may be replaced with a circuit that is configured to accept two n-bit inputs and to produce w output bits (where w is larger than n), and the address input 528 of single-ported RAM 530 may be at least w bits wide rather than at least n bits wide. In another embodiment, the XOR gates 522 may be replaced by a programmable circuit that is configured to select one of at least two different functions for combining two n-bit bit strings to produce a bit string to be presented to the address input 528.

In lookup circuit 500, the first write signal 532 is connected to a first write-enable input 534 of the dual-ported RAM 512, and the second write signal 536 is connected to a second write-enable input 538 of the dual-ported RAM 512. As noted above, the lookup circuit 500 includes an n-bit index input signal 540 that is connected to each of a first write-data input port 542 of the dual-ported RAM 512 and a second write-data input port 544 of the dual-ported RAM 512. The dual-ported RAM 512 may be configured to operate, at a clock transition or other specific time, to accept data from the first write-data input port 542 and to write that data into a memory word at an address selected by the p-bit bit string presented at the first address input 510 of the dual-ported RAM 512, provided that the first write enable input 542 of the dual-ported RAM 512 is true. However, if the first write-enable input 542 of the dual-ported RAM 512 is false, then the data from the first write-data input port 542 of the dual-ported RAM 512 will not be written to the memory. Similarly, the dual-ported RAM 512 may be configured to operate, at a clock transition or other specific time, to accept data from the second write-data input port 544 and to write that data into a memory word at an address selected by the p-bit bit string presented at the second address input 520 of the dual-ported RAM 512, provided that the second write enable input 544 of the dual-ported RAM 512 is true. However, if the second write-enable input 544 of the dual-ported RAM 512 is false, then the data from the second write-data input port 544 of the dual-ported RAM 512 will not be written to the memory. In some embodiments, the lookup circuit 500 may be operated in a manner such that the first write signal 532 and the second write signal 536 are never both true at the same time.

In the example illustrated in FIG. 5, the lookup circuit 500 includes a third single-bit write signal 546 that is connected to a write-enable input 548 of the single-ported RAM 530. As noted above, the lookup circuit 500 includes r+d bits of key/data input information 550 that is connected to a write-data input port 552 of the single-ported RAM 530. The single-ported RAM 530 may be configured to operate, at a clock transition or other specific time, to accept data from the write-data input port 552 and to write that data into a memory word at an address selected by the n-bit bit string presented at the address input 528 of the single-ported RAM 530, provided that the write enable input 548 of the single-ported RAM 530 is true. However, if the write-enable input 548 of the single-ported RAM 530 is false, then the data from the write-data input port 552 of the dual-ported RAM 530 will not be written to the memory.

In this example, the single-ported RAM 530 may also be configured to operate, at a clock transition or other specific time, to read a memory word from an address selected by the n-bit bit string presented at the first address input 510, and to present r+d bits of data from that memory word to a read-data output port 554 of the single-ported RAM 530. From the read-data output port 554 of the single-ported RAM 530, the rightmost d bits are connected to a d-bit associated data output 556 of the lookup circuit 500.

In the example illustrated in FIG. 5, the lookup circuit 500 includes an r-bit comparator 558 that includes a first input port connected to the key input 502 and a second input port connected to the leftmost r bits of the read-data output port 554 of the single-ported RAM 530. In this example, comparator 558 may be configured to produce a single-bit output signal indicating whether its two input ports have matching data, and the single-bit output signal of the comparator 558 is connected to the validity signal 560 of the lookup circuit 500.

In some embodiments, the comparator 558 may be configured to produce true for the validity signal if, and only if, the read-data output port 554 is presenting r+d bits of data of which the leftmost r bits match the input key 502.

In some embodiments, the comparator 558 may be configured to compare two keys and to deliver a true signal if and only if the bit strings presented to its two input ports match exactly. In an alternate embodiment, the comparator 558 may be configured to deliver a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure.

In some embodiments, external circuitry, which may be under software control, may be configured to alter the secondary combining function G by writing new index information to one or more memory locations in the dual-ported RAM 512 by presenting the key to key input 502, presenting index data to index input 540, and presenting a true signal to the first write signal 532. In such embodiments, in response to receiving these inputs, the lookup circuit 500 may be configured to operate, at a clock transition or other specific time, to write the index data presented to the index input 540 to a memory location determined by the first primary hash function sub-circuit 504 from the key 502. Similarly, external circuitry, which may be under software control, may also be configured to write a specific key-value pair to another (possibly different) memory location in the dual-ported RAM 512 by presenting the key to key input 502, presenting index data to index input 540, and presenting a true signal to the second write signal 536. In response to receiving these inputs, the lookup circuit 500 may be configured to operate, at a clock transition or other specific time, to write the index data presented to the index input 540 to a memory location determined by the second primary hash function sub-circuit 514 from the key 502.

In some embodiments, external circuitry, which may be under software control, may be configured to write a specific key-value pair to a memory location in the single-ported RAM 530 by presenting the key to key input 502, presenting the key and value together to key/data input 550, and presenting a true signal to the third write-enable input 546. In response to receiving these inputs, the lookup circuit 500 may be configured to operate, at a clock transition or other specific time, to write the key-value pair presented to the key-data input 550 to a memory location determined by the first primary hash function sub-circuit 504, the second primary hash function sub-circuit 514, the dual-ported RAM 512, and the XOR gates 522, dependent on the key 502. In some embodiments, the d bits of associated data may be changed for a single key-value pair already recorded in the lookup circuit 500 simply by writing a new key-value pair that happens to have the same key as before in the manner described above.

In some embodiments, external circuitry, which may be under software control, may be configured to effectively delete a specific key-value pair from a memory location in the single-ported RAM 530 by presenting the key to key input 502, presenting a different key and an arbitrary value together to key/data input 550, and presenting a true signal to the third write-enable input 546. In this case, the lookup circuit 500 may be configured to operate, at a clock transition or other specific time, to write the different key and the arbitrary value presented to the key-data input 550 to a memory location determined by the first primary hash function sub-circuit 504, the second primary hash function sub-circuit 514, the dual-ported RAM 512, and the XOR gates 522, dependent on the key 502. Note that if the different key is chosen to be a specific bit pattern that will not match any key intended to be presented as key input 502, then the contents of the memory word after it is written will not match the input key 502 on any future lookup request.

In some embodiments, external circuitry, which may be under software control, may be configured to effectively query the lookup circuit 500 to find out whether it contains associated data for a specific key k by presenting the key k to key input 502. In this case, the lookup circuit 500 may be configured to operate, at a clock transition or other specific time, to examine a first memory location within the dual-ported RAM 512 determined by the first primary hash function sub-circuit 504 from the key 502, and also to examine a second memory location within the dual-ported RAM 512 determined by the second primary hash function sub-circuit 514 from the key 502. The lookup circuit 500 may be further configured to combine the contents of the two examined memory locations within the dual-ported RAM 512 by using XOR gates 522 to produce a new value to be presented to the address input 528 of the single-ported RAM 530. In response to receiving this new value at address input 528, the lookup circuit 500 may be configured to examine a memory location within the single-ported RAM 530 determined by the value presented to the address input 528 of the single-ported RAM 530. In some embodiments, the lookup circuit 500 may be further configured to operate, using the comparator 558, to assert true for validity signal 560 if, and only if, the examined memory location within the single-ported RAM 530 contains a key (e.g., in the leftmost r bits) that matches key input 502. The lookup circuit 500 may also operate to deliver to associated data output 556 the rightmost d bits of the examined memory location within the single-ported RAM 530. In such embodiments, if validity signal 560 is true, then the associated data output 556 will present a d-bit value that is part of a key-value pair stored in the memory of the single-ported RAM 530 whose key matches the key presented to key input 502.

In some embodiments, lookup circuit 500 (and/or other ones of the lookup circuits described herein) may be intended for use within a larger system that makes appropriate decisions as to whether to assert the first write signal 532 or the second write signal 536 when storing index data into the dual-ported RAM 512 of the lookup circuit 500. For example, external circuitry, which may be under software control, may be configured to implement a loading process to load a collection of key-value pairs into a memory in the lookup circuit. Because index information related to a given key can be stored into only one of two memory locations within the dual-ported RAM 512, and because the primary hash functions may hash different keys into the same p-bit bit string, not every set of keys, and therefore not every set of key-value pairs, can be successfully stored in its entirety into the lookup circuit 500. However, in embodiments in which a collection of valid key-value pairs can be successfully stored into the lookup circuit 500, then the lookup circuit 500 can be used to perform queries directed to those key-value pairs rapidly, e.g., in constant time.

In some embodiments, the primary hash function sub-circuits 504 and 514 may be "hard-wired," that is, fixed and unchanging. For example, each of them may be implemented as a hardware circuit such as the one illustrated in FIG. 3. In an alternate embodiment, the primary hash function sub-circuits 504 and 514 may be implemented according to Equation 1 shown above, but using a circuit that includes a writable memory that contains information specifying the bit matrix A and the bit vector y. In another alternate embodiment, the primary hash function sub-circuits 504 and 514 may be implemented in a manner other than that specified in Equation 1 shown above, using a circuit that includes a writable memory that allows the precise behavior of the primary hash function sub-circuits to be altered under external control. In various alternate embodiments, external software may be configured to examine a set of key-value pairs, choose a pair of primary hash functions, update the writable memory associated with each of the primary hash function sub-circuits 504 and 514 so that they will operate in a manner consistent with the chosen hash functions, and then proceed to write the index data into the memory of the dual-ported RAM 512 and to write the key-value pairs into the memory of the single-ported RAM 530. In some embodiments, this approach may allow a greater number of sets of key-value pairs to be successfully handled by the lookup circuit 500 than in some existing lookup circuits because the behavior of the hash functions may be customized for any particular set of key-value pairs.

Note that in various embodiments of the lookup circuits described herein, index values suitable for storing into the dual-ported RAM 512 may be computed using any of a variety of suitable techniques. For example, in one embodiment, index values suitable for storing into the dual-ported RAM 512 may be computed using the methods of an algorithm developed by Fabiano C. Botelho, David Menoti and Nivio Ziviani (which is referred to herein as the BMZ algorithm). In another embodiment, z is equal to $2^n$, and index values suitable for storing into the dual-ported RAM 512 may be computed using a graph-construction strategy. For example, a set S of key-value pairs may be converted into a mathematical graph that includes one edge for each key-value pair and one node for each distinct value among all the values that can be produced by applying either of the hash functions F1 and F2 to any key in the set S of key-value pairs. In this example, each edge may connect the two nodes that correspond to the two hash values produced by applying the hash functions F1 and F2 to the key of the key-value pair that corresponds to that edge. If the resulting graph includes a cycle, then the procedure may be configured to report a failure. However, if the resulting graph is acyclic, then a suitable set of index values may be created by first assigning addresses to edges of the graph and then assigning index values to nodes of the graph.

In the first step, each edge may be assigned any n-bit string suitable for addressing the single-ported RAM 530, as long as distinct edges are assigned distinct bit strings. In the second step, any one node may be chosen arbitrarily and assigned an arbitrary n-bit index value (for example, the bit pattern that is all 0-bits). In this example, as long as the graph contains at least one edge that connects a node that has not yet been assigned an index value to a node that has already been assigned an index value, the following steps are repeated: any one edge (which may be referred to as "e") that connects a node (which may be referred to as "n1") that has not yet been assigned an index value to a node (which may be referred to as "n2") that has already been assigned an index value may be arbitrarily chosen, then the n-bit bit string that is the bitwise XOR of the index value already assigned to n2 and the n-bit bit string assigned to e may be assigned to n1.

In some embodiments, because this graph is acyclic, this procedure will assign an index value to every node of the graph, and each node will be assigned exactly one index value. The index value assigned to each node may then be stored into a memory location in the dual-ported RAM 512 whose address is the hash value to which that node corresponds. In some embodiments, if a key belonging to one of the key-value pairs in the set S is presented to the key input 502, the lookup circuit 500 may be configured to compute two hash values that correspond to the two distinct nodes in the graph connected by the edge corresponding to that key-value pair, and to fetch from the dual-ported RAM 512 the two index values that were assigned to those two nodes. The lookup circuit may then use XOR gates 522 to compute the n-bit address that was assigned to the edge corresponding to that key-value pair.

In this example, because each edge was assigned a distinct n-bit bit pattern, each key will identify a different memory location within the single-ported RAM 530. Therefore, all the key-value pairs in the set S can be stored into distinct memory locations within the single-ported RAM 530, and if a key belonging to one of the key-value pairs in the set S is presented to the key input 502, the lookup circuit 500 will deliver the data associated with that key to the associated data output 556, and assert true for the validity signal 560. In some embodiments, if all of the other locations within the single-ported RAM 530 are written with key-value pairs whose key is a bit pattern not matching any key in the set of key-value pairs S, then if a key not belonging to one of the key-value pairs in the set S is presented to the key input 502, the lookup circuit 500 may be configured to assert false for the validity signal 560. Note that a variety of other strategies may be used for computing index values to be used with the lookup circuit 500, in other embodiments.

In some embodiments of the lookup circuits described herein, for each input key that is received, two hash function sub-circuits may be configured to apply respective hash functions to the key, and the resulting hash values may be used to look up data stored in two locations in the memory. The lookup circuit may include a selection sub-circuit (sometimes referred to herein as a selector) that chooses one of those two pieces of data to be provided as an output of the lookup circuit. In some embodiments, the selection of one of the two pieces of data may be controlled by (or at least dependent on) the output of a comparator that is also used in deriving a validity signal, as described herein. In some embodiments, the lookup circuit may include a dual-ported memory (e.g., a dual-ported RAM) in which valid data is stored along with the key with which it is associated. In such embodiments, the two pieces of data are retrieved from the dual-ported memory by presenting each of the two hash values at a different one of the two input ports of the memory, and each of the two key/value pairs is output at a corresponding one of the two output ports of the memory. As previously noted, in some embodiments, at most one of the two pieces of data will include (or be associated with) a key that matches the input key. In such embodiments, the loading process will have chosen to store the data (and also, in some cases, the key) for that key-value pair in one of the two locations identified by the two hash values computed for the input key, and the other location may store data associated with another key that happens to hash to one of the same hash values as the input key.

In some embodiments, in order to determine which of the two pieces of data to provide as an output, the lookup circuit may be configured to determine which of the two locations identified by hashes of the input key contains a key that matches the input key (i.e., which of the two locations is the one into which the loading process decided to store the key-value pair corresponding to the input key). Note that because the loading process described herein results in two (or more) potential locations in which to store data for each key-value pair, in some embodiments, lookup circuits that employ this approach may be able to store data for more keys than lookup circuits that employ other loading schemes. For example, in some other lookup circuits in which multiple keys can hash to the same value (but in which there can be only one location per hashed value), when the loading process attempts to store data for a particular key-value pair in a location identified by a hash of its key, data associated with another key might already be stored there.

In some embodiments of the lookup circuits described herein, when an input key is presented to the circuit, it may be fed to two hash function sub-circuits, the outputs of which will identify respective locations in memory (e.g., in a lookup table or other data structure configured to store information for key-value pairs). In some such embodiments, the identified locations will always (or nearly always) be two different locations. In these embodiments, if the input key and its associated data are stored in the table, the loading process will see to it that they will be stored in one of the two locations that are identified by the outputs of the two hash function sub-circuits. However, because of the nature of hash functions, there may be some chance that the two hash functions will collide. If they do collide, data will be read from the same location twice (e.g., using the identical hash values computed by both hash functions). Note that if there are too many keys in the set of valid key-value pairs that hash to the same hash values (and memory locations), the loading function may fail and a different pair of hash functions may need to be implemented in the lookup circuit to handle the set of valid key-value pairs. In other words, there may be a trade-off to be made in that if there are not too many collisions, the loading process described herein (one that includes the application of multiple hash functions to each input key) may allow a lookup circuit to succeed where another (e.g., a lookup circuit that implements only use one hash function) would not.

Figure 6:
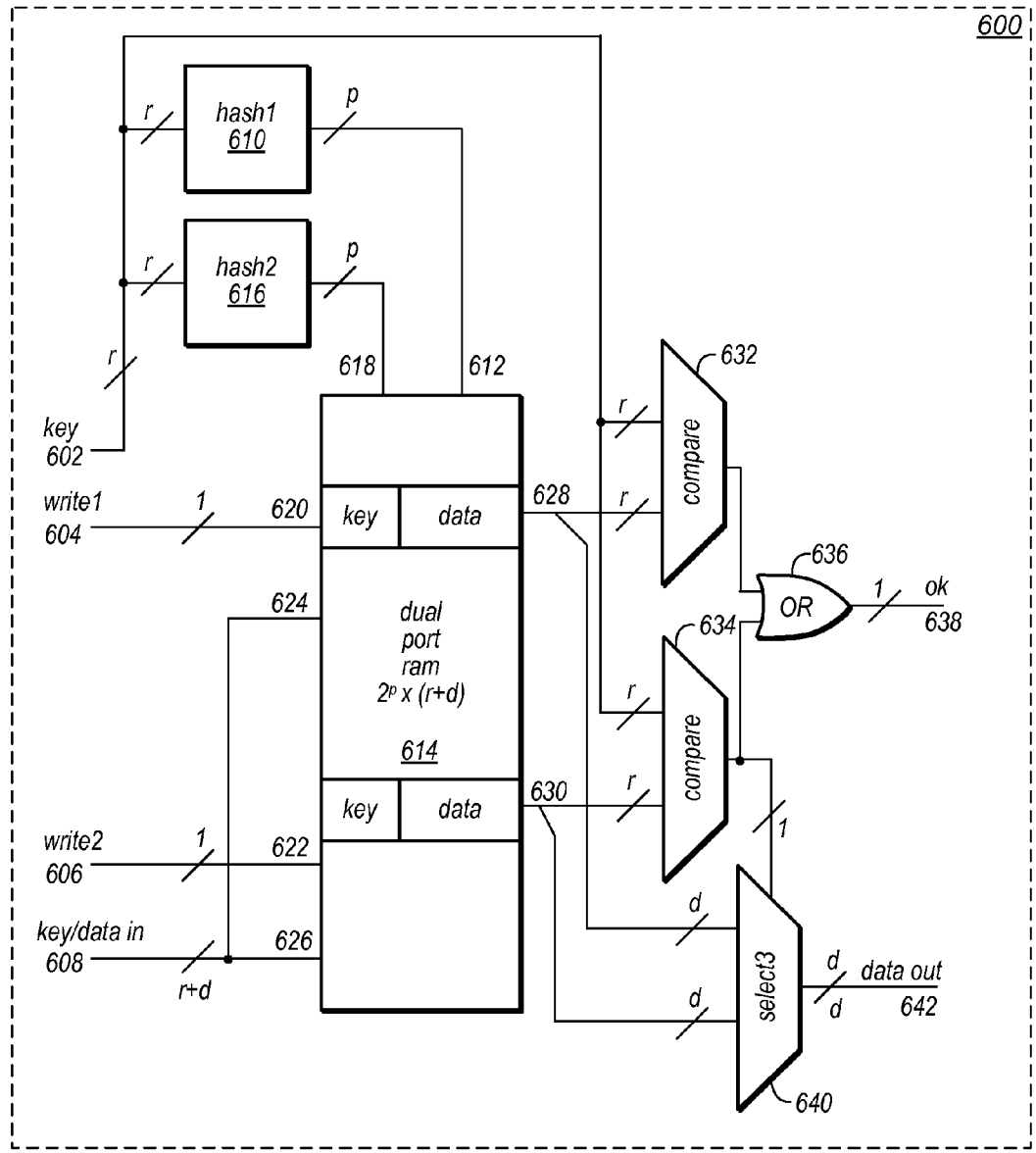
FIG. 6 is a block diagram illustrating a lookup circuit that accepts inputs and produces outputs similar to those accepted and produced by the abstract lookup circuit illustrated in FIG. 4, according to another embodiment.

FIG. 6 is a block diagram illustrating a lookup circuit that is configured to accept inputs and to produce outputs that are similar to those accepted and produced by the abstract circuit 402 shown in FIG. 4, according to another embodiment. In this example, lookup circuit 600 is configured to accept as an input a key 602 (a bit string of length r), corresponding to the input key 404 of FIG. 4. The lookup circuit 600 is also configured to accept a first single-bit write signal 604 and a second single-bit write signal 606, which together correspond to the write signals 410 of FIG. 4 (with w=2). In this example, lookup circuit 600 is also configured to accept r+d bits of key/data input information 608, corresponding to the key/data inputs 412 of FIG. 4.

The lookup circuit 600 includes a first hash function sub-circuit 610 that is configured to accept the key 602 and to produce a p-bit output that is connected to a first address input 612 of a dual-ported RAM 614. In this example, the first address input 612 of the dual-ported RAM 614 is at least p bits wide. In some embodiments, the first hash function sub-circuit 610 may be implemented as p copies of the circuit shown in FIG. 3, using a bit matrix A1 and a bit vector y1. In this example, the lookup circuit 600 also includes a second hash function sub-circuit 616 that is configured to accept the key 602 and to produce a p-bit output that is connected to a second address input 618 of the dual-ported RAM 614. In this example, the second address input 618 of the dual-ported RAM 614 is at least p bits wide. In some embodiments, the second hash function sub-circuit 616 may be implemented as p copies of the circuit shown in FIG. 3, using a bit matrix A2 and a bit vector y2, where A2 may be the same as A1 or may be different from A1, and y2 may be the same as y1 or may be different from y1. As described in more detail herein, in some embodiments, one or both of the p×r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In lookup circuit 600, the first write signal 604 is connected to a first write-enable input 620 of the dual-ported RAM 614, and the second write signal 606 is connected to a second write-enable input 622 of the dual-ported RAM 614. In this example, the r+d bits of key/data input information 608 are connected to each of a first write-data input port 624 of the dual-ported RAM 614 and a second write-data input port 626 of the dual-ported RAM 614. In this example, dual-ported RAM 614 contains at least $2^p$ words of memory, where each word holds at least r+d bits. In some embodiments, a dual-ported RAM such as 614 dual-ported RAM may be configured to operate, at a clock transition or other specific time, to accept data from the first write-data input port 624 and to write that data into a memory word at an address selected by the p-bit bit string presented at the first address input 612, provided that the first write enable input 620 is true. However, if the first write-enable input 620 is false, then the data from the first write-data input port 624 will not be written to the memory. Similarly, the dual-ported RAM 614 may be configured to operate, at a clock transition or other specific time, to accept data from the second write-data input port 626 and to write that data into a memory word at an address selected by the p-bit bit string presented at the second address input 618, provided that the second write enable input 622 is true. However, if the second write-enable input 620 is false, then the data from the second write-data input port 626 will not be written to the memory. In some embodiments, the lookup circuit 600 may be operated in a manner such that the first write signal 604 and the second write signal 606 are never both true at the same time.

In lookup circuit 600, the dual-ported RAM 614 includes a first read-data output port 628, and the dual-ported RAM 614 may be configured to operate, at a clock transition or other specific time, to read a memory word from an address selected by the p-bit bit string presented at the first address input 612, and to present r+d bits of data from that memory word to the first read-data output port 628 (where the leftmost r bits represent the key of a key-value pair and the remaining d bits represent the corresponding data for the key-value pair). In this example, the dual-ported RAM 614 also has a second read-data output port 630, and the dual-ported RAM 614 may be configured to operate, at a clock transition or other specific time, to read a memory word from an address selected by the p-bit bit string presented at the second address input 618 and to present r+d bits of data from that memory word to the second read-data output port 630 (wherein, again, the leftmost r bits represent the key of a key-value pair and the remaining d bits represent the corresponding data for the key-value pair).

In this example, the lookup circuit 600 includes two comparators that are configured to determine whether a key-value pair corresponding to the input key is stored in the dual-ported RAM 614. For example, lookup circuit 600 includes a first r-bit comparator 632 that has a first input port connected to the key input 602 and a second input port connected to the leftmost r bits of the first read-data output port 628 of the dual-ported RAM 614. In this example, comparator 632 may be configured to produce a single-bit signal indicating whether its two input ports have matching data. In this example, lookup circuit 600 includes a second r-bit comparator 634 that has a first input port connected to the key input 602 and a second input port connected to the leftmost r bits of the second read-data output port 630 of the dual-ported RAM 614. In this example, comparator 634 may be configured to produce a single-bit signal indicating whether its two input ports have matching data. As illustrated in FIG. 6, the lookup circuit 600 also includes a two-input OR gate 636 whose inputs are connected to the respective output signals of comparator 632 and comparator 634. In this example, the output of the OR gate 636 is the validity signal 638 of the lookup circuit 600, which may correspond to the validity signal 406 in FIG. 4. In this example, the comparator 632, the comparator 634, and the OR gate 636 may be configured to produce a value of true for the validity signal 638 if and only if either of the read-data output port 628 and the read-data output port 630 is presenting r+d bits of data of which the leftmost r bits match the input key 602.

In the example, illustrated in FIG. 6, if either of the locations within dual-ported RAM 614 identified by address inputs 612 and 618 contains a key that matches the input key 602, then that location must contain the correct data for the input key 602. In some embodiments, the key-value information may be loaded into the memory in a manner such that the correct data associated with every valid key will be stored in dual-ported RAM 614. In such embodiments, if the input key 602 does not match any valid key in the dual-ported RAM 614 (i.e., if the input key 602 does not match the key in either of the locations identified by the results of the two hash functions), the validity signal 638 will be false, indicating that there is no entry in the lookup circuit for that key. This may mean that an invalid key was presented, since all valid keys should be represented in the memory. In some embodiments, if the validity signal 638 is true, then at least one of the comparators (i.e., 632 and/or 634) found a match. Note that in some embodiments, comparators 632 and 634 might both find a match in the rare case that the two hash functions map to the same location in the memory. However, this may still result in outputting the correct output data (shown as 642), assuming that the key stored in that location matches the input key 602.

In some embodiments, the comparator 632 may be configured to compare two keys by delivering a true signal if and only if the bit strings presented to its two input ports match exactly. In an alternate embodiment, the comparator 632 may be configured to compare two keys by delivering a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure. It will also be appreciated that similar alternatives may be used for the comparator 634.

As illustrated in FIG. 6, the lookup circuit 600 includes a selector 640. In this example, selector 640 has a first d-bit input port connected to the rightmost d bits of the first read-data output port 628 of the dual-ported RAM 614, a second d-bit input port connected to the rightmost d bits of the second read-data output port 630 of the dual-ported RAM 614, and a single-bit control signal connected to the output signal of the second comparator 634. In this example, the output of the selector 640 is the d-bit associated data output 642 of the lookup circuit 600, corresponding to the associated data output 408 in FIG. 4. In some embodiments, selector 640 and comparator 634 may be configured to deliver the rightmost d bits of the second read-data output port 630 of the dual-ported RAM 614 to the associated data output 642 whenever the key 602 matches the leftmost r bits of the second read-data output port 630 of the dual-ported RAM 614, and to deliver the rightmost d bits of the first read-data output port 628 of the dual-ported RAM 614 to the associated data output 642 whenever the key 602 does not match the leftmost r bits of the second read-data output port 630 of the dual-ported RAM 614.

In some embodiments, external circuitry, which may be under software control, may be configured to write a specific key-value pair to a memory location in the dual-ported RAM 614 by presenting the key to key input 602, presenting the key and value together to key/data input 608, and presenting a true signal to the first write-enable input 604. In such embodiments, in response to receiving these inputs, the lookup circuit 600 may be configured to operate, at a clock transition or other specific time, to write the key-value pair presented to the key-data input 608 to a memory location determined by the first hashing function sub-circuit 610 from the key 602. Similarly, external circuitry, which may be under software control, may also be configured to write a specific key-value pair to another (possibly different) memory location in the dual-ported RAM 614 by presenting the key to key input 602, presenting the key and value together to key/data input 608, and presenting a true signal to the second write-enable input 606. In response to receiving these inputs, the lookup circuit 600 may be configured to operate, at a clock transition or other specific time, to write the key-value pair presented to the key-data input 608 to a memory location determined by the second hashing function sub-circuit 616 from the key 602.

In some embodiments, external circuitry, which may be under software control, may be configured to effectively delete a key-value pair from the memory in the dual-ported RAM 614 by presenting the key to key input 602, presenting a different key and an arbitrary value together to key/data input 608, and presenting a true signal to the first write-enable input 604. In this case, the lookup circuit 600 may be configured to operate, at a clock transition or other specific time, to write the different key and the arbitrary value presented to the key-data input 608 to a memory location determined by the first hashing function sub-circuit 610 from the key 602. External circuitry, which may be under software control, may also be configured to effectively delete a key-value pair from the memory in the dual-ported RAM 614 by presenting the key to key input 602, presenting a different key and an arbitrary value together to key/data input 608, and presenting a true signal to the second write-enable input 606. In this case, the lookup circuit 600 may be configured to operate, at a clock transition or other specific time, to write the different key and the arbitrary value presented to the key-data input 608 to a memory location determined by the second hashing function sub-circuit 616 from the key 602. In each case, if the different key is chosen to be a specific bit pattern that will not match any key intended to be presented as key input 602, then the contents of the memory word after it is written will not match the input key 602 on any future lookup request.

In some embodiments, external circuitry, which may be under software control, may be configured to effectively query the lookup circuit 600 to find out whether it contains associated data for a specific key k by presenting the key k to key input 602. In this case, the lookup circuit 600 may be configured to operate, at a clock transition or other specific time, to examine a first memory location within the dual-ported RAM 614 determined by the first hashing function sub-circuit 610 from the key 602, and also to examine a second memory location within the dual-ported RAM 614 determined by the second hashing function sub-circuit 616 from the key 602. The lookup circuit 600 may then operate to assert true for validity signal 638 if and only if either the first examined memory location or the second examined memory location contains a key (e.g., in the leftmost r bits) that matches key input 602. The lookup circuit 600 may also operate to deliver to associated data output 642 the rightmost d bits of the second examined memory location if and only if the second examined memory location contains a key (e.g., in the leftmost r bits) that matches key input 602. The lookup circuit 600 may also operate to deliver to associated data output 642 the rightmost d bits of the first examined memory location if and only if the second examined memory location contains a key (e.g., in the leftmost r bits) that does not match key input 602. In other words, if validity signal 638 is true, then the associated data output 642 will present a d-bit value that is part of a key-value pair in the memory of the dual-ported RAM 614 whose key matches the key presented to key input 602.

In some embodiments, lookup circuit 600 (and/or other ones of the lookup circuits described herein) may be intended for use within a larger system that makes appropriate decisions, for each key-value pair, as to whether to assert the first write-enable signal 604 or the second write-enable signal 606 when storing a key-value pair into the lookup circuit 600. For example, external circuitry, which may be under software control, may be configured to implement a loading process such as that described herein to load a collection of key-value pairs into a memory in the lookup circuit. Because each key-value pair can be stored into only one of two memory locations, not every set of key-value pairs can be successfully stored in its entirety into the lookup circuit 600. However, in embodiments in which a collection of valid key-value pairs can be successfully stored into the lookup circuit 600, then the lookup circuit 600 can be used to perform queries directed to those key-value pairs rapidly, e.g., in constant time.

Note that in some embodiments, the hash function sub-circuits 610 and 616 may be "hard-wired," that is, fixed and unchanging. For example, each of them may be implemented as a hardware circuit such as the one illustrated in FIG. 3. In an alternate embodiment, the hash function sub-circuits 610 and 616 may be implemented according to Equation 1 shown above, but using a circuit that includes a writable memory that contains information specifying the bit matrix A and the bit vector y. In another alternate embodiment, the hash function sub-circuits 610 and 616 may be implemented in a manner other than that specified in Equation 1 shown above, using a circuit that includes a writable memory that allows the precise behavior of the hash function sub-circuits to be altered under external control. In various alternate embodiments, external software may be configured to examine a set of key-value pairs, choose a pair of hash functions suitable for use in evaluating those key-value pairs, update the writable memory associated with each of the hash function sub-circuits 610 and 616 so that they will operate in a manner consistent with the chosen hash functions, and then proceed to write the key-value pairs into the memory of the dual-ported RAM 614. In some embodiments, this approach may allow a greater number of sets of key-value pairs to be successfully handled by the lookup circuit 600 than in existing lookup circuits because the behavior of the hash functions may be customized for any particular set of key-value pairs.

Note that, in some embodiments, the first primary hash function sub-circuit 504 and the second primary hash function sub-circuit 514 of lookup circuit 500 may both lie on the "critical path" for fetching associated data from lookup circuit 500, because access to that data requires completion of the computation of both primary hash functions. Similarly, the first hash function sub-circuit 610 and the second hash function sub-circuit 616 of lookup table 600 may both lie on the "critical path" for fetching associated data from lookup circuit 600, because access to that data requires completion of the computation of both hash functions. For either of these lookup circuits, it may be desirable to use hash function sub-circuits that have very low latency in an attempt to lower the overall latency of the lookup circuit. As described in more detail below, hash function sub-circuits that implement multiplication with sparse bit matrices may be constructed for use in these and other lookup circuits and these hash function sub-circuits may compute hash functions with low latency using odd-parity circuits of various sizes.

In some embodiments, a lookup circuit such as the lookup circuit 500 or the lookup circuit 600 may be implemented as part of (or using) an FPGA device. Such an FPGA device may support the implementation of various forms of combinatorial circuitry by providing multiple instances of a general-purpose LUT (LookUp Table) circuit. One example of a general-purpose FPGA-based LUT that may be employed in various embodiments of the lookup circuits described herein is illustrated by the block diagram in FIG. 7. In this example, LUT circuit 702 may be representative of the types of LUT circuits included in FPGA products provided by various suppliers. In this example, LUT circuit 702 includes six input signals 704, an O6 output signal 706, and an O5 output signal 708. In various embodiments, LUT 702 may be programmed by external means to function in a number of ways. For example, when programmed in one particular way, the LUT may be configured to compute any single Boolean function, chosen at programming time, of six inputs. When used thereafter in ordinary operation, the LUT will operate to compute that pre-chosen Boolean function on the bits presented at the six input signals 704 and to present the one-bit result of that function as the O6 output signal 706. When programmed in another particular way, the LUT may be configured to compute any two Boolean functions, chosen at programming time, of five inputs. When used thereafter in ordinary operation, the LUT will operate to compute the two pre-chosen Boolean functions on the first five bits A1 through A5 of the six bits presented at the six input signals 704, to present the one-bit result of the first pre-chosen Boolean function as the O6 output signal 706 and to present the one-bit result of the second pre-chosen Boolean function as the O5 output signal 708.

Figure 7:
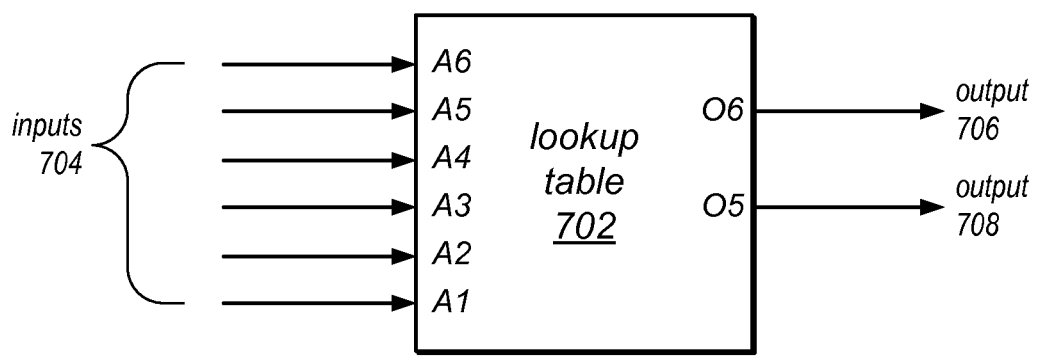
FIG. 7 is a block diagram illustrating a general-purpose FPGA-based lookup table circuit (LUT) that may be employed in the lookup circuits described herein, according to some embodiments.

In some embodiments of the lookup circuits described herein an LUT circuit such as the LUT circuit 702 illustrated in FIG. 7 may be programmed to compute the Boolean function "odd parity of 6", which produces the result "1" if an odd number of its six inputs is a 1-bit, but produces the result "0" if an even number of its six inputs is a 1-bit. Similarly, an LUT circuit such as LUT circuit 702 may be programmed to compute the Boolean function "even parity of 6", which produces the result "1" if an even number of its six inputs is a 1-bit, but produces the result "0" if an odd number of its six inputs is a 1-bit. In some embodiments, an LUT circuit such as LUT circuit 702 may be programmed to compute two Boolean functions, where the first Boolean function is a function that always produces "0" as its result, and the second Boolean function is an "odd parity of 5" function, which produces the result "1" if an odd number of its five inputs is a 1-bit, but produces the result "0" if an even number of its five inputs is a 1-bit. Similarly, an LUT circuit such as LUT circuit 702 may be programmed to compute two Boolean functions, where the first Boolean function is the function that always produces "0" as its result, and the second Boolean function is an "even parity of 5" function, which produces the result "1" if an even number of its five inputs is a 1-bit, but produces the result "0" if an odd number of its five inputs is a 1-bit. In each of these cases, through such particular programming and use of the LUT circuit 702, the LUT circuit may compute these Boolean functions with a maximum of one "LUT delay".

Figure 8:
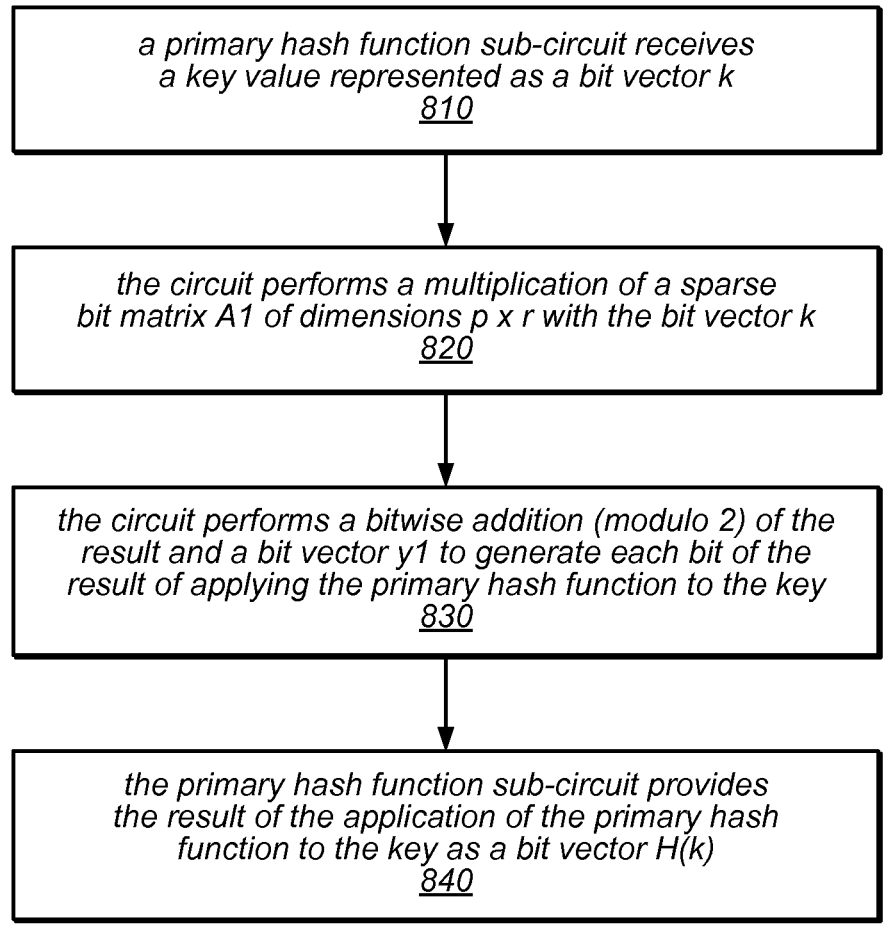
FIG. 8 is a flow diagram illustrating one embodiment of a method for evaluating a primary hash function.

One embodiment of a method for evaluating a primary hash function is illustrated by the flow diagram in FIG. 8. As illustrated in this example, the method may include a primary hash function circuit (which may be one of two or more primary hash function sub-circuits within a lookup circuit, in different embodiments) receiving a key value represented as a bit vector k (as in 810). As described herein, the primary hash function circuit may be dynamically configured to support different numbers of keys and/or to support keys of different sizes (e.g., at different times) without modifying the hardware circuitry (e.g., by updating the representation of the hash function that will be computed by the circuitry in a memory or other re-programmable component). In response to receiving the key value, the method may include the circuit performing a multiplication of a sparse bit matrix A1 of dimensions p×r with the bit vector k (as in 820). For example, the circuit may include multiple AND gates that are configured to perform the appropriate bit-wise multiplication operations.

As illustrated in this example, the method may include the circuit performing a bitwise addition (e.g., modulo 2) of the result and a bit vector y1 to generate each bit of the result of applying the primary hash function to the key (as in 830). For example, the circuit may include multiple XOR gates that are configured to combine the products of the bit-wise multiplication operations (e.g., to perform the appropriate bit-wise addition operations) to generate each element (bit) of the resulting matrix. The method may also include the primary hash function circuit providing the result of the application of the primary hash function to the key as a bit vector H(k), as in 840.

In some embodiments of the lookup circuits described herein, such as those that are implemented as part of (or using) an FPGA device, the FPGA device may support the implementation of various forms of combinatorial circuitry by providing multiple instances of an FGPA-based slice circuit, each of which may include multiple LUT circuits that may be similar to the LUT circuit 702 illustrated in FIG. 7. A portion of an FPGA-based slice circuit that may be employed in various embodiments of the lookup circuits described herein is illustrated by the block diagram in FIG. 9. In this example, slice circuit 900 may be representative of the types of slice circuits included in FPGA products provided by various suppliers. In this example, slice circuit 900 includes a first LUT circuit 902, a second LUT circuit 904, a third LUT circuit 906, and a fourth LUT circuit 908, each of which is a copy of, and identical in function to, the representative LUT circuit 702 illustrated in FIG. 7. In this example, the first LUT circuit 902 includes six input signals 910, an O6 output signal 912, and an O5 output signal 914, corresponding respectively to the six input signals 704, the O6 output signal 706, and the O5 output signal 708 of the representative LUT circuit 702. Similarly, the second LUT circuit 904 includes six input signals 916, an O6 output signal 918, and an O5 output signal 920; the third LUT circuit 906 includes six input signals 922, an O6 output signal 924, and an O5 output signal 926; and the fourth LUT circuit 908 includes six input signals 928, an O6 output signal 930, and an O5 output signal 932.

In this example, the slice circuit 900 includes a first programmable selector 934 whose first input is connected to the O5 output signal 914 of the first LUT circuit 902, and whose second input is connected to an AX input signal 936. Similarly, the slice circuit 900 includes a second programmable selector 938 whose first input is connected to the O5 output signal 920 of the second LUT circuit 904, and whose second input is connected to a BX input signal 940; the slice circuit 900 includes a third programmable selector 942 whose first input is connected to the O5 output signal 926 of the third LUT circuit 906, and whose second input is connected to a CX input signal 944; and the slice circuit 900 includes a fourth programmable selector 946 whose first input is connected to the O5 output signal 932 of the third LUT circuit 908, and whose second input is connected to a DX input signal 948. In this example, the slice circuit 900 includes a fifth programmable selector 950 whose first input is connected to the AX input signal 936, whose second input is connected to the constant signal 0, whose third input is connected to the constant signal 1, and whose fourth input is connected to a CIN input signal 952. In this example, each of the programmable selectors 934, 938, 942, 946, and 950 may be altered by an FPGA programming process to configure the selector so that its output signal behaves as if it were permanently connected to exactly one of its input signals, as chosen at the time of programming.

Figure 9:
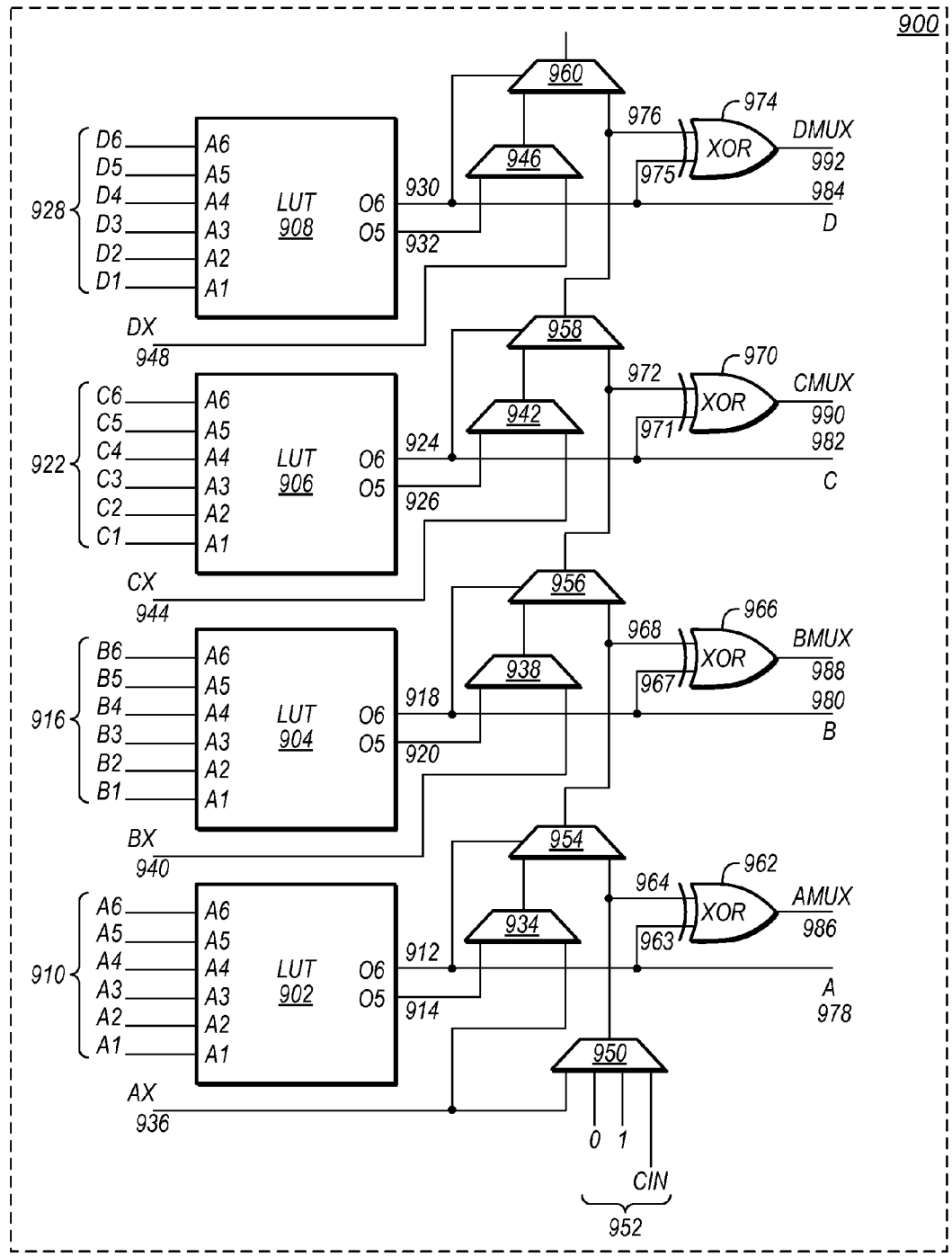
FIG. 9 is a block diagram illustrating a portion of a representative FPGA-based slice circuit that may be employed in the lookup circuits described herein, according to some embodiments.

In the example illustrated in FIG. 9, the slice circuit 900 includes a first dynamic selector 954 whose first data input is connected to the output signal of the first programmable selector 934, whose second data input is connected to the output signal of the fifth programmable selector 950, and whose control input is connected to the O6 output signal 912 of the first LUT circuit 902. Similarly, the slice circuit 900 includes a second dynamic selector 956 whose first data input is connected to the output signal of the second programmable selector 938, whose second data input is connected to the output signal of the first dynamic selector 954, and whose control input is connected to the O6 output signal 918 of the second LUT circuit 904; the slice circuit 900 includes a third dynamic selector 956 whose first data input is connected to the output signal of the third programmable selector 942, whose second data input is connected to the output signal of the second dynamic selector 956, and whose control input is connected to the O6 output signal 924 of the third LUT circuit 906; and the slice circuit 900 includes a fourth dynamic selector 960 whose first data input is connected to the output signal of the fourth programmable selector 946, whose second data input is connected to the output signal of the third dynamic selector 958, and whose control input is connected to the O6 output signal 930 of the fourth LUT circuit 908.

In this example, the slice circuit 900 includes a first XOR gate 962 whose first data input 963 is connected to the O6 output signal 912 of the first LUT circuit 902, and whose second data input 964 is connected to the output signal of the fifth programmable selector 950. Similarly, the slice circuit 900 includes a second XOR gate 966 whose first data input 967 is connected to the O6 output signal 918 of the second LUT circuit 904, and whose second data input 968 is connected to the output signal of the first programmable selector 954; a third XOR gate 970 whose first data input 971 is connected to the O6 output signal 924 of the third LUT circuit 906, and whose second data input 972 is connected to the output signal of the second programmable selector 956; and a fourth XOR gate 974 whose first data input 975 is connected to the O6 output signal 930 of the fourth LUT circuit 908, and whose second data input 976 is connected to the output signal of the third programmable selector 958.

In this example, the slice circuit 900 includes an A output signal 978 that is connected to the O6 output signal 912 of the first LUT circuit 902. Similarly, the slice circuit 900 includes a B output signal 980 that is connected to the O6 output signal 918 of the second LUT circuit 904; a C output signal 982 that is connected to the O6 output signal 924 of the third LUT circuit 906; and a D output signal 984 that is connected to the O6 output signal 930 of the fourth LUT circuit 908. The slice circuit 900 also includes an AMUX output signal 986 that is connected to the output signal of the first XOR gate 962, a BMUX output signal 988 that is connected to the output signal of the second XOR gate 966, a CMUX output signal 990 that is connected to the output signal of the third XOR gate 970, and a DMUX output signal 992 that is connected to the output signal of the fourth XOR gate 974.

Figure 10:
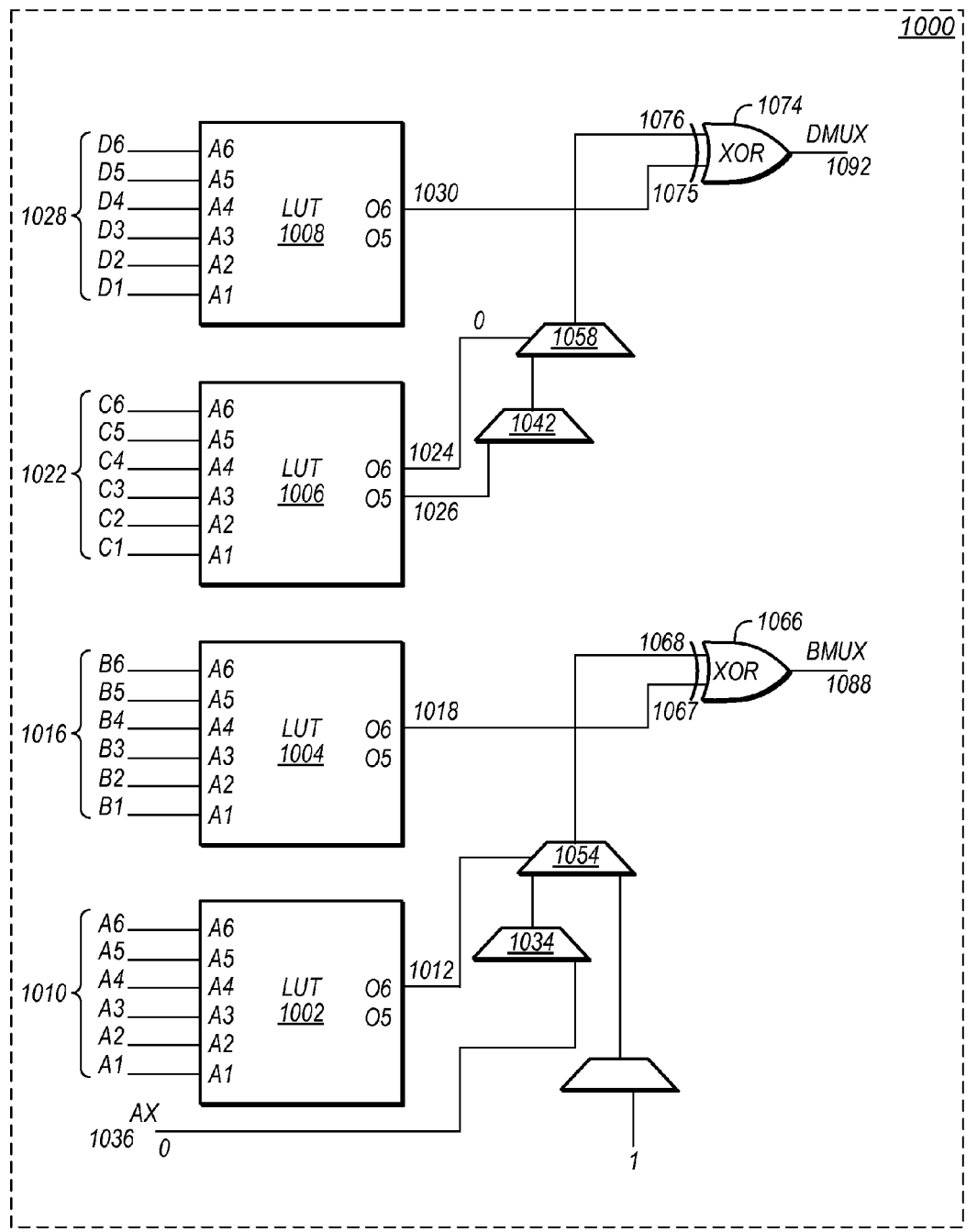
FIG. 10 is a block diagram illustrating a portion of a representative FPGA-based slice circuit that is programmed to function as two separate circuits that may be employed in the lookup circuits described herein, according to some embodiments.

In some embodiments of the lookup circuits described herein, an FPGA-based slice circuit, such as slice circuit 900 illustrated in FIG. 9, may be programmed to support fast carry-chain computations for the implementation of various adder and/or multiplier circuits, such as those used as described herein for computing hash values from input keys. For example, in some embodiments of the lookup circuits described herein, portions of a representative FPGA slice circuit (such as slice circuit 900) may be used to construct an odd-parity-of-12 circuit and/or an odd-parity-of-11 circuit. In various embodiments, the lookup circuits described herein may rely on relatively cheap odd parity circuits to find the odd parity in either six inputs, eleven inputs, or twelve inputs. For example, a 6-input odd-parity circuit may be implemented using a single lookup table circuit (LUT), such as one of the LUT circuits shown in FIG. 9, while FIG. 10 illustrates the construction of 11-input and 12-input circuits. In some embodiments, all three of these circuits have a latency of one FPGA building block, e.g., one "LUT delay". Note that each of these circuits computes one hash bit based on an input key. For example, to compute a hash function whose output has twelve bits, a hash function sub-circuit may include twelve of these circuits, each of which accepts at least some of the bits of the input key (e.g., particular ones of the bits).

In some embodiments, each of these circuits may accept as inputs fewer than all of the bits of the input key, in different combinations. In embodiments in which the inputs accepted by each of the odd-parity circuits in a hash function sub-circuit reflects the content of a sparse bit matrix, the amount of hardware required to implement the hash function and the latency of the hash function may be reduced, when compared to existing hashing circuits. For example, if each row of a particular sparse bit matrix includes at most six 1-bits or at most twelve 1-bits, the odd-parity circuits of the hash function sub-circuit may only need to inspect at most that many bits of the input key. In other words, each 1-bit in the matrix may be represented by a wire (or may require a wire) and may correspond to one bit of a key that must be inspected. However, wherever a bit in the matrix is zero, this zero may be ANDed with the input for that bit of the key, meaning that the input bit is, in effect, not being used.

In some embodiments, a slice circuit such as the slice circuit 900 illustrated in FIG. 9 may be configured (e.g., through programming) to function as two separate circuits, where one circuit is an odd-parity-of-12 circuit and the other circuit is an odd-parity-of-11 circuit. A portion of a representative FPGA-based slice circuit that is programmed to function as two separate circuits that may be employed in some embodiments of the lookup circuits described herein is illustrated by the block diagram in FIG. 10. In this example, FIG. 10 depicts a copy of the slice circuit 900 illustrated in FIG. 9, with certain elements omitted and with the remaining elements numbered in corresponding fashion. For example, the first LUT circuit 1002 of the slice circuit 1000 illustrated in FIG. 10 corresponds to the first LUT circuit 902 of the slice circuit 900 illustrated in FIG. 9, and so on.

In the example slice circuit illustrated in FIG. 10, the LUT circuits 1002 and 1004, the programmable selectors 1034 and 1050, the dynamic selector 1054, and the XOR gate 1066 may be configured (e.g., through programming of the FGPA device) to function (collectively) as an odd-parity-of-12 circuit whose twelve inputs are the six input signals 1010 of the first LUT circuit 1002 together with the six input signals 1016 of the second LUT circuit 1004, and whose output signal is the BMUX output signal 1088. In this example, in order to implement this odd-parity-of-12 circuit, the programmable selector 1034 (which corresponds to selector 934 in FIG. 9) may be programmed to connect its output signal to its second input signal; and its second input signal may be connected to the AX input signal 1036. In addition, the AX input signal 1036 may be connected (by means of FPGA programming) to a source of the constant signal 0; and the programmable selector 1050 may be programmed to connect its output signal to its third input signal, which is the constant signal 1. Furthermore, the first LUT circuit 1002 may be programmed to operate as an odd-parity-of-6 circuit; and the second LUT circuit 1004 may also be programmed to operate as an odd-parity-of-6 circuit.

In this example, the programmable selector 1034, when programmed as described, is configured to present a constant 0 signal to the first input of the dynamic selector 1054, and the programmable selector 1050, when programmed as described, is configured to present a constant 1 signal to the second input of the dynamic selector 1054. Therefore, the output signal of the dynamic selector 1054 will always be the same as the control signal of the dynamic selector 1054, and the dynamic selector 1054 will operate to connect the second input 1068 of the XOR gate 1066 to the O6 output signal 1012 of the first LUT circuit 1002. In addition, the first input 1067 of the XOR gate 1066 is connected to the O6 output signal 1018 of the second LUT circuit 1004. In some embodiments of the lookup circuits described herein, connecting two odd-parity-of-6 circuits to the inputs of an XOR gate (as in this example) may produce a circuit that functions overall as an odd-parity-of-12 circuit.

In the example slice circuit illustrated in FIG. 10, the LUT circuits 1006 and 1008, the programmable selectors 1042, the dynamic selector 1058, and the XOR gate 1074 may be configured (e.g., through programming of the FGPA device) to function (collectively) as an odd-parity-of-11 circuit whose eleven inputs are the first five input signals C1, C2, C3, C4, and C5 of the six input signals 1022 of the third LUT circuit 1006 together with the six input signals 1028 of the fourth LUT circuit 1008, and whose output signal is the DMUX output signal 1092. In this example, in order to implement this odd-parity-of-11 circuit, the programmable selector 1042 may be programmed to connect its output signal to its first input signal, which is connected to the O5 output signal 1026 of the third LUT circuit 1006; and the third LUT circuit 1006 may be programmed to operate as two Boolean functions, a first one producing the constant signal 0 to the O6 output signal 1024 of the third LUT circuit 1006 and a second one that computes odd-parity-of-5 on the first five input signals C1, C2, C3, C4, and C5 of the six input signals 1022 of the third LUT circuit 1006 and delivers that result to the O5 output signal 1026 of the third LUT circuit 1006. In addition, the fourth LUT circuit 1008 may be programmed to operate as an odd-parity-of-6 circuit.

In this example, the programmable selector 1042, when programmed as described, is configured to connect the O5 output signal 1026 of the third LUT circuit 1006 to the first input of the dynamic selector 1054; and the third LUT circuit, when programmed as described, is configured to present a constant 0 signal to the control input of the dynamic selector 1058. Therefore, the dynamic selector 1058 will operate to connect the second input 1076 of the XOR gate 1074 to the O5 output signal 1026 of the third LUT circuit 1006. In addition, the first input 1075 of the XOR gate 1074 is connected to the 06 output signal 1030 of the fourth LUT circuit 1008. In some embodiments of the lookup circuits described herein, connecting an odd-parity-of-6 circuit and an odd-parity-of-5 circuit to the inputs of an XOR gate may produce a circuit that functions overall as an odd-parity-of-11 circuit.

In some embodiments, through such particular programming and use of a general-purpose FPGA slice circuit, the slice circuit may compute odd-parity-of-12 and odd-parity-of-11 functions with a maximum of one "slice delay".

In some embodiments, odd-parity circuits with a large number of inputs may be constructed in multiple layers by cascading odd-parity circuits having a smaller number of inputs. For example, in some embodiments, an odd-parity-of-36 circuit may be built in two layers by cascading odd-parity-of-6 circuits. One embodiment of an odd-parity-of-36 circuit comprising a two-level hierarchy of odd-parity-of-6 circuits is illustrated by the block diagram in FIG. 11. In this example, odd-parity-of-36 circuit 1100 is configured to accept 36 input signals 1102 and to produce an output signal 1118 that is 1 if an odd number of the input signals 1102 are 1, but is 0 if an even number of the input signals 1102 are 1.

In this example, the odd-parity-of-36 circuit 1100 includes a first odd-parity-of-6 circuit 1104, a second odd-parity-of-6 circuit 1106, a third odd-parity-of-6 circuit 1108, a fourth odd-parity-of-6 circuit 1110, a fifth odd-parity-of-6 circuit 1112, a sixth odd-parity-of-6 circuit 1114, and a seventh odd-parity-of-6 circuit 1116. Each of the odd-parity-of-6 circuits includes six input signals and one output signal. In this example, the 36 collective input signals of the first six odd-parity-of-6 circuits 1104, 1106, 1108, 1110, 1112, and 1114 are connected in bijective (one-to-one) fashion to the 36 input signals 1102; and the six collective output signals of the first six odd-parity-of-6 circuits 1104, 1106, 1108, 1110, 1112, and 1114 are connected in bijective (one-to-one) fashion to the six input signals of the seventh odd-parity-of-6 circuit 1116. In this example, the output signal of the seventh odd-parity-of-6 circuit 1116 is connected to the output signal 1118 of the odd-parity-of-36 circuit 1100. In some embodiments of the lookup circuits described herein, connecting seven odd-parity-of-6 circuits in this manner may produce a circuit that functions overall as an odd-parity-of-36 circuit.

In some embodiments, at least one of the odd-parity-of-6 circuits 1104, 1106, 1108, 1110, 1112, 1114, and 1116 may be implemented by using a LUT circuit, such as the LUT circuit 702, which has been programmed to compute an odd-parity-of-6 Boolean function. In some embodiments, each of the odd-parity-of-6 circuits 1104, 1106, 1108, 1110, 1112, 1114, and 1116 may be implemented by using a LUT circuit, such as the LUT circuit 702, which has been programmed to compute an odd-parity-of-6 Boolean function. In such an embodiment, the odd-parity-of-36 circuit 1100 may be configured to compute the odd-parity-of-36 function with a maximum of two "LUT delays".

In some embodiments, odd-parity circuits with an even larger number of inputs may be constructed in multiple layers by cascading various odd-parity circuits that include different numbers of inputs. For example, an odd-parity-of-69 circuit may be constructed by cascading a collection of odd-parity-of-11 circuits and/or odd-parity-of-12 circuits in a first layer, and including an odd-parity-of-6 circuit in a second layer. Each of these circuits may have a latency of two FPGA building blocks (e.g., two "LUT delays" or two "slice delays"), rather than one FPGA building block (e.g., one "LUT delay" or one "slice delay"), which may be acceptable. However, in some embodiments, the latency may be reduced to one FPGA building block by using very sparse matrices, as described herein.

Figure 12:
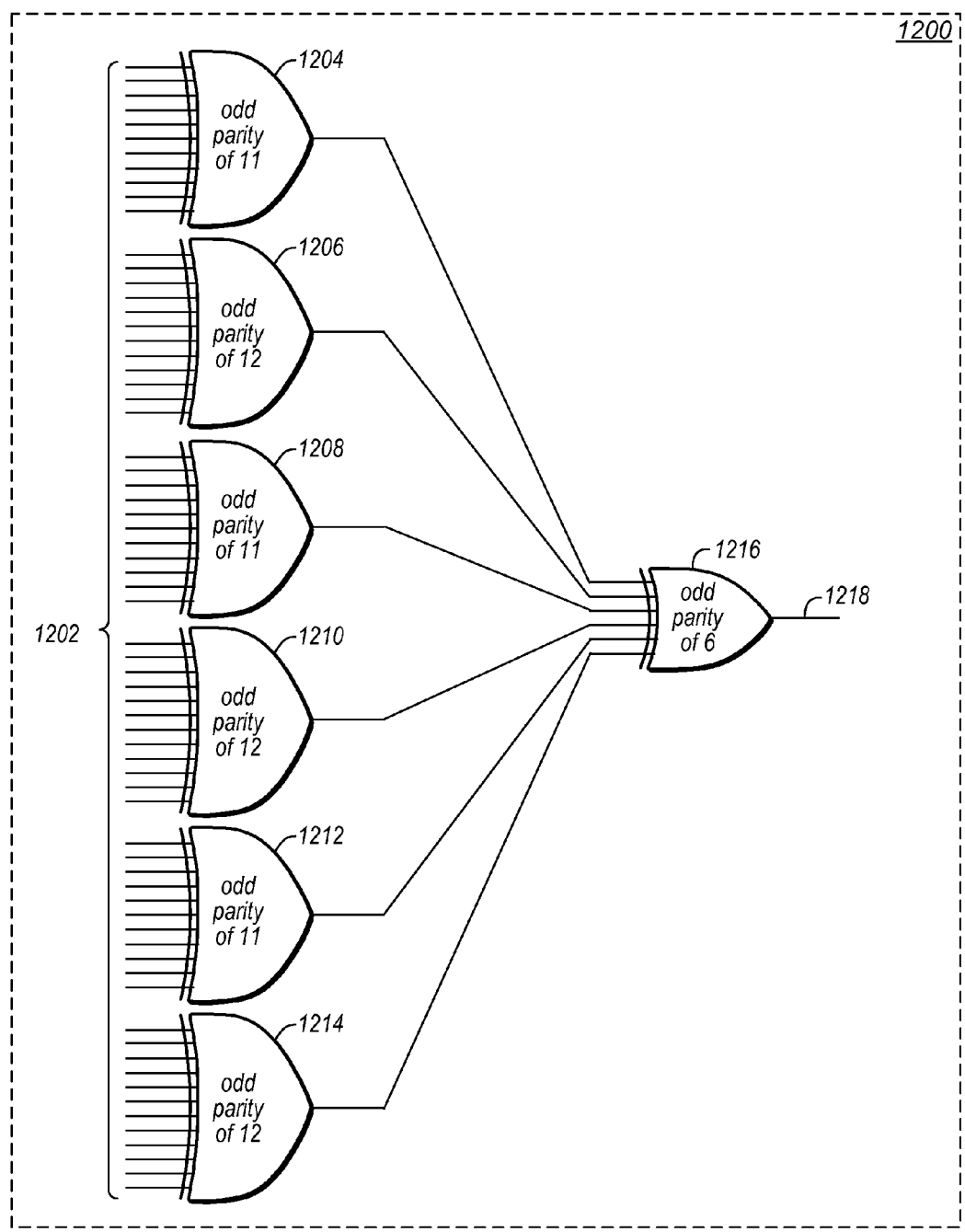
FIG. 12 is a block diagram illustrating an odd-parity-of-69 circuit comprising a two-level hierarchy that includes multiple parity circuits having different numbers of inputs, according to some embodiments.

One embodiment of an odd-parity-of-69 circuit comprising a two-level hierarchy that includes multiple parity circuits having different numbers of inputs is illustrated by the block diagram in FIG. 12. In this example, an odd-parity-of-69 circuit 1200 is configured to accept 69 input signals 1202 and to produce an output signal 1218 that is 1 if an odd number of the input signals 1202 are 1, but is 0 if an even number of the input signals 1202 are 1. In this example, the odd-parity-of-69 circuit 1200 includes a first odd-parity-of-11 circuit 1204, a first odd-parity-of-12 circuit 1206, a second odd-parity-of-11 circuit 1208, a second odd-parity-of-12 circuit 1210, a third odd-parity-of-11 circuit 1212, a third odd-parity-of-12 circuit 1214, and an odd-parity-of-6 circuit 1216. In this example, each of the odd-parity-of-11 circuits includes eleven input signals and one output signal; each of the odd-parity-of-12 circuits includes twelve input signals and one output signal; and the odd-parity-of-6 circuit includes six input signals and one output signal.

In the example illustrated in FIG. 12, the 69 collective input signals of the odd-parity circuits 1204, 1206, 1208, 1210, 1212, and 1214 are connected in bijective (one-to-one) fashion to the 69 input signals 1202, and the six collective output signals of the six odd-parity circuits 1204, 1206, 1208, 1210, 1212, and 1214 are connected in bijective (one-to-one) fashion to the six input signals of the odd-parity-of-6 circuit 1216. In this example, the output signal of the odd-parity-of-6 circuit 1216 is connected to the output signal 1218 of the odd-parity-of-69 circuit 1200. In some embodiments of the lookup circuits described herein, connecting seven odd-parity circuits in this manner may produce a circuit that functions overall as an odd-parity-of-69 circuit.

In some embodiments, at least one of the odd-parity circuits 1204, 1206, 1208, 1210, 1212, 1214, and 1216 may be implemented by using a LUT circuit, such as the LUT circuit 702, which has been programmed to compute an odd-parity-of-6 Boolean function, or by using part of a slice circuit, such as the slice circuit 900, which has been programmed to compute an odd-parity-of-11 or an odd-parity-of-12 Boolean function. In some embodiments, each of the odd-parity circuits 1204, 1206, 1208, 1210, 1212, and 1214 may be implemented by using part of a slice circuit, such as the slice circuit 900, which has been programmed to compute an odd-parity-of-11 or an odd-parity-of-12 Boolean function, and the odd-parity-of-6 circuit 1216 may be implemented by using a LUT circuit, such as the LUT circuit 702, which has been programmed to compute an odd-parity-of-6 Boolean function. In some embodiments, the odd-parity-of-69 circuit 1200 may be configured to compute the odd-parity-of-69 function with a maximum of two "slice delays".

Figure 11:
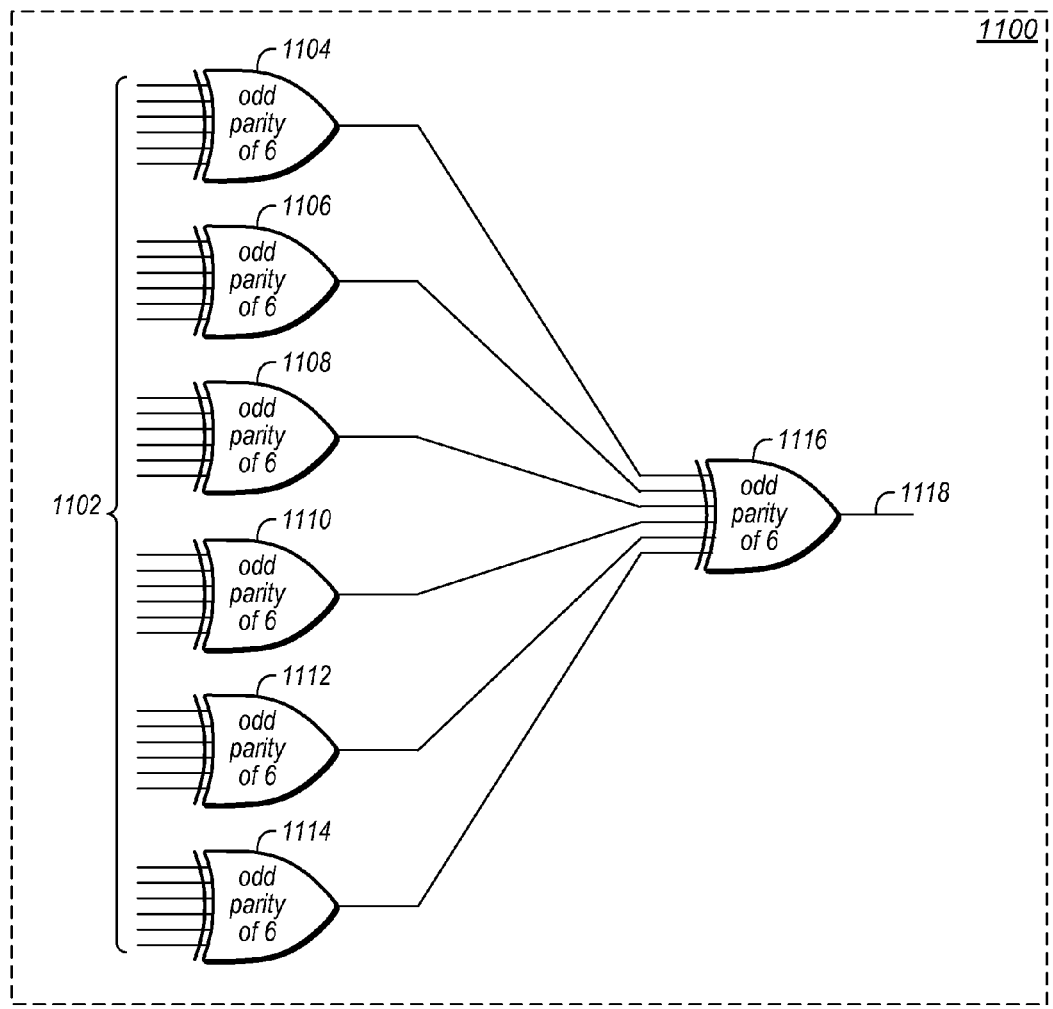
FIG. 11 is a block diagram illustrating an odd-parity-of-36 circuit comprising a two-level hierarchy of odd-parity-of-6 circuits, according to some embodiments.

Note that in these examples, each of the circuits illustrated in FIG. 11 and FIG. 12 is configured to generate one bit of hash value from inputs that comprise a subset of the bits of an input key. In various embodiments, a hash function sub-circuit may include one of these circuits for each bit of the hash value, where each of these circuits may accept as inputs a subset of the bits of the key, and the subsets may be different for at least some of the circuits.

Note that many other variations of the circuits exemplified by the odd-parity circuits 1100 and 1200 are possible and practicable within the spirit and scope of this disclosure for computing odd parity of a number of input signals. For example, in one embodiment, the odd parity of 144 signals may be computed with a maximum of two "slice delays" using thirteen odd-parity-of-12 circuits.

As previously noted, in some embodiments of the lookup circuits described herein, the hash function sub-circuits may implement bit matrix multiplication with a sparse bit matrix. A representative sparse bit matrix, having 9 rows and 32 columns, that may be suitable for use as the matrix A in Equation 1 above (provided that r=32 and p=9) is shown below. In this example, the sparse bit matrix has been chosen (or generated) according to a constraint specifying that each row includes no more than six 1-bits.

$$\begin{pmatrix} 0000 & 0001 & 0110 & 0000 & 0001 & 0000 & 0000 & 0011 \\ 0100 & 1100 & 0000 & 0000 & 1000 & 0001 & 0001 & 0000 \\ 0010 & 0000 & 1000 & 0010 & 0000 & 1000 & 0000 & 0001 \\ 1000 & 0100 & 1010 & 0100 & 0000 & 0000 & 0000 & 0100 \\ 0001 & 0010 & 1000 & 0000 & 0000 & 0010 & 0000 & 0001 \\ 0010 & 0001 & 1001 & 0000 & 0000 & 0100 & 0000 & 0100 \\ 0000 & 0000 & 0000 & 0001 & 0100 & 0001 & 0010 & 1001 \\ 0000 & 0000 & 1000 & 0010 & 0010 & 0000 & 1100 & 0000 \\ 0000 & 0100 & 0010 & 1000 & 0000 & 0001 & 0010 & 0000 \end{pmatrix}$$

Figure 13:
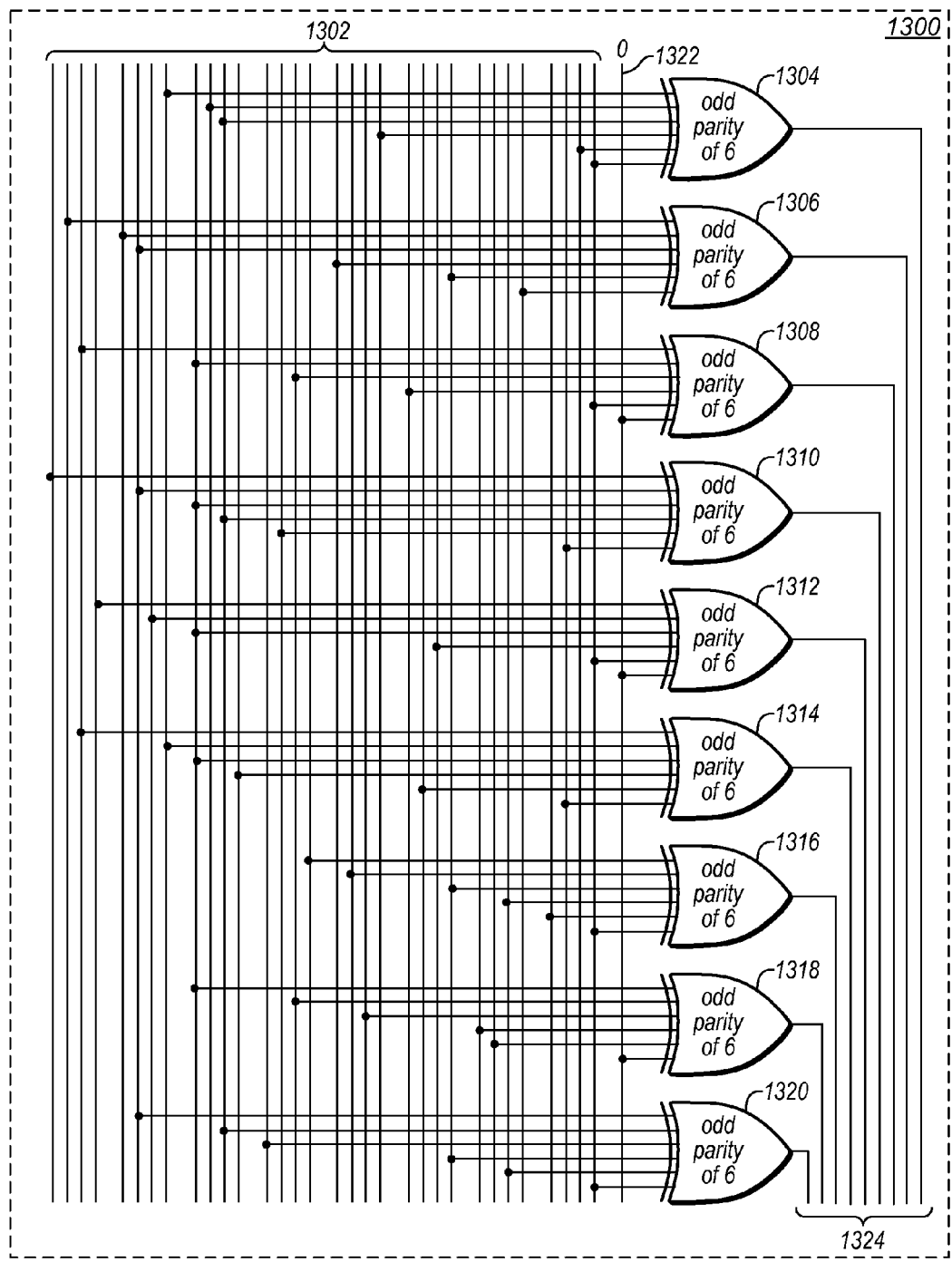
FIG. 13 is a block diagram illustrating a hash function sub-circuit that accepts a 32-bit input and produces a 9-bit hash value by multiplying the 32-bit input with a 9×32 sparse bit matrix, according to some embodiments.

FIG. 13 is a block diagram illustrating a hash function sub-circuit that accepts a 32-bit input and produces a 9-bit hash value by multiplying the 32-bit input with a 9×32 sparse bit matrix, according to some embodiments. More specifically, hash function circuit 1200 multiplies a 32-bit input by the 9×32 sparse bit matrix shown above to produce its 9-bit result. In this example, the hash function circuit 1300 includes 32 input signals 1302, nine odd-parity-of-6 circuits 1304, 1306, 1308, 1310, 1312, 1314, 1316, 1318, and 1320, a constant-0 signal 1322, and 9 output signals 1324. In this example, each of the 9 odd-parity-of-6 circuits has each of its input signals connected either to one of the 32 input signals 1302 of the hash function circuit 1300 or to the constant-0 signal 1322, where the pattern of connections of the input signals 1302 and the constant-0 signal 1322 to the odd-parity circuits in the hash function circuit 1300 directly reflects the content of the 9×32 sparse bit matrix shown above.

For example, the pattern of connections to the six inputs of the odd-parity-of-6 circuit 1304 directly reflects the content of the topmost row of the 9×32 sparse bit matrix shown above in that the topmost row of the matrix has 1-bits in columns 7, 9, 10, 19, 30, and 31 (where the columns are numbered 0-31, column 0 being the leftmost and column 31 the rightmost), and the six inputs of the odd-parity-of-6 circuit 1304 are connected to signals 7, 9, 10, 19, 30, and 31 of the 32 input signals 1302 (where the input signals 1302 are numbered 0-31, column 0 being the leftmost and column 31 the rightmost). In another example, the pattern of connections to the six inputs of the odd-parity-of-6 circuit 1320 directly reflects the content of the bottommost row of the 9×32 sparse bit matrix shown above in that the bottommost row of the matrix has 1-bits in columns 5, 10, 12, 23, and 26, and the six inputs of the odd-parity-of-6 circuit 1320 are connected to signals 5, 10, 12, 23, and 26 of the 32 input signals 1302 and the constant-0 signal 1322. In the example illustrated in FIG. 13, each of the 9 odd-parity-of-6 circuits has its output signal connected to one of the 9 output signals 1324 of the hash function circuit 1300. In other words, each of the 9 odd-parity-of-6 circuits computes one bit of a hash value generated from a key having 32 bits, where each bit of the key corresponds to one of the 32 input signals 1324.

As in other example circuits described herein, in some embodiments, at least one of the odd-parity-of-6 circuits 1304, 1306, 1308, 1310, 1312, 1314, 1316, 1318, and 1320 may be implemented using a LUT circuit, such as the LUT circuit 702, which has been programmed to compute an odd-parity-of-6 Boolean function. In some embodiments, each of the odd-parity-of-6 circuits 1304, 1306, 1308, 1310, 1312, 1314, 1316, 1318, and 1320 may be implemented using a LUT circuit, such as the LUT circuit 702, which has been programmed to compute an odd-parity-of-6 Boolean function. In the illustrated embodiment, the hash function circuit 1300 may be configured to compute the product of the 9×32 sparse bit matrix shown above with the 32 input signals 1302 (which may be regarded as a bit vector of length 32), with a maximum of one "LUT delay".

In some embodiments, the constant-0 signal 1322 may be omitted. In such embodiments, for every matrix row that has a number of 1-bits equal to k, an odd-parity-of-k circuit may be used. Note that in embodiments in which k does not exceed 6, a single LUT circuit may be used to compute the odd-parity-of-k function with a maximum of one "LUT delay".

A representative sparse bit matrix having 6 rows and 36 columns that is not as sparse as the 9×32 sparse bit matrix shown above, but that may be suitable for use as the matrix A in Equation 1 above (provided that r=36 and p=6) is shown below. In this example, the sparse bit matrix has been chosen (or generated) such that each of rows 0, 2, and 4 includes at most eleven 1-bits and each of rows 1, 3, and 5 includes at most twelve 1-bits.

$$\begin{pmatrix} 1010 & 0110 & 1000 & 0100 & 0100 & 0010 & 0000 & 1000 & 1100 \\ 1000 & 1101 & 1101 & 0001 & 1000 & 0000 & 0001 & 0101 & 0000 \\ 0100 & 1000 & 0000 & 1000 & 0010 & 1010 & 0011 & 1010 & 0010 \\ 1000 & 1000 & 0100 & 0000 & 0111 & 0000 & 1001 & 0011 & 1001 \\ 0100 & 0010 & 1010 & 0110 & 0010 & 0001 & 0001 & 1001 & 0000 \\ 0001 & 0010 & 0000 & 1100 & 0001 & 0110 & 0100 & 0111 & 0100 \end{pmatrix}$$

Figure 14:
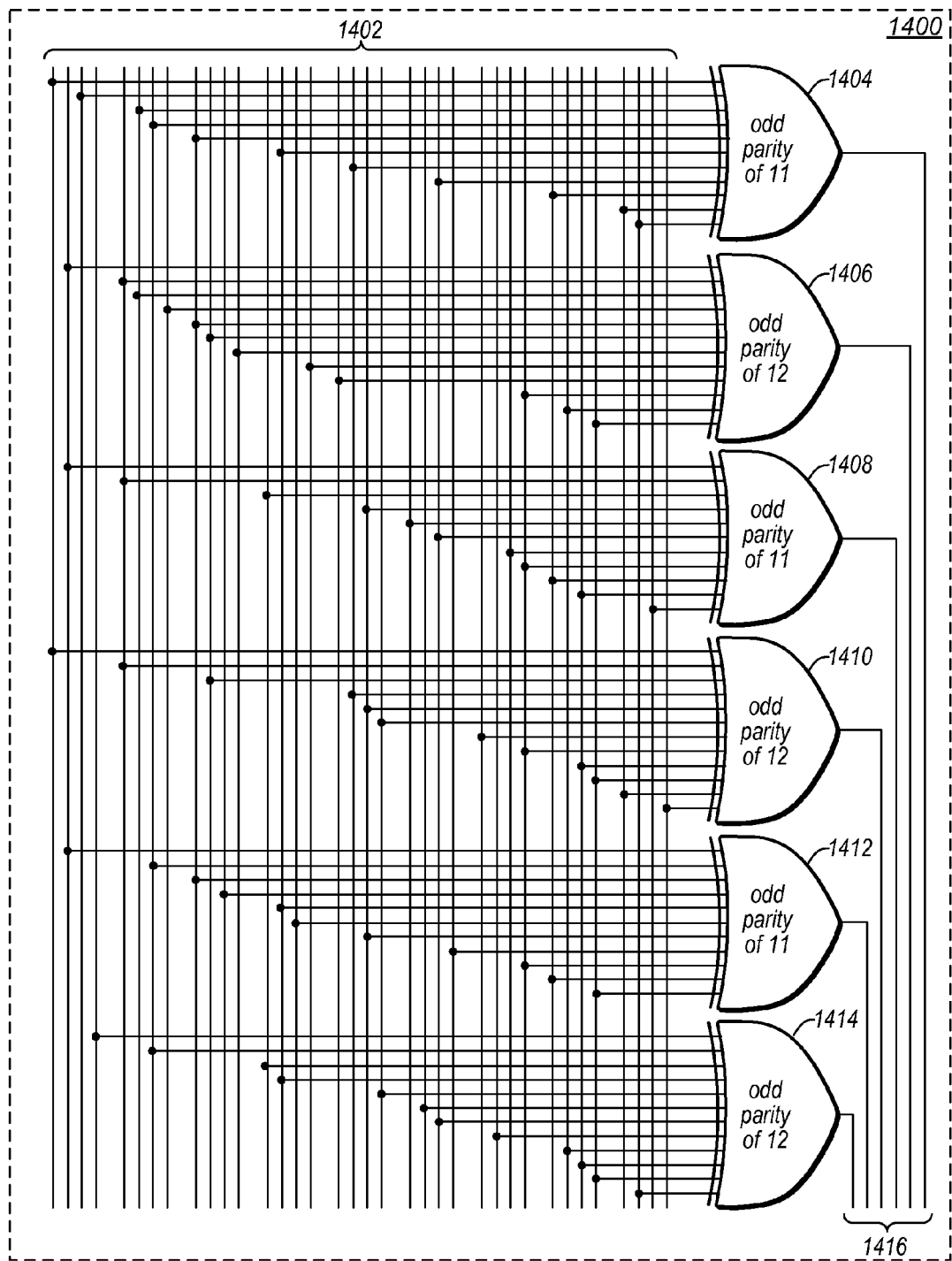
FIG. 14 is a block diagram illustrating a hash function sub-circuit that accepts a 36-bit input and produces a 6-bit hash value in accordance with a 6×36 sparse bit matrix, according to some embodiments.

FIG. 14 is a block diagram illustrating a hash function sub-circuit that is configured to accept a 36-bit input and to produce a 6-bit hash value in accordance with a 6×36 sparse bit matrix, in some embodiments. More specifically, FIG. 14 illustrates a hash function circuit 1400 that accepts a 36-bit input and multiplies it by the 6×36 sparse bit matrix shown above to produce its 6-bit result. In this example, the hash function circuit 1400 includes 36 input signals 1402, three odd-parity-of-11 circuits 1404, 1408, and 1412, three odd-parity-of-12 circuits 1406, 1410, and 1414, and six output signals 1424. In this example, each of the six odd-parity-of-6 circuits has each of its input signals connected to one of the 36 input signals 1402 of the hash function circuit 1400. In this example, the pattern of connections of the input signals 1402 to the odd-parity circuits in the hash function circuit 1400 directly reflects the content of the 6×36 sparse bit matrix shown above. For example, the pattern of connections to the eleven inputs of the odd-parity-of-11 circuit 1404 directly reflects the content of the topmost row of the 6×36 sparse bit matrix shown above in that the topmost row of the matrix has 1-bits in columns 0, 2, 5, 6, 8, 13, 17, 22, 28, 32, and 33 (where the columns are numbered 0-35, column 0 being the leftmost and column 35 the rightmost), and the eleven inputs of the odd-parity-of-11 circuit 1404 are connected to signals 0, 2, 5, 6, 8, 13, 17, 22, 28, 32, and 33 of the 36 input signals 1402 (where the input signals 1402 are numbered 0-35, column 0 being the leftmost and column 35 the rightmost).

In some embodiments, each of the odd-parity circuits 1404, 1406, 1408, 1410, 1412, and 1414 may be implemented using part of a slice circuit, such as the slice circuit 900, which has been programmed to compute an odd-parity-of-11 or an odd-parity-of-12 Boolean function. In the illustrated embodiment, the hash function circuit 1400 may be configured to compute the product of the 6×36 sparse bit matrix shown above with the 36 input signals 1402 (which may be regarded as a bit vector of length 36), with a maximum of one "slice delay".

A representative bit vector, represented as a column vector having 9 single-bit rows, which may be suitable for use as the bit vector y in the Equations 1 above (provided that p=9) is shown below.

$$\begin{pmatrix} 1 \\ 0 \\ 1 \\ 1 \\ 0 \\ 0 \\ 1 \\ 0 \\ 0 \end{pmatrix}$$

Figure 15:
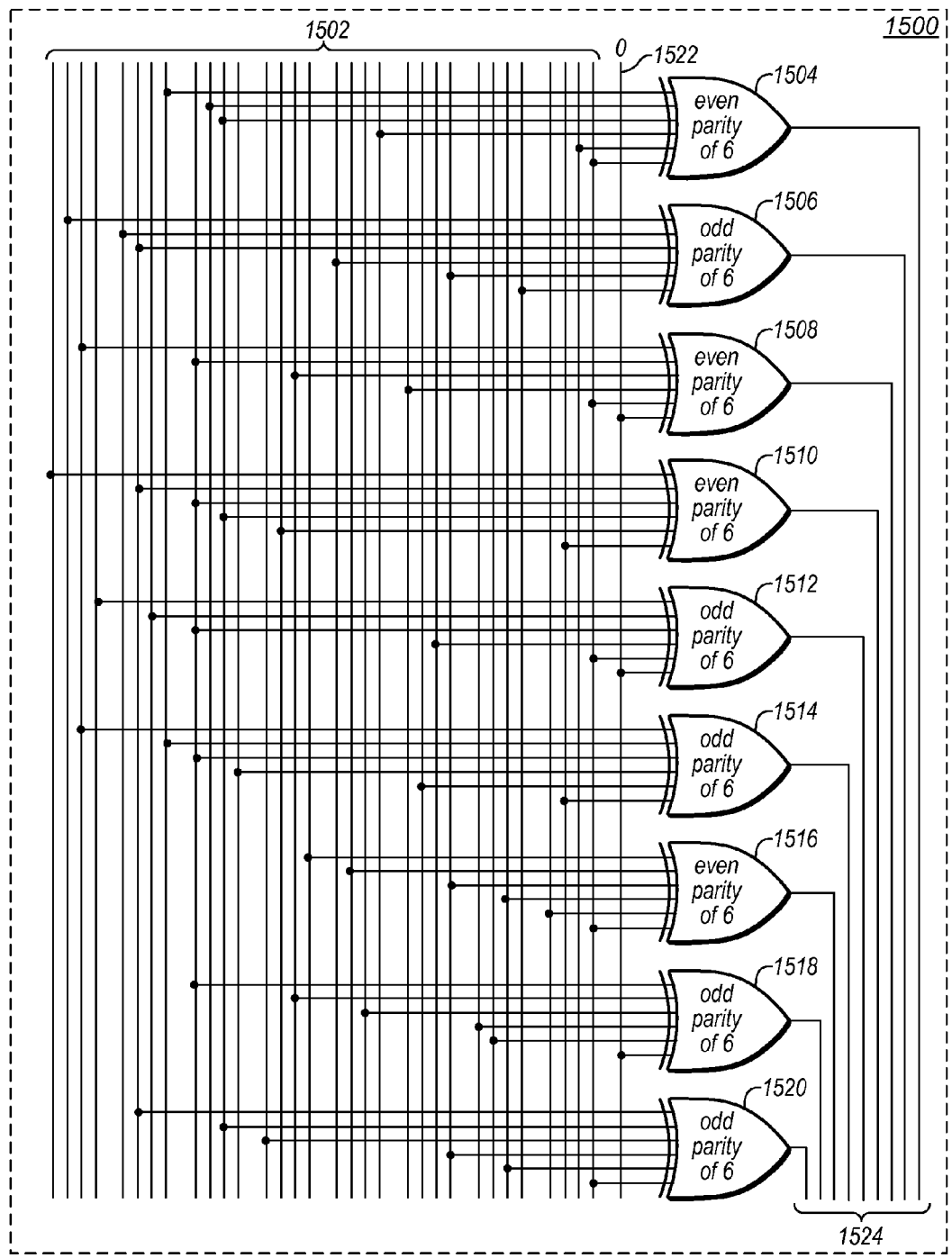
FIG. 15 is a block diagram illustrating a hash function sub-circuit that accepts a 32-bit input and produces a 9-bit hash value by multiplying the 32-bit input with a 9×32 sparse bit matrix and adding an additional bit vector to the multiplication result, according to some embodiments.

In some embodiments of the lookup circuits described herein, one or more of the hash function sub-circuits may be configured to multiply an input bit vector that represents a key value with a sparse bit matrix and to add a constant bit vector to the result. For example, FIG. 15 is a block diagram illustrating a hash function sub-circuit that accepts a 32-bit input and produces a 9-bit hash value by multiplying the 32-bit input with a 9×32 sparse bit matrix and adding an additional bit vector to the multiplication result, according to some embodiments. Note that the hash function implemented by the circuit illustrated in FIG. 15 is similar to the hash function implemented by the circuit illustrated in FIG. 13 except that instead of just multiplying the input bit vector by a sparse bit matrix (in this case, the 9×32 sparse bit matrix shown above, in which there are at most six 1-bits per row), the hash function implemented by the circuit illustrated in FIG. 15 multiplies the input bit vector by the sparse bit matrix and then adds a constant bit vector to the result (e.g., by XORing the results with the constant bit vector, in this case, the 9-bit bit vector shown above). Note that the circuitry illustrated in FIG. 15 is no larger than the circuitry illustrated in FIG. 13. Instead, the addition of the constant bit vector has been accommodated in the circuitry by changing some of the odd-parity-of-6 circuits shown in FIG. 12 to even-parity-of-6 circuits (e.g., 1504 and others). In other words, in some embodiments of the lookup circuits described herein, a hash function may include such an additional XOR operation at no additional hardware cost.

More specifically, FIG. 15 illustrates a hash function circuit 1500 that is configured to accept a 32-bit input, to multiply the input by the 9×32 matrix above, and to add the bit-vector y shown above to produce its 9-bit result. In this example, the hash function circuit 1500 is identical in structure to the hash function circuit 1300, except that four of the odd-parity-of-6 circuits (specifically, odd-parity-of-6 circuits 1304, 1308, 1310, and 1316) have been replaced with even-parity-of-6 circuits (specifically, even-parity-of-6 circuits 1504, 1508, 1510, and 1516). In this example, such replacements have been performed for precisely those odd-parity-of-6 circuits that compute a result bit corresponding in position to a 1-bit in the bit vector y. Note that such replacement in fact causes the hash function circuit 1500 to perform the computation Ax+y.

In some embodiments, each of the odd-parity-of-6 or even-parity-of-6 circuits 1504, 1506, 1508, 1510, 1512, 1514, 1516, 1518, and 1520 may be implemented using a LUT circuit, such as the LUT circuit 702, which has been programmed to compute an odd-parity-of-6 or even-parity-of-6 Boolean function. In the illustrated embodiment, the hash function circuit 1500 may be configured to compute the product of the 9×32 bit matrix shown above with the 32 input signals 1502 (which may be regarded as a bit vector of length 32), and then to add the bit vector shown above to the multiplication result, with a maximum of one "LUT delay".

In some embodiments, given a specific column vector y that includes 6 rows, a similar transformation may be made on the hash function circuit 1400, by replacing odd-parity circuits corresponding to rows of the vector y having a 1-bit with even-parity circuits taking the same number of inputs. In some embodiments, an odd-parity-of-11 circuit or odd-parity-of-12 circuit implemented using part of an FPGA slice in the manner shown in FIG. 10 may be transformed into an even-parity-of-11 circuit or an even-parity-of-12 circuit by transforming the function computed by just one of the two constituent LUT circuits from an odd-parity function to an even-parity function that takes the same number of inputs. In such an embodiment, a transformed version of the hash function circuit 1400 may be configured to compute the product of the 6×36 matrix shown above with the 36 input signals 1402 (which may be regarded as a bit vector of length 36), and then to add a bit vector of length 6, with a maximum of one "slice delay".

While several examples of low latency lookup circuits are described herein that are configured to apply hash functions by performing a bit matrix multiplication, or by performing a bit matrix multiplication followed by a bit vector addition, using a bit matrix that is chosen or generated such that the bit matrix is sparse, many other variations of such lookup circuits are possible within the spirit and scope of this disclosure.

In some embodiments, the lookup circuits described herein may be loaded, programmed or otherwise supported through the use of various programmed procedures, such as programmed methods for generating a suitable pair of hash functions (based on sparse random bit matrices) for a given set of keys, for constructing the appropriate contents for various hash table memories, and/or for downloading these contents into the circuits prior to using the circuits for performing key lookup operations. In some embodiments, the programmed methods for constructing of a pair of sparse random bit matrices and corresponding hash functions may include multiple components, which may include: a procedure for randomly choosing a matrix of appropriate size; a procedure for testing whether a pair of generated hash functions will effectively hash the given set of keys; and an overall procedure that successively generates pairs of candidate matrices and applies the testing procedure until a suitable pair of hash functions is found. Several examples of such methods are described in detail below.

One example of a programmed method that may be used to generate a uniformly random bit matrix is illustrated by the pseudocode below.

```
01 static long[ ] makeRandomMatrix(int nrows,
02                                  int ncols,
03                                  Random rng) {
04   assert 0 < nrows;
05   assert 0 < ncols && ncols <= 64;
06   final long[ ] result = new long[nrows];
07   for (int j = 0; j < nrows; j++) {
```

```
08      result[j] = rng.nextLong( ) >>> (64 – ncols);
09    }
10    return result;
11 }
```

In this example, a programmed method "makeRandomMatrix" (which may be coded in the Java™ programming language) may be used to generate a uniformly random bit matrix, represented as an array of long values, in which each long value represents one row of up to 64 bits. In this example, the programmed method accepts three arguments: the desired number of rows in the matrix "nrows" (declared in line 01), the desired number of columns in the matrix "ncols" (declared in line 02), and a generator of random (or pseudorandom) numbers "rng" (declared in line 03). In this example, the assertion in line 04 requires that the number of rows "nrows" be strictly positive, and the assertion in line 05 requires that the number of columns "ncols" be strictly positive and not greater than 64. Line 06 allocates a new array with the desired number of rows "nrows" and gives it the name "result". In this example, the body of the loop on lines 07 through 09 generates one random word of bits for each row in the matrix, then shifts it right by "64-ncols", so that the rightmost "ncols" bits of the long value are uniformly generated random bits (that is, each bit has a 50% probability of being a 1-bit, independent of all the other bits in the matrix). In this example, line 10 returns the constructed matrix as the output of the programmed method.

In some embodiments, in order to generate a random bit matrix for use in any of the lookup circuits described herein, the programmed method "makeRandomMatrix" shown above may be called with three arguments: a random number generator, an integer value p, and an integer value r. Given these inputs, this programmed method may construct a representation of a matrix having p rows and r columns, whose entries are uniformly generated random bits.

As previously noted, selecting hash functions that implement bit matrix multiplication using sparse random bit matrices, may allow the hash functions to be implemented using circuitry with low latency. In some embodiments, random bit matrices may be generated in a manner that applies a sparseness constraint, and the hash functions generated from these matrices may be implemented in a lookup circuit using the low latency hash function sub-circuits described herein. In various embodiments, such a sparseness constraint may specify a pre-defined upper or lower bound on the number of 1-bits, a pre-defined upper or lower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row.

Figure 16:
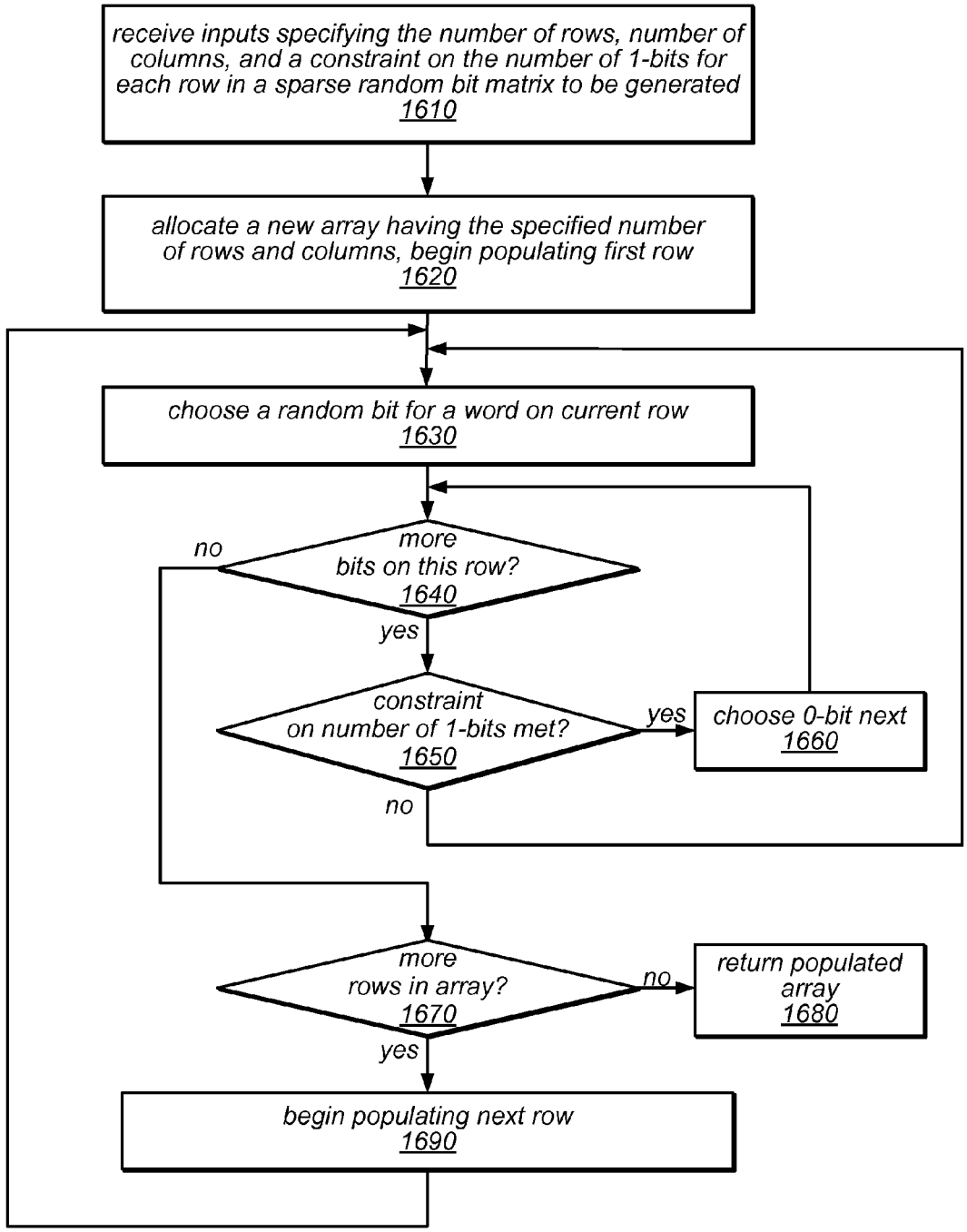
FIG. 16 is a flow diagram illustrating one embodiment of a method for generating a sparse random bit matrix for use in a lookup circuit.

One embodiment of a method for generating a sparse random bit matrix for use in the lookup circuits described herein is illustrated by the flow diagram in FIG. 16. As illustrated at 1610, in this example, the method may include receiving inputs specifying the number of rows, the number of columns, and a constraint on the number of 1-bits for each row of a sparse random bit matrix to be generated. In this example, the input may specify a number of 1-bits desired in each row, an upper bound on the number of 1-bits in each row, or a constraint on the ratio between the number of 0-bits and the number of 1-bits in each row. Note that in other embodiments, the method may include receiving one or more other inputs (e.g., the values of various configuration parameters or flags, identifiers of various random or pseudorandom number generators, or other inputs). As illustrated in this example, the method may include allocating a new array having the specified number of rows and columns, and beginning to populate the first row of the array, as in 1620.

In order to populate the first row of the array, the method may include choosing a random bit value (i.e., 0 or 1) for a word on the row (as in 1630). If there are more bits to be populated on this row (shown as the positive exit from 1640), and the specified constraint on the number of 1-bits has not been met for the row (shown as the negative exit from 1650), the method may include repeating the operation illustrated at 1630 (e.g., choosing a random bit value for the row). This is illustrated in FIG. 16 by the feedback from the negative exit of 1650 to 1640. However, if there are more bits in this row (shown as the positive exit from 1640), but the constraint on the number of I-bits has been met (shown positive exit of 1650) the method may include choosing a 0-bit for the next bit in the row (as in 1660).

As illustrated in this example, the operations illustrated in 1630-1660 may be repeated until the first row of the array has been populated. Once the first row has been populated, if there are more rows in the array to be populated (shown as the positive exit from 1670), the method may include beginning to populate the next row in the array (as in 1690), and repeating the operations illustrated in 1630-1660, as needed, in order to populate each additional row. This is illustrated in FIG. 16 by the feedback from the 1690 to 1630. If there are no more rows to be populated in the array (or once all of the rows of the array have been populated), the method may include returning the populated array. This is illustrated in FIG. 16 by the path from the negative exit of 1670 to 1680.

One embodiment of a programmed method for generating a random, but sparse, bit matrix (such as those implemented in the lookup circuits described herein) is illustrated by the example pseudocode below.

```
01 static long[ ] makeSparseRandomMatrix(int nrows,
02                                       int ncols,
03                                       int maxOnes,
04                                       boolean exact,
05                                       boolean oneLessForSomeRows,
06                                       Random rng) {
07    assert 0 < nrows;
08    assert 0 < ncols && ncols <= 64;
09    assert 1 < maxOnes && maxOnes <= ncols;
10    final long[ ] result = new long[nrows];
11    for (int j = 0; j < nrows; j++) {
12      int nbits = maxOnes;
13      if (oneLessForSomeRows && ((j & 1) == 0)) {
14        nbits = nbits – 1;
15      }
16      result [j] = 1L << rng.nextInt(ncols)
17      for (int k = 1; k < nbits; k++) {
18        int newBit;
19        do {
20          newBit = 1L << rng.nextInt(ncols);
21        } while(exact&&((result[j]&newBit)!=0));
22        result[j] |= newBit;
23      }
24    }
25    return result;
26 }
```

In this example, a programmed method "makeSparseRandomMatrix" (which may be coded in the Java™ programming language) may be used to generate a sparse bit matrix, represented as an array of long values, in which each long value represents one row of up to 64 bits. In this example, the programmed method accepts six arguments: the desired number of rows in the matrix "nrows" (declared in line 01), the desired number of columns in the matrix "ncols" (declared in line 02), an upper bound on the number of 1-bits in each row of the generated matrix "maxOnes" (declared in line 03), a flag "exact" (declared in line 04) that, if true, indicates that "maxOnes" should be treated as an exact requirement on the number of 1-bits per row rather than an upper bound, a flag "oneLessForSomeRows" (declared in line 05) that, if true, indicates that a value one smaller than "maxOnes" should be used as the exact or maximum number of 1-bits for even-numbered rows of the matrix, and a generator of random (or pseudorandom) numbers "rng" (declared in line 05). In this example, the assertion in line 07 requires that the number of rows "nrows" be strictly positive; the assertion in line 08 requires that the number of columns "ncols" be strictly positive and not greater than 64; and the assertion in line 09 requires that the "maxOnes" be strictly positive and not greater than "ncols". Line 10 allocates a new array with the desired number of rows "nrows" and gives it the name "result".

In this example, the body of the loop on lines 11 through 24 generates one word of bits for each row in the matrix, chosen in a specific non-uniform manner. In this example, line 12 sets a local variable "nbits" equal to "maxOnes"; lines 13 through 15 then reduce the value in "nbits" by 1 if (and only if) the flag "oneLessForSomeRows" is true and the row being generated is even-numbered. Line 16 chooses just one bit to set in the current row being generated, by using the "nextInt" method of "rng" to generate a random integer chosen uniformly from the range 0 (inclusive) to "ncols" (exclusive) and then shifting the value "1L" (the value 1 represented as a long integer) to the left by that amount. The inner loop on lines 17 through 23 then executes its body "nbits−1" times.

In this example, line 18 declares a local variable "newbit", which line 20 sets to a word with exactly one 1-bit, chosen in the same manner as on line 16. If the "exact" flag is false, then line 20 is executed just once per iteration of the inner loop on lines 17 through 23. However, if the "exact" flag is true, then the "do" loop on lines 19 through 21 repeats line 20 until "newbit" contains a 1-bit in a position not yet chosen for this row. In either case, the chosen "newbit" value is then logically OR'd into the matrix row being generated. The net effect is that if the "exact" flag is true, then the generated row will include exactly "nbits" 1-bits, but if the "exact" flag is false, then the generated row will include at most "nbits" 1-bits (but at least one 1-bit). Line 25 returns the constructed matrix as the output of the programmed method.

In an alternate embodiment, the programmed method "makeSparseRandomMatrix" may use values of type "BigInteger" rather than "long" values to represent the rows of the generated matrix. In another embodiment, the programmed method "makeSparseRandomMatrix" may use a two-dimensional array of Boolean values to represent the generated matrix. Note that either of these embodiments may be used to generate a matrix that includes rows longer than 64 bits.

In one embodiment, in order to generate a sparse random bit matrix for use in any of the lookup circuits described herein, the programmed method "makeSparseRandomMatrix" shown above may be called with six arguments, e.g., a random number generator, a first integer value p (corresponding to "nrows" in the pseudocode above) a second integer value r (corresponding to "ncols"), a third integer value m (corresponding to "maxOnes"), a first Boolean value false (corresponding to "exact"), and a second Boolean value false (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each row of the generated matrix includes at least one 1-bit, but no more than m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value true (corresponding to "exact"), and a second Boolean value false (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each row of the generated matrix includes exactly m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value true (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes exactly m 1-bits, and each even-numbered row of the generated matrix includes exactly (m−1) 1-bits.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value false (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes at least one 1-bit, but no more than m 1-bits, and each even-numbered row of the generated matrix includes at least one 1-bit, but no more than (m−1) 1-bits.

In some embodiments, the programmed method "makeSparseRandomMatrix" shown above may be called with an argument m (corresponding to "maxOnes") such that m=6. In some embodiments of the lookup circuits described herein, multiplication of an input key (one represented by a bit vector) with the sparse bit matrix produced by the method in this case may be implemented in a hash function sub-circuit that includes odd-parity-of-6 circuits. In other embodiments, the programmed method "makeSparseRandomMatrix"

shown above may be called with an argument m such that m=11 or m=12. In some embodiments, multiplication of an input key (one represented by a bit vector) with the sparse bit matrix produced by the method in this case may be implemented in a hash function sub-circuit that includes odd-parity-of-11 circuits or odd-parity-of-12 circuits, such as those described herein.

As illustrated in the examples described herein, in some embodiments, the programmed method "makeSparseRandomMatrix" shown above may be called with an argument corresponding to "exact" that is false. In other embodiments, the programmed method "makeSparseRandomMatrix" shown above may be called with an argument corresponding to "exact" that is true. The use of an argument corresponding to "exact" may allow an application that calls the programmed method "makeSparseRandomMatrix" to control the number of 1-bits per row exactly or to allow flexibility in the number of 1-bits per row up to an upper bound, which may allow more options for the resulting bit matrices and the hash function circuits that employ them. Similarly, in some embodiments, the programmed method "makeSparseRandomMatrix" shown above may be called with an argument corresponding to "oneLessForSomeRows" that is false, while in other embodiments, the programmed method "makeSparseRandomMatrix" shown above may be called with an argument corresponding to "oneLessForSomeRows" that is true. The use of an argument corresponding to "oneLessForSomeRows" may allow an application that calls the programmed method "makeSparseRandomMatrix" to control whether the same constraint is applied to all rows of the resulting matrix or two different constraints are applied to all rows of the resulting matrix, which may in turn affect the available options for implementing the hash function circuits that employ these matrices.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value corresponding to "exact" (either true or false), and a second Boolean value corresponding to "oneLessForSomeRows" (either true or false), such that the assertions on lines 07 through 09 are satisfied, and moreover such that m is not greater than ⅓ the mathematical value of r. Given these inputs, the programmed method may construct a representation of a matrix having p rows and r columns, whose entries are chosen randomly but non-uniformly, such that each row of the generated matrix has at least twice as many 0-bits as 1-bits. For example, the programmed method "makeSparseRandomMatrix" shown above may called with an argument m (corresponding to "maxOnes") such that m=floor(r/3), where "floor(x)" denotes the largest integer that is not larger than x. This computation of m results in a value that is not greater than ⅓ the mathematical value of r.

For example, in one embodiment, the programmed method "makeSparseRandomMatrix" shown above may be called with an argument r (corresponding to "ncols") such that r is not less than 18 and an argument m (corresponding to "maxOnes") such that m=6. In this example, the computation of m=floor(r/3) results in a value of m that is not greater than ⅓ the mathematical value of r. In another example, the programmed method "makeSparseRandomMatrix" shown above may be called with an argument r (corresponding to "ncols") such that r is not less than 36 and an argument m (corresponding to "maxOnes") such that m=12. In this example, the computation of m=floor(r/3) results in a value of m that is not greater than ⅓ the mathematical value of r. In both of these cases, the bit matrix resulting from the execution of the programmed method "makeSparseRandomMatrix" shown above will be a bit matrix in which each row of the generated matrix has at least twice as many 0-bits as 1-bits.

As described herein, in some embodiments, a lookup circuit (e.g., the lookup circuit 500 or the lookup circuit 600) may be used to access data associated with a key presented to key input signals. The lookup circuit may include one or more hash function sub-circuits, each of which computes a p-bit hash value from an r-bit key by multiplying the key by a p×r bit-matrix, or by multiplying the key by a p×r bit-matrix and then adding a p-bit bit-vector.

In some embodiments, the p×r bit-matrix may be chosen (or generated) so as to be sparse. For example, the p×r bit-matrix may be chosen (or generated) so that each row has at least twice as many 0-bits as 1-bits. In such embodiments, the hash function may be implemented using a circuit with low latency, for example the hash function circuit 1300, the hash function circuit 1400, or the hash function circuit 1500. In some embodiments, the p×r bit-matrix may be generated by calling the programmed method "makeSparseRandomMatrix" shown above. For example, in addition to the combinations of arguments described above, the programmed method "makeSparseRandomMatrix" shown above may be called with the following sets of arguments, each of which may result in the generation of a sparse bit matrix suitable for implementation within one of the hash function sub-circuits described herein: (p=18, r=96, and m=12), (p=18, r=72, and m=6), or (p=13, r=48, and m=6).

As illustrated in FIG. 2, in some embodiments, the lookup circuits described above may be used in conjunction with methods for generating sparse random bit matrices and corresponding hash functions, for determining the suitability of various sets (e.g., pairs) of hash functions for implementation in the lookup circuits, and for loading a set of hash functions into the lookup circuits. For example, in some embodiments, a bit matrix (or set of bit matrices) generated by a programmed method "makeSparseRandomMatrix" (such as that described herein) may be tested against a specific set of keys to determine whether the bit matrix (or set of bit matrices) is suitable for hashing that specific set of keys for use with the lookup circuit. In some embodiments, if testing determines that the bit matrix (or set of bit matrices) generated by the programmed method "makeSparseRandomMatrix" is not suitable for hashing a specific set of keys for use with the lookup circuit, the programmed method "makeSparseRandomMatrix" may be called again, repeatedly, until either a suitable bit matrix (or set of bit matrices) is generated or a resource limit (e.g., a time limit or a fixed number of iterations) has been exhausted. Once a suitable bit matrix (or set of bit matrices) has been identified, the corresponding hash functions may be programmed or otherwise loaded into the lookup circuit.

One embodiment of a programmed method for initializing memories in lookup circuit 500 is illustrated by the example pseudocode below. In this example, the programmed method employs a BMZ insertion algorithm, although other insertion algorithms may be employed in other embodiments.

```
01  initializeXorCircuitTables(keyMatrix, dataMatrix, p, n, rng)
02    result := generateTwoHashFunctions(keyMatrix, p, rng)
03    if (result = FAILURE) ERROR
```

-continued

```
04      (Ap, Aq, yq) := result
05      h1 := the function (v => Ap v)
06      h2 := the function (v => (Aq v) XOR yq)
07      unusedKey := some key not in keyMatrix
08      table := matrix of size (2^p) x n
09      (use BMZ insertion algorithm with hash functions
10       h1 and h2 to insert indices into the table)
11      (reprogram the FPGA implementing circuit 500 using
12       the bit matrices Ap and Aq and the bit vector yq so that
13       the first hash function sub-circuit 504 computes h1
14       and the second hash function sub-circuit 514 computes h2)
15      for every key K that is a column of keyMatrix do
16          D := corresponding column of dataMatrix
17          v1 := h1(K)
18          v2 := h2(K)
19          i1 := element v1 of table
20          i2 := element v2 of table
21          for one clock cycle of circuit 400
22              present K as KEY input 402
23              present i1 as INDEX IN signal 440
24              assert WRITE1 signal 432
25              do not assert WRITE2 signal 436
26              do not assert WRITE3 signal 446
27          end clock cycle
28          for one clock cycle of circuit 400
29              present K as KEY input 402
30              present i2 as INDEX IN signal 440
31              do not assert WRITE1 signal 432
32              assert WRITE2 signal 436
33              do not assert WRITE3 signal 446
34          end clock cycle
35          for one clock cycle of circuit 400
36              present K as KEY input 402
37              present (K, D) as KEY/DATA IN input 450
38              do not assert WRITE1 signal 432
39              do not assert WRITE2 signal 436
40              assert WRITE3 signal 446
41          end clock cycle
42      end for
```

In this example, a programmed method "initializeXorCircuitTables" may be used to load appropriate data into the dual-ported RAM 512 and the single-ported RAM 530 of the lookup circuit 500. In this example, the programmed method accepts five arguments: a first bit matrix "keyMatrix" of size (r×k), where k<2$^r$, whose r-bit columns represent keys and whose columns are all different, thus representing a set of keys; a second bit matrix "dataMatrix" of size (d×k) containing data associated with the keys; a first positive integer "p" indicating the desired number of bits in each hash value; a second positive integer "n" indicating the desired number of bits in each index used to address the single-ported RAM 530; and a source "rng" of random or pseudorandom numbers. In this example, line 02 includes a call to a programmed procedure "generateTwoHashFunctions", which will produce either the value "FAILURE" or a triplet that contains two bit matrices of size (p×r) and a bit vector of size p. Line 03 detects whether the returned value is "FAILURE", and if it is, an error is signaled. Otherwise, line 04 gives the name Ap to the first bit matrix, the name Aq to the second bit matrix, and the name yq to the bit vector. Line 05 gives the name h1 to a function that will multiply a key v by the matrix Ap. Similarly, line 06 gives the name h2 to a function that will multiply a key v by the matrix Aq and then XOR the result with the bit vector yq. In some embodiments, each of the functions h1 and h2 may be configured to accept an r-bit key and to produce a p-bit hash value. Line 07 gives the name "unusedKey" to any arbitrarily chosen bit pattern that does not appear as a column in "keyMatrix". In one embodiment, the lexicographically smallest such pattern may be chosen. Note that, in some embodiments, there must be such a pattern because of the constraint k<2$^r$.

In the example pseudocode above, lines 08 through 10 create a table and use the BMZ algorithm to fill it with index data. Note that in other embodiments, any of a variety of suitable algorithms may be used to fill the table with index data. Lines 11 through 14 indicate that an FPGA reprogramming process is used to configure the circuitry so that the first hash function sub-circuit 504 computes the hash function h1 and the second hash function sub-circuit 514 computes the hash function h2. In this example, the body of the loop on lines 15 through 42 performs operations during three clock cycles of the lookup circuit 500 for every key "K" in "keyMatrix". Line 16 gives the name "D" to the column in "dataMatrix" that corresponds to the key K. Line 17 gives the name "v1" to the hash value produced by applying the hash function h1 to K. Similarly, line 18 gives the name "v2" to the hash value produced by applying the hash function h2 to K. In this example, line 19 gives the name "i1" to the index value obtained by using v1 to index the table, while line 20 gives the name "i2" to the index value obtained by using v2 to index the table.

In this example, lines 21 through 27 perform an operation during a first clock cycle for the key K that writes the index value i1 into the dual-ported RAM 512 at the address v1 (which is computed from the key K by the first hash function sub-circuit 504). Lines 28 through 34 perform an operation during a second clock cycle for the key K that writes the index value i2 into the dual-ported RAM 512 at the address v2 (which is computed from the key K by the second hash function sub-circuit 514). Lines 35 through 41 perform an operation during a third clock cycle for the key K that writes the key-data pair (K, D) into the single-ported RAM 530 at the address "i1 XOR i2" (which is computed from the index values i1 and i2 by the XOR gates 522). Note that in this example, the loop on lines 15 through 42 may, for some of the index values, redundantly write that index value multiple times into the same location in the dual-ported RAM 512. Note also that, in this example, whenever a key-data pair is to be written into the single-ported RAM 530, the necessary index values for addressing the single-ported RAM 530 for that key-data pair will already have been stored into the dual-ported RAM 512.

One embodiment of a programmed method for initializing memories in lookup circuit 600 is illustrated by the example pseudocode below. In this example, the programmed method employs a Cuckoo hashing insertion algorithm, rather than a BMZ insertion algorithm. Note, however, that other insertion algorithms may be employed in other embodiments.

```
01  initializeCuckooCircuitTables(keyMatrix, data:Matrix, p, rng)
02      result := generateTwoHashFunctions(keyMatrix, p, rng)
03      if (result = FAILURE) ERROR
04      (Ap, Aq, yq) := result
05      h1 := the function (v => Ap v)
06      h2 := the function (v => (Aq v) XOR yq)
07      unusedKey := some key not in key:Matrix
08      table := matrix of size (2^p)x(k+d) with every row (unusedKey,0)
09      (use Cuckoo hashing insertion algorithm with hash functions
10       h1 and h2 to insert (key, data) pairs into table)
11      (reprogram the FPGA implementing circuit 600 using
12       the bit matrices Ap and Aq and the bit vector yq so that
13       the first hash function sub-circuit 610 computes h1
14       and the second hash function sub-circuit 616 computes h2)
15      for i := 0 through (2^p - 1)
16          (K, D) := entry i of table
17          for one clock cycle of circuit 600
18              present K as KEY input 602
19              present (K, D) as KEY/DATA IN input 608
                if (h1(k) = i) then
21                  assert WRITE1 signal 604
```

```
22          do not assert WRITE2 signal 606
23      else
24          do not assert WRITE1 signal 604
25          assert WRITE2 signal 606
26      end if
27  end clock cycle
28 end for
```

In this example, a programmed method "initializeCuckooCircuitTables" may be used to load appropriate data into the dual-ported RAM 614 of the lookup circuit 600. In this example, the programmed method accepts four arguments: a first bit matrix "keyMatrix" of size (r×k), where k<$2^r$, whose r-bit columns are keys and whose columns are all different, thus representing a set of keys: a second bit matrix "dataMatrix" of size (d×k) containing data associated with the keys; a positive integer "p" indicating the desired number of bits in each hash value; and a source "rng" of random or pseudorandom numbers. In this example, line 02 includes a call to a programmed procedure "generateTwoHashFunctions", which will produce either the value "FAILURE" or a triplet containing two bit matrices of size (p×r) and a bit vector of size p. In this example, line 03 detects whether the returned value is "FAILURE", and if it is, an error is signaled. Otherwise, line 04 gives the name Ap to the first bit matrix, the name Aq to the second bit matrix, and the name yq to the bit vector.

In this example, line 05 gives the name h1 to a function that will multiply a key v by the matrix Ap, and line 06 gives the name h2 to a function that will multiply a key v by the matrix Aq and then XOR the result with the bit vector yq. In some embodiments, each of the functions h1 and h2 may be configured to accept an r-bit key and to produce a p-bit hash value. In this example, line 07 gives the name "unusedKey" to any arbitrarily chosen bit pattern that does not appear as a column in "keyMatrix". In some embodiments, the lexicographically smallest such pattern may be chosen. Note that, in some embodiments, there must be such a pattern because of the constraint k<$2^r$.

In the example pseudocode above, lines 08 through 10 create a table (called "table") and use a Cuckoo hashing algorithm to fill it with key-data pairs. Lines 11 through 14 indicate that an FPGA reprogramming process is used to configure the circuitry so that the first hash function sub-circuit 610 computes the hash function h1 and the second hash function sub-circuit 616 computes the hash function h2. In this example, the operations in the body of the loop on lines 15 through 28 (more specifically, lines 17 through 27) are performed during one (respective) clock cycle of the lookup circuit 500 for each of the $2^p$ indexes into table. Line 16 gives the names "K" and "D" to the key and data information from entry i the table. Lines 17 through 27 perform operations during a single clock cycle that write the key-data pair into the dual-ported RAM 614 at an address computed by either the first hash function circuit 610 or the second hash function circuit 616 from the key K. In this example, the determination of which of the two addresses is used is performed in lines 20 through 26 in such a way that the address chosen will be i.

Figure 17:
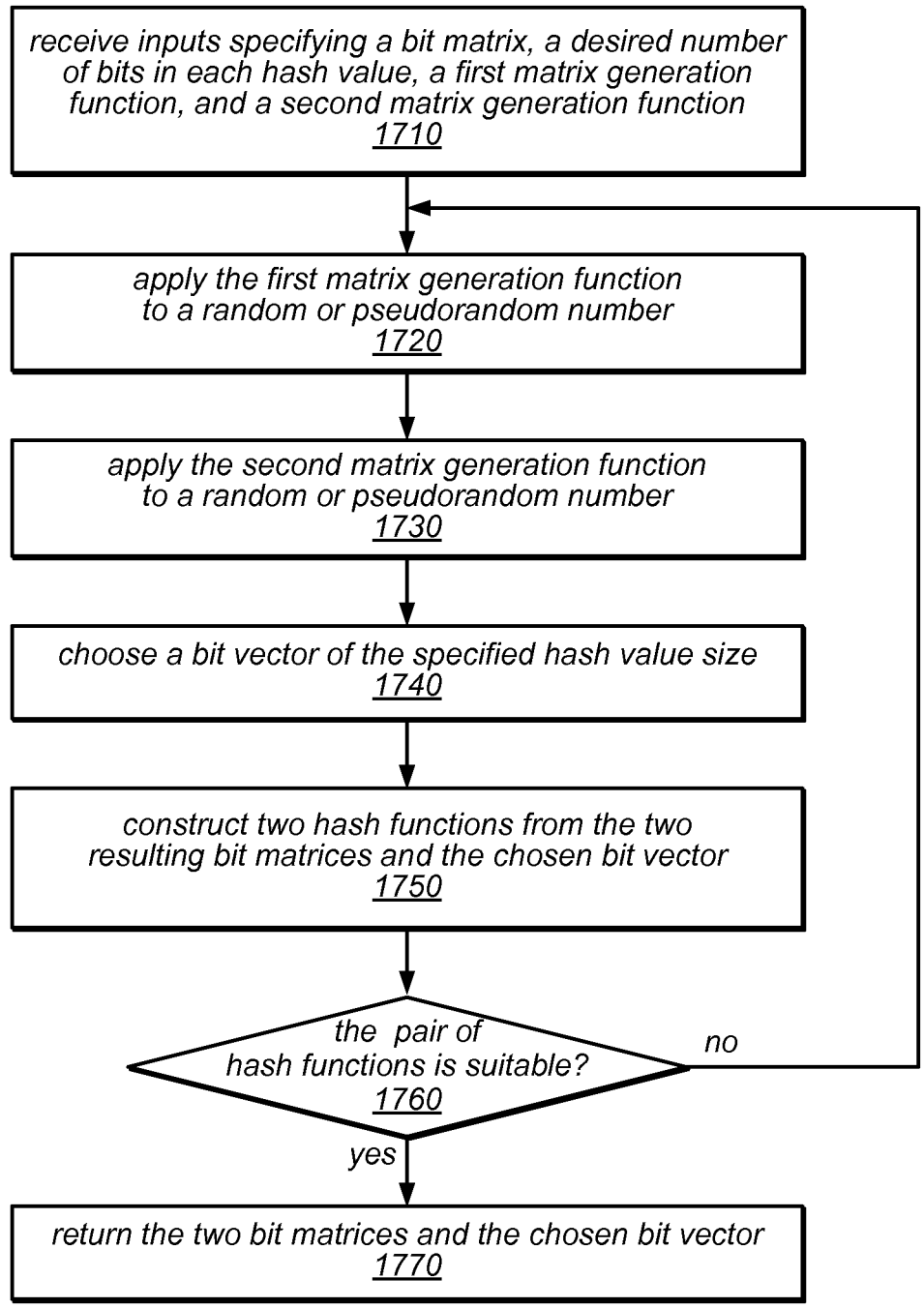
FIG. 17 is a flow diagram illustrating one embodiment of a method for computing a pair of hash functions for use in a lookup circuit.

One embodiment of a method for computing a pair of hash functions for use in the lookup circuits described herein is illustrated by the flow diagram in FIG. 17. As illustrated at 1710, in this example, the method may include receiving inputs specifying a bit matrix, a desired number of bits in each hash value, a first matrix generation function, and a second matrix generation function. Note that in other embodiments, the method may include receiving one or more other inputs (e.g., the values of various configuration parameters or flags, identifiers of various random or pseudorandom number generators, or other inputs). As illustrated in this example, the method may include applying the first matrix generation function to a random or pseudorandom number (as in 1720), applying the second matrix generation function to a random or pseudorandom number (as in 1730), and choosing a bit vector of the specified hash value size (as in 1740).

The method may include constructing two hash functions from the two resulting bit matrices (i.e., those generating by the application of the first and second matrix generation functions to respective random or pseudorandom numbers) and the chosen bit vector, as in 1750. If the pair of hash functions is determined not to be suitable for use in the lookup circuit (shown as the negative exit from 1760), the method may include repeating the operations illustrated in 1710-1750 until a suitable pair is found. However, if the pair of hash functions is determined to be suitable for used in the lookup circuit (or once a suitable pair of hash functions has been identified), the method may include returning the two corresponding bit matrices and the chosen bit vector. This is illustrated in FIG. 17 by the path from the positive exit of 1760 to 1770.

One embodiment of a programmed method for computing two matrices and a bit vector for use in hash functions (such as those implemented in the lookup circuits described herein), given two matrix generation functions, is illustrated by the example pseudocode below.

```
01  searchTwoMatrices(keyMatrix, p, gen1, gen2, rng)
02      while (resources are not exhausted)
03          Ap := gen1(rng)
04          Aq := gen2(rng)
05          yq := (bit vector of size p, chosen either
06                 randomly using rng or arbitrarily)
07          hp := the function (k => Ap k)
08          hq := the function (k => (Aq k) XOR yq)
09          if (functions hp and hq are suitable for hashing
10              the set of columns in keyMatrix) then
11              return (Ap, Aq, yq)
12          end if
13      end while
14      return FAILURE
```

In this example, the programmed method "searchTwoMatrices" may be used to compute a pair of hash functions suitable for hashing a given set of keys. In various embodiments, a pair of hash functions generated by this programmed method may be implemented in any of the lookup circuits described herein. For example, each of the hash functions in the pair may be implemented in a respective hash function sub-circuit within the lookup circuit, as described herein. In this example, the programmed method accepts five arguments: a bit matrix "keyMatrix" of size (r×k), where k<$2^r$, whose r-bit columns are keys and whose columns are all different, thus representing a set of keys; a positive integer "p" indicating the desired number of bits in each hash value; a first matrix generation function "gen1" that, when given a source of random or pseudorandom numbers, will return a bit matrix of size (p×r); a second matrix generation function "gen2" that, when given a source of random or pseudorandom numbers, will return a bit matrix of size (p×r); and a source "rng" of random or pseudorandom numbers.

In this example, each of the first matrix generation function gen1 and the second matrix generation function gen2 is applied to the source "rng", to generate bit matrices Ap and Aq, respectively. In addition, a bit vector of size p is also chosen, either arbitrarily or randomly using "rng". In lines 07 and 08, two hash functions "hp" and "hq" are constructed from the two matrices and the bit vector. In lines 09 and 10, the hash functions are tested for suitability, for example by testing whether the graph they induce on the given set of keys in "keyMatrix" is acyclic. In this example, these steps may be carried out repeatedly until a suitable pair of hash functions is found, in which case a triplet of the two bit matrices and the bit vector are returned (at line 11), or until computational resources are exhausted, in which case a "FAILURE" indication is returned (at line 14).

Two alternate embodiments of a programmed method for creating a matrix generation function are illustrated in the example pseudocode below.

```
01    makeMatrixGenerator(keyMatrix, p, rng)
02      r := number of rows in keyMatrix
03      return (the function (rng2 => makeRandomMatrix(p, r, rng2)))
11    makeMatrixGenerator(keyMatrix, p, rng)
12      r := number of rows in keyMatrix
13      return (the function (rng2 =>
14        makeSparseRandomMatrix(p, r, maxOnes, exact,
15          oneLessForSomeRows, rng2))
16      for suitable values of maxOnes,
17      exact, and oneLessForSomeRows)
```

The pseudocode in lines 01 to 03 illustrates an embodiment of the programmed method "makeMatrixGenerator" that may be used to compute a function that, when given a source of random or pseudorandom numbers, will return a bit matrix of size (p×r). In this example, the programmed method accepts three arguments: a bit matrix "keyMatrix" of size (r×k), where k<$2^r$, whose r-bit columns are keys and whose columns are all different, thus representing a set of keys; a positive integer "p" indicating the desired number of bits in each hash value; and a source "rng" of random or pseudorandom numbers (which are not used by this specific implementation of the "makeMatrixGenerator" method). In this example, line 02 determines the value "r". Line 03 returns a function that accepts an argument rng2 and calls the programmed method "makeRandomMatrix" (as described above) to generate a bit matrix of size (p×r).

The pseudocode in lines 11 to 17 illustrates an alternate implementation of the programmed method "makeMatrixGenerator" that may be used to compute a function that, when given a source of random or pseudorandom numbers, will return a bit matrix of size (p×r). As in the previous example, this programmed method accepts three arguments: a bit matrix "keyMatrix" of size (r×k), where k<$2^r$, whose r-bit columns are keys and whose columns are all different, thus representing a set of keys; a positive integer "p" indicating the desired number of bits in each hash value; and a source "rng" of random or pseudorandom numbers. In this example, line 12 determines the value "r". Lines 13 through 17 return a function that accepts an argument rng2 and calls the programmed method "makeSparseRandom Matrix" (as described above) to generate a bit matrix of size (p×r). In some embodiments, fixed values of "maxOnes", "exact" and/or "oneLessForSomeRows" may be used when calling the programmed method "makeSparseRandomMatrix". In other embodiments, at least one of the values for "maxOnes", "exact" and/or "oneLessForSomeRows" may be chosen randomly (e.g., using "rng").

Two alternate embodiments of a programmed method for computing two matrices and a bit vector for use in hash functions (such as those implemented in the lookup circuits described herein) are illustrated in the example pseudocode below.

```
01    generateTwoHashFunctions(keyMatrix, p, rng)
02      gen1 := makeMatrixGenerator(keyMatrix, p, rng)
03      gen2 := makeMatrixGenerator (keyMatrix, p, rng)
04      searchTwoMatrices(keyMatrix, p, gen1, gen2, rng)
11    generateTwoHashFunctions(keyMatrix, p, rng)
12      gen := makeMatrixGenerator(keyMatrix, p, rng)
13      searchTwoMatrices(keyMatrix, p, gen, gen, rng)
```

The pseudocode in lines 01 to 03 illustrates an embodiment of the programmed method "generateTwoHashFunctions" that may be used to compute a pair of hash functions suitable for hashing a given set of keys. In this example, the programmed method accepts three arguments: a bit matrix "keyMatrix" of size (r×k), where k<$2^r$, whose r-bit columns are keys and whose columns are all different, thus representing a set of keys; a positive integer "p" indicating the desired number of bits in each hash value; and a source "rng" of random or pseudorandom numbers. In this example, line 02 includes a call to a programmed method "makeMatrixGenerator" (e.g., one of the variations of this programmed method described above) to create a first matrix generation function gen1, and line 03 includes a call to a programmed method "makeMatrixGenerator" (e.g., one of the variations of this programmed method described above) to create a second matrix generation function gen2.

In this example, line 04 then calls a programmed method "searchTwoMatrices" (such as that described above) to generate a triplet of two bit matrices and a bit vector. In some embodiments, the two calls to "makeMatrixGenerator" on lines 02 and 03 invoke the same implementation of "makeMatrixGenerator". In other embodiments, the two calls to "makeMatrixGenerator" on lines 02 and 03 invoke different implementations of "makeMatrixGenerator".

The pseudocode in lines 11 to 13 illustrates an alternate embodiment of the programmed method "generateTwoHashFunctions" that may be used to compute a pair of hash functions suitable for hashing a given set of keys. As in the previous example, this programmed method accepts three arguments: a bit matrix "keyMatrix" of size (r×k), where k<$2^r$, whose r-bit columns are keys and whose columns are all different, thus representing a set of keys; a positive integer "p" indicating the desired number of bits in each hash value; and a source "rng" of random or pseudorandom numbers. In this example, line 12 includes a call to a programmed method "makeMatrixGenerator" (e.g., one of the variations of this programmed method described above) to create a matrix generation function "gen". Line 13 then calls a programmed method "searchTwoMatrices" (such as that described above) to generate a triplet of two bit matrices and a bit vector, using the matrix generation function "gen" for two of the arguments. In this example, the programmed method "searchTwoMatrices" will use the same matrix generation function for generating both matrices in each candidate pair of hash functions, rather than using two different matrix generation functions, one to generate each of the two matrices in a candidate pair.

In various embodiments, the programmed methods described above may be used in a variety of combinations to support the implementation of the lookup circuits described herein (e.g., to generate, choose, and/or determine the suitability of matrix generators, random bit matrices, sparse random bit matrices, hash functions, and/or pairs of hash functions, and/or to initialize or otherwise load various elements of the lookup circuits or of the tables and/or hash function sub-circuits thereof).

Note that in some embodiments of the lookup circuits described herein, the write-enable signals and key-data/in signals may be omitted. In such embodiments, some other means may be used to specify (and/or load) the contents of the memories in the lookup circuits or to specify the contents of a memory in another technology that supports the reading and writing of information (including, but not limited to, flash memory technology). In other embodiments, the RAM circuits illustrated in the figures and described herein may be replaced with some form of read-only memory technology and the write-enable signals and key-data/in signals of these lookup circuits may be omitted.

It will be appreciated by one of ordinary skill in the art that the specific choice to store an r-bit key and d bits of associated data into a memory word by storing the key into the leftmost r bits and the associated data into the rightmost d bits is only one illustrative choice among many, that other ways of storing or encoding an r-bit key and d bits of associated data into a memory word holding at least r+d bits are possible, and that these and other such design variations fall within the spirit and scope of this disclosure. For example, in one embodiment, data representing the key may be stored in the rightmost r bits of a memory word and the associated data may be stored in the leftmost d bits of the memory word. In another example, the bits representing the key and the bits representing the associated data may be interleaved within a memory word, in some embodiments. Similar remarks apply to the storing of both data and index information within a single memory word.

While the lookup circuits 500 and 600 described herein illustrate a query process that performs computation and memory accesses in combinatorial logic, it will be appreciated by one of ordinary skill in the art that in other embodiments, the computation and memory accesses may be performed sequentially and may be divided into multiple pipeline stages, while still falling within the spirit and scope of the present disclosure.

Note also that in various embodiments of the lookup circuits 500 and 600, the hash function sub-circuits included in those lookup circuits may be implemented in FPGAs or using any other suitable implementations of the hash function circuitry described herein. In general, any or all of the hash functions described herein may be defined through memory content, may be implemented in fixed combinatorial logic (e.g., gates), may be implemented in programmable combinatorial logic, or may be implemented using any combination of these and other technologies suitable for implementing the functionality of a hash function sub-circuit. In some design environments (e.g., those that utilize FPGAs), high-density SRAMs may be readily available for use in implementing the techniques described herein, while the construction of CAMs could be costly in terms of resources.

Figure 18:
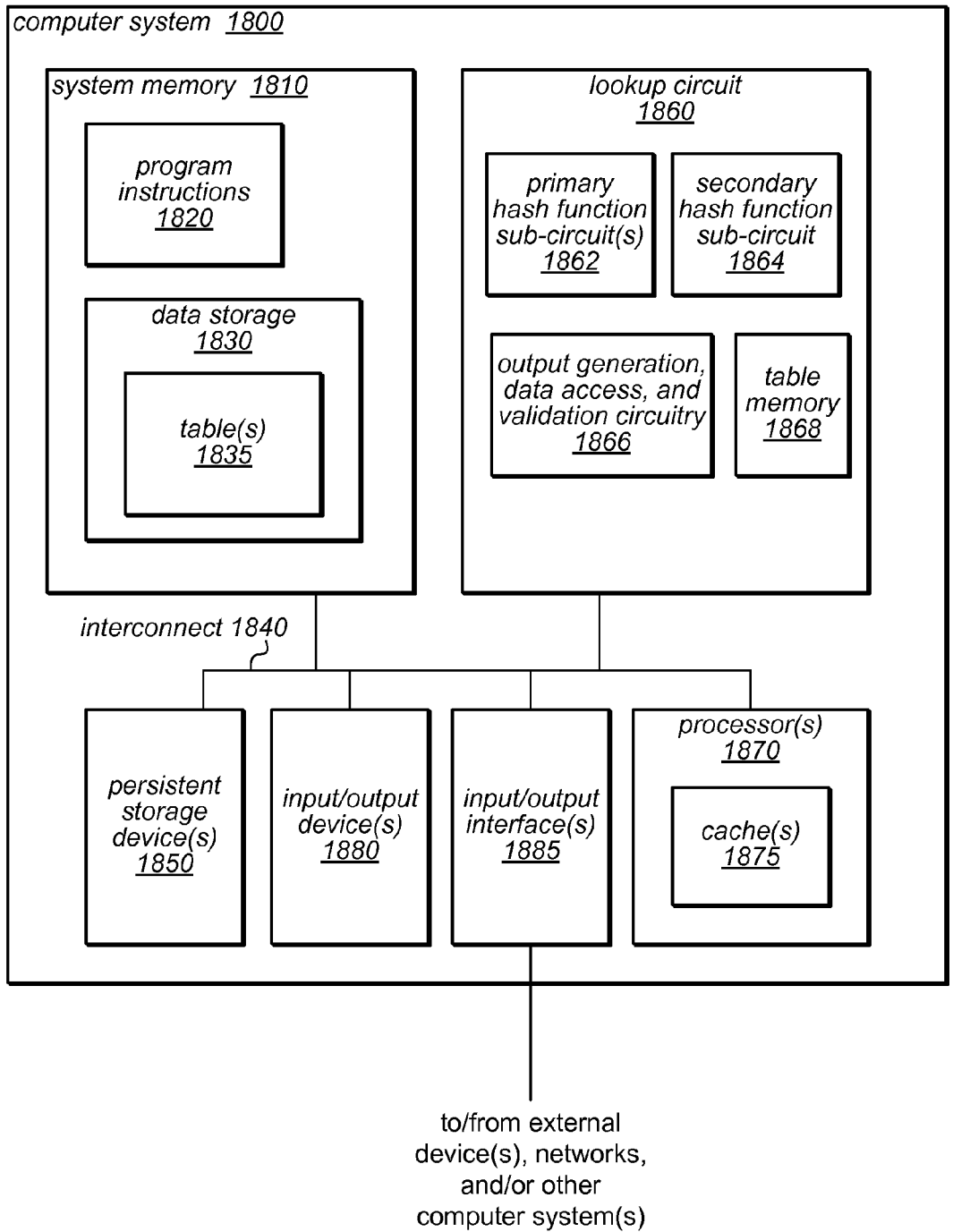
FIG. 18 is a block diagram illustrating one embodiment of a computing system that is configured to implement a hash function evaluation circuit or lookup circuit and/or to perform lookup operations using such circuits.

The techniques described herein for implementing and configuring lookup circuits (which may include generating representations of various hash functions and loading them into hash function sub-circuits), evaluating hash functions using such circuits, and/or accessing data in a lookup table using these techniques may be implemented on or by any of a variety of computing systems, in different embodiments. For example, the hash function evaluation circuits and lookup circuits described herein may be implemented in various circuit-level network processing devices including network interface cards, network processors, smart routers/switches, etc., according to different embodiments. In different embodiments, these circuits may be implemented within a single hardware device (e.g., a single chip, card, and/or apparatus), or the functionality of these circuits may be partitioned across multiple hardware devices (e.g., multiple chips on the same card or on different cards). FIG. 18 illustrates a computer system 1800 that is configured to implement configuring lookup circuits (which may include generating representations of various hash functions and loading them into hash function sub-circuits), evaluating hash functions using such circuits, and/or accessing data in a lookup table using these techniques, according to various embodiments. The computer system 1800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In various embodiments, one or more of the mechanisms for implementing configuring lookup circuits (which may include generating representations of various hash functions and loading them into hash function sub-circuits), evaluating hash functions using such circuits, and/or accessing data in a lookup table using these techniques, as described herein, may be provided as a computer program product, or software, that may include a non-transitory, computer-readable storage medium having stored thereon instructions, which may be used to program a computer system 1800 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette or hard disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1800 may include one or more processors 1870; each may include multiple cores, any of which may be single or multi-threaded. For example, multiple processor cores may be included in a single processor chip (e.g., a single processor 1870), and multiple processor chips may be included in computer system 1800. Each of the processors 1870 may include a cache or a hierarchy of caches 1875, in various embodiments. For example, each processor chip 1870 may include multiple L1 caches (e.g., one per processor core) and one or more other caches (which may be shared by the processor cores on a single processor). The computer system 1800 may also include one or more persistent storage devices 1850 (e.g. optical storage, magnetic storage, hard drive, tape drive, solid state memory, etc.) one or more system memories 1810 (e.g., one or more of cache, SRAM, DRAM, RDRAM, EDO RAM, DDR 10 RAM, DRAM, Rambus RAM, EEPROM, etc.), one or more input/output interfaces 1885, and/or one or more input/output devices 1880 (e.g., keyboards, monitors, etc.). Other embodiments may include more, fewer, or different components than those illustrated in FIG. 18. For example, some embodiments may include additional components not illustrated in FIG. 18 (e.g., video cards, audio cards, additional network interfaces, peripheral devices, a network interface such as an ATM interface, a Frame Relay interface, an Ethernet interface, an Infiniband interface, etc.)

As illustrated in FIG. 18, the one or more processors 1870, the storage device(s) 1850, the input/output devices 1880, the input/output interfaces 1885, and the system memory 1810 may be coupled to the system interconnect 1840. One or more of the system memories 1810 may contain program instructions 1820. Program instructions 1820 may be executable to implement one or more applications, which may include application source code and/or executable application code that is configured to generate bit matrices (e.g., random bit matrices and/or sparse random bit matrices), generate a set of hash functions (e.g., perfect hash functions, minimal perfect hash functions or other types of hash functions), load various hash functions into a lookup circuit or a hash function evaluation circuit or otherwise program a lookup circuit or a hash function evaluation circuit to implement one or more hash functions, load information for key-value pairs in a lookup table, and/or initiate a table lookup operation that uses a lookup circuit or a hash function evaluation circuit to access the data associated with a presented key, as described herein. In some embodiments, program instructions 1820 may also include shared libraries, operating systems, or a compiler (e.g., one that compiles a user program written in a domain-specific programming language and/or a comma-separated values file to generate a lookup circuit configuration or a hash function evaluation circuit configuration that implements one or more selected hash functions).

Program instructions 1820 may be encoded in platform native binary, any interpreted language such as Java™ bytecode, or in any other language such as C/C++, Java™, etc., or in any combination thereof. In various embodiments, components and/or functions implemented by program instructions 1820 (e.g., compilers, applications, operating systems, and/or shared libraries) may each be implemented in any of various programming languages or methods. For example, in one embodiment, one or more components or functions implemented by program instructions 1820 may be Java based, while in another embodiment they may be written using the C or C++ programming languages. Similarly, applications may be written using Java, C, C++, or another programming language, according to various embodiments. Moreover, in some embodiments, the different components or functions implemented by program instructions 1820 may not be implemented using the same programming language. For example, an application implemented by program instructions 1820 may be C++ based, while a compiler implemented by program instructions 1820 may be developed using C.

In various embodiments, the program instructions 1820 may include any or all of the functions, operations, or procedures, and/or other processes for implementing configuring lookup circuits (which may include generating representations of various hash functions and loading them into hash function sub-circuits), evaluating hash functions using such circuits, and/or accessing data in a lookup table using these techniques, as described herein. The system memory 1810 may further comprise data storage locations 1830 where data may be stored. For example, in some embodiments, data storage locations 1830 may store data that is associated with one or more sets of keys in lookup tables (e.g., data storage locations 1830 may include storage for one or more single-ported or dual-ported memories, each of which may store one or more lookup tables) or may store data for bit matrices or bit vectors in one or more arrays. In other embodiments, data storage locations 1830 may store data in one or more hash tables, or may store parameter values, configuration information, and/or any other data usable to implement the techniques described herein using one or more hash evaluation circuits or hash function sub-circuits, some of which may include values that are configurable by the programmer or by a user (e.g., data storage locations 1830 may include storage for one or more memories each of which may store one or more hash tables for various hash function sub-circuits).

As illustrated in FIG. 18, in some embodiments, computer system 1800 may include one or more hash evaluation circuits, such as lookup circuit 1860. As illustrated in this example, each lookup circuit 1860 may include one or more hash function sub-circuit(s) 1862, a selection sub-circuit 1864, and circuitry 1866 for performing output generation (which may include computational logic that modifies data values obtained from a lookup table before or after selection), data access, and key validation. In this example, lookup circuit 1860 also includes table memory 1868, which may include one or more memories, each of which may store one or more hash tables and/or lookup tables, such as those described herein. In other embodiments, one or more of these hash tables may be stored in memory included within hash function sub-circuits 1862 and/or output generation, data access, and validation circuitry 1866.

In some embodiments, interconnect 1840 may be configured to couple processor(s) 1870 and/or lookup circuit 1860 directly to a computer system network. In other embodiments, these (or other) components of computer system 1800 may be coupled to one or more external devices, network(s), and/or other computer system(s) through interconnect 1840 and input/output interface(s) 1885. For example, in some embodiments, computer system 1800 may include an interface 1885 through which network packets are received from one or more other computer systems (some of which may be similar to computer system 1800). These packets may then be routed to lookup circuit 1860 in order to perform a table lookup operation on information (keys) contained in those packets, as described herein. In some embodiments, interconnect 1870 and input/output interface(s) 1885 may be configured to implement one or more of various interface or network standards, e.g., Peripheral Component Interconnect (PCI), Ethernet, HyperTransport (HT), Infiniband, or any variant or successor of these or other suitable input/output protocols. In other embodiments, one or more of interconnect 1870 and input/output interface(s) 1885 may be configured to implement a custom interface.

Although the embodiments above have been described in considerable detail, numerous variations and modifications will become apparent to those skilled in the art once the above disclosure is fully appreciated. For example, although many of the embodiments are described in terms of particular types of data structures (e.g., hash tables), it should be noted that the techniques and mechanisms disclosed herein for implementing configuring lookup circuits (which may include generating representations of various hash functions and loading them into hash function sub-circuits), evaluating hash functions using such circuits, and/or accessing data in a lookup table using these techniques may be applicable in other contexts and/or using structures and procedures other than those described in the examples herein. It is intended that the following claims be interpreted to embrace all such variations and modifications.

What is claimed:

1. A circuit configured to perform a table lookup operation, comprising:
   an input configured to receive a representation of a key value;

one or more hash function sub-circuits coupled to the input; and
at least one memory;
wherein the representation of the key value comprises a bit vector;
wherein each of the hash function sub-circuits comprises a representation of a sparse bit matrix; and
wherein each of the hash function sub-circuits is configured to:
apply a respective hash function to the key value to produce a respective hash value; and
in response to a determination that the respective hash function is suitable for mapping the key value to a respective location in the at least one memory, provide the respective hash value to the at least one memory, wherein the respective hash values identifies the respective location in the at least one memory;
wherein to apply the respective hash function to the key value, the hash function sub-circuit is configured to multiply the bit vector with the sparse bit matrix; and
wherein the at least one memory is configured to:
receive the respective hash values provided by each of the hash function sub-circuits; and
output a respective data value from each of the locations in the at least one memory identified by the received hash values.

2. The circuit of claim 1, wherein for at least one of the hash function sub-circuits, the sparse bit matrix is a sparse random bit matrix comprising at most a pre-defined number of 1-bits that is less than the number of bits in the bit vector.

3. The circuit of claim 1, wherein for at least one of the hash function sub-circuits, the sparse bit matrix is a sparse random bit matrix comprising at most a pre-defined number of 0-bits that is less than the number of bits in the bit vector.

4. The circuit of claim 1, wherein at least one of the hash function sub-circuits comprises one or more odd parity circuits, each of which produces one bit of the respective hash value produced by the hash function sub-circuit.

5. The circuit of claim 4, wherein each of the odd parity circuits takes as input a subset of the bits in the bit vector that is dependent on the sparse bit matrix represented in the hash function sub-circuit.

6. The circuit of claim 4, wherein for at least one of the hash function sub-circuits, each of the one or more odd parity circuits comprises fixed combinatorial logic.

7. The circuit of claim 4, wherein for at least one of the hash function sub-circuits, each of the one or more odd parity circuits comprises programmable combinatorial logic.

8. The circuit of claim 4, wherein for at least one of the hash function sub-circuits, each of the one or more odd parity circuits takes as inputs six, eleven, or twelve bits of the bit vector.

9. The circuit of claim 4, wherein at least one of the hash function sub-circuits further comprises one or more even parity circuits.

10. The circuit of claim 4, wherein for at least one of the hash function sub-circuits, to apply the respective hash function to the key value, the hash function sub-circuit is configured further configured to add another bit vector to a result of the multiplication of the bit vector with the sparse bit matrix.

11. The circuit of claim 4, wherein at least one of the hash function sub-circuits comprises a two-level hierarchy of parity circuits, each level comprising at least one odd parity circuit.

12. The circuit of claim 4, wherein for at least one of the hash function sub-circuits, each of the one or more odd parity circuits comprises a memory.

13. The circuit of claim 1,
wherein the circuit comprises two or more hash function sub-circuits; and
wherein the circuit further comprises a sub-circuit configured to generate an index into a lookup table dependent on the respective data values output from each of the locations in the at least one memory identified by the hash values produced by the two or more hash function sub-circuits.

14. The circuit of claim 1,
wherein the circuit comprises two or more hash function sub-circuits; and
wherein the circuit further comprises a selection sub-circuit configured to:
select one of the respective data values output from each of the locations in the at least one memory identified by the hash values produced by the two or more hash function sub-circuits; and
provide the selected data value as an output of the circuit.

15. A method, comprising:
performing, by a lookup circuit:
receiving a given key value;
for each of one or more hash functions:
applying the hash function to the given key value to produce a respective hash value, wherein said applying the hash function comprises multiplying a bit vector representation of the given key value with a sparse bit matrix;
in response to determining that the hash function is suitable for mapping the given key value to a respective location in a memory, providing the respective hash value to the memory, wherein the respective hash value identifies a location in the memory; and
obtaining data stored in the identified location in the memory.

16. The method of claim 15,
wherein the one or more hash functions comprises two or more hash functions that map key values to index values in the lookup circuit; and
wherein the method further comprises, prior to said receiving,
generating two or more candidate sparse bit matrices for use in respective ones of the two or more hash functions, wherein each of the hash functions multiplies a bit vector representation of a key value with a respective one of the candidate sparse bit matrices;
determining whether the two or more hash functions are suitable for mapping each of the keys in a set of key-value pairs to a respective location in the lookup circuit at which a data portion of its key-value pair can be stored; and
in response to determining that the two or more hash functions are suitable for mapping each of the keys in the set of key-value pairs to a respective location in the lookup circuit at which a data portion of its key-value pair can be stored, transferring a representation of each of the two or more hash functions to the lookup circuit.

17. The method of claim 16, wherein said generating two or more candidate sparse random bit matrices comprises, for each of the two or more candidate sparse bit matrices:
receiving inputs specifying a number of rows, a number of columns, and a constraint on the number of 1-bits in each row of the candidate sparse bit matrix;
allocating an array comprising the specified number of rows and columns; and for each row:
    choosing a random bit value for a given bit in the row; and
    for each other bit on the row:
        choosing a random value for the bit or a 0-bit value for the bit dependent on whether the constraint on the number of 1-bits has been met for the row.

18. A non-transitory, computer-readable storage medium storing program instructions that when executed on one or more computers cause the one or more computers to perform:
    receiving a plurality of keys for key-value pairs to be evaluated in a lookup circuit;
    generating two or more hash functions that when applied to each of the keys produce respective hash values that map the key to respective index values in the lookup circuit, wherein said generating comprises generating two or more candidate sparse random bit matrices, and wherein each of the hash functions multiplies an input bit vector representing a key with a respective one of the candidate sparse random bit matrices;
    determining whether the hash functions are suitable for mapping each of the keys to a respective location in the lookup circuit at which a data portion of its key-value pair can be stored; and
    in response to determining that the hash functions are suitable for mapping each of the keys to a respective location in the lookup circuit at which a data portion of the respective key-value pair can be stored:
        transferring a representation of each of the hash functions to the lookup circuit; and
        loading at least the data portion of each of the key-value pairs into a respective entry of a lookup table in a memory in the lookup circuit such that retrieval of the data portion of each of the key-value pairs from the respective entry is dependent on at least one of the index values to which the key for the key-value pair is mapped by the hash functions.

19. The non-transitory, computer-readable storage medium of claim 18, wherein when executed on the one or more computers, the program instructions further cause the one or more computers to perform:
    in response to determining that the represented hash functions are not suitable for mapping each of the keys to a respective location in the lookup circuit at which a data portion of the respective key-value pair can be stored:
        generating one or more additional candidate sparse random bit matrices for use in additional respective hash functions that map the keys to index values in the lookup circuit, wherein each of the additional hash functions multiplies an input bit vector representing a key with a respective one of the additional candidate sparse random bit matrices;
        determining whether a set of two or more hash functions comprising at least one of the additional hash functions is suitable for mapping each of the keys to a respective location in the lookup circuit at which a data portion of its key-value pair can be stored.

20. The non-transitory, computer-readable storage medium of claim 18, wherein said generating the two or more hash functions comprises:
    receiving inputs specifying a number of bits in each hash value;
    applying a first matrix generation function to a random or pseudorandom number generator to generate a first bit matrix having a number of rows that is equal to the specified number of bits;
    applying a second matrix generation function to a random or pseudorandom number generator to generate a second bit matrix having a number of rows that is equal to the specified number of bits;
    choosing a bit vector having a number of bits that is equal to the specified number of bits;
    constructing two hash functions dependent on the first bit matrix, the second bit matrix, and the chosen bit vector;
    wherein one of the constructed hash functions is configured to:
        multiply an input bit vector representing a key with the first bit matrix; and
        add the chosen bit vector to the result of the multiplication; and
    wherein the other one of the constructed hash functions is configured to:
        multiply an input bit vector representing a key with the second bit matrix; and
        add the chosen bit vector to the result of the multiplication.

\* \* \* \* \*